US009754878B2

(12) United States Patent
Kornachuk et al.

(10) Patent No.: US 9,754,878 B2
(45) Date of Patent: *Sep. 5, 2017

(54) SEMICONDUCTOR CHIP INCLUDING A CHIP LEVEL BASED ON A LAYOUT THAT INCLUDES BOTH REGULAR AND IRREGULAR WIRES

(71) Applicant: Tela Innovations, Inc., Los Gatos, CA (US)

(72) Inventors: Stephen Kornachuk, Campbell, CA (US); James Mali, Morgan Hill, CA (US); Carole Lambert, Campbell, CA (US); Scott T. Becker, Scotts Valley, CA (US); Brian Reed, San Jose, CA (US)

(73) Assignee: Tela Innovations, Inc., Los Gatos, CA (US)

( * ) Notice: Subject to any disclaimer, the term of this patent is extended or adjusted under 35 U.S.C. 154(b) by 276 days.

This patent is subject to a terminal disclaimer.

(21) Appl. No.: 13/898,155

(22) Filed: May 20, 2013

(65) Prior Publication Data
US 2013/0256898 A1    Oct. 3, 2013

Related U.S. Application Data

(63) Continuation of application No. 12/481,445, filed on Jun. 9, 2009, now Pat. No. 8,448,102, which is a (Continued)

(51) Int. Cl.
*G06F 17/50* (2006.01)
*H01L 23/528* (2006.01)

(52) U.S. Cl.
CPC ........ *H01L 23/528* (2013.01); *G06F 17/5068* (2013.01); *G06F 17/5072* (2013.01);
(Continued)

(58) Field of Classification Search
CPC ......... H01L 2924/0002; H01L 2924/00; H01L 23/528; G06F 17/5068; G06F 17/5072; G06F 2217/12; Y02P 90/265
See application file for complete search history.

(56) References Cited

U.S. PATENT DOCUMENTS 4,069,493 A    1/1978   Bobenrieth
4,197,555 A    4/1980   Uehara et al.
(Continued)

FOREIGN PATENT DOCUMENTS

EP    0102644    7/1989
EP    0788166    8/1997
(Continued)

OTHER PUBLICATIONS

U.S. Appl. No. 60/625,342, filed May 25, 2006, Pileggi et al.
(Continued)

*Primary Examiner* — Vuthe Siek
(74) *Attorney, Agent, or Firm* — Martine Penilla Group, LLP

(57) ABSTRACT

A plurality of regular wires are formed within a given chip level, each having a linear-shape with a length extending in a first direction and a width extending in a second direction perpendicular to the first direction. The plurality of regular wires are positioned according to a fixed pitch such that a distance as measured in the second direction between lengthwise centerlines of any two regular wires is an integer multiple of the fixed pitch. At least one irregular wire is formed within the given chip level and within a region bounded by the plurality of regular wires. Each irregular wire has a linear-shape with a length extending in the first direction and a width extending in the second direction. A distance as measured in the second direction between
(Continued)

lengthwise centerlines of any irregular wire and any regular wire is not equal to an integer multiple of the fixed pitch.

22 Claims, 30 Drawing Sheets

Related U.S. Application Data continuation-in-part of application No. 12/013,342, filed on Jan. 11, 2008, now Pat. No. 7,917,879, said application No. 12/481,445 is a continuation-in-part of application No. 12/212,562, filed on Sep. 17, 2008, now Pat. No. 7,842,975, which is a continuation of application No. 11/683,402, filed on Mar. 7, 2007, now Pat. No. 7,446,352.

(60) Provisional application No. 61/060,090, filed on Jun. 9, 2008, provisional application No. 60/963,364, filed on Aug. 2, 2007, provisional application No. 60/972,394, filed on Sep. 14, 2007, provisional application No. 60/781,288, filed on Mar. 9, 2006.

(52) U.S. Cl.
CPC .. *G06F 2217/12* (2013.01); *H01L 2924/0002* (2013.01); *Y02P 90/265* (2015.11)

(56) References Cited

U.S. PATENT DOCUMENTS

| | | | |
|---|---|---|---|
| 4,417,161 A | 11/1983 | Uya | |
| 4,424,460 A | 1/1984 | Best | |
| 4,602,270 A | 7/1986 | Finegold | |
| 4,613,940 A | 9/1986 | Shenton et al. | |
| 4,657,628 A | 4/1987 | Holloway et al. | |
| 4,682,202 A | 7/1987 | Tanizawa | |
| 4,745,084 A | 5/1988 | Rowson et al. | |
| 4,780,753 A | 10/1988 | Ohkura et al. | |
| 4,801,986 A | 1/1989 | Chang et al. | |
| 4,804,636 A | 2/1989 | Groover, III | |
| 4,812,688 A | 3/1989 | Chu et al. | |
| 4,884,115 A | 11/1989 | Michel et al. | |
| 4,928,160 A | 5/1990 | Crafts | |
| 4,975,756 A | 12/1990 | Haken et al. | |
| 5,047,979 A | 9/1991 | Leung | |
| 5,068,603 A | 11/1991 | Mahoney | |
| 5,079,614 A | 1/1992 | Khatakhotan | |
| 5,097,422 A | 3/1992 | Corbin et al. | |
| 5,117,277 A | 5/1992 | Yuyama et al. | |
| 5,121,186 A | 6/1992 | Wong et al. | |
| 5,208,765 A | 5/1993 | Turnbull | |
| 5,224,057 A | 6/1993 | Igarashi | |
| 5,242,770 A | 9/1993 | Chen et al. | |
| 5,268,319 A | 12/1993 | Harari | |
| 5,298,774 A | 3/1994 | Ueda et al. | |
| 5,313,426 A | 5/1994 | Sakuma et al. | |
| 5,338,963 A | 8/1994 | Klaasen | |
| 5,351,197 A | 9/1994 | Upton et al. | |
| 5,359,226 A | 10/1994 | DeJong | |
| 5,365,454 A | 11/1994 | Nakagawa et al. | |
| 5,367,187 A | 11/1994 | Yuen | |
| 5,378,649 A | 1/1995 | Huang | |
| 5,396,128 A | 3/1995 | Dunning et al. | |
| 5,420,447 A | 5/1995 | Waggoner | |
| 5,461,577 A | 10/1995 | Shaw et al. | |
| 5,471,403 A | 11/1995 | Fujimaga | |
| 5,497,334 A | 3/1996 | Russell et al. | |
| 5,497,337 A | 3/1996 | Ponnapalli et al. | |
| 5,526,307 A | 6/1996 | Lin et al. | |
| 5,536,955 A | 7/1996 | Ali | |
| 5,545,904 A | 8/1996 | Orbach | |
| 5,581,098 A | 12/1996 | Chang | |
| 5,581,202 A | 12/1996 | Yano et al. | |
| 5,612,893 A | 3/1997 | Hao et al. | |
| 5,636,002 A | 6/1997 | Garofalo | |
| 5,656,861 A | 8/1997 | Godinho et al. | |
| 5,682,323 A | 10/1997 | Pasch et al. | |
| 5,684,311 A | 11/1997 | Shaw | |
| 5,684,733 A | 11/1997 | Wu et al. | |
| 5,698,873 A | 12/1997 | Colwell et al. | |
| 5,705,301 A | 1/1998 | Garza et al. | |
| 5,723,883 A | 3/1998 | Gheewalla | |
| 5,723,908 A | 3/1998 | Fuchida et al. | |
| 5,740,068 A | 4/1998 | Liebmann et al. | |
| 5,745,374 A | 4/1998 | Matsumoto | |
| 5,764,533 A | 6/1998 | deDood | |
| 5,774,367 A | 6/1998 | Reyes et al. | |
| 5,780,909 A | 7/1998 | Hayashi | |
| 5,789,776 A | 8/1998 | Lancaster et al. | |
| 5,790,417 A | 8/1998 | Chao et al. | |
| 5,796,128 A | 8/1998 | Tran et al. | |
| 5,796,624 A | 8/1998 | Sridhar et al. | |
| 5,798,298 A | 8/1998 | Yang et al. | |
| 5,814,844 A | 9/1998 | Nagata et al. | |
| 5,825,203 A | 10/1998 | Kusunoki et al. | |
| 5,834,851 A | 11/1998 | Ikeda et al. | |
| 5,838,594 A | 11/1998 | Kojima | |
| 5,841,663 A | 11/1998 | Sharma et al. | |
| 5,847,421 A | 12/1998 | Yamaguchi | |
| 5,850,362 A | 12/1998 | Sakuma et al. | |
| 5,852,562 A | 12/1998 | Shinomiya et al. | |
| 5,858,580 A | 1/1999 | Wang et al. | |
| 5,898,194 A | 4/1999 | Gheewala | |
| 5,900,340 A | 5/1999 | Reich et al. | |
| 5,905,287 A | 5/1999 | Hirata | |
| 5,908,827 A | 6/1999 | Sirna | |
| 5,915,199 A | 6/1999 | Hsu | |
| 5,917,207 A | 6/1999 | Colwell et al. | |
| 5,920,486 A | 7/1999 | Beahm et al. | |
| 5,923,059 A | 7/1999 | Gheewala | |
| 5,923,060 A | 7/1999 | Gheewala | |
| 5,929,469 A | 7/1999 | Mimoto et al. | |
| 5,930,163 A | 7/1999 | Hara et al. | |
| 5,935,763 A | 8/1999 | Caterer et al. | |
| 5,949,101 A | 9/1999 | Aritome | |
| 5,973,507 A | 10/1999 | Yamazaki | |
| 5,977,305 A | 11/1999 | Wigler et al. | |
| 5,977,574 A | 11/1999 | Schmitt et al. | |
| 5,998,879 A | 12/1999 | Iwaki et al. | |
| 6,009,251 A | 12/1999 | Ho et al. | |
| 6,026,223 A | 2/2000 | Scepanovic et al. | |
| 6,037,613 A | 3/2000 | Mariyama | |
| 6,037,617 A | 3/2000 | Kumagai | |
| 6,044,007 A | 3/2000 | Capodieci | |
| 6,054,872 A | 4/2000 | Fudanuki et al. | |
| 6,063,132 A | 5/2000 | DeCamp et al. | |
| 6,077,310 A | 6/2000 | Yamamoto et al. | |
| 6,080,206 A | 6/2000 | Tadokoro et al. | |
| 6,084,255 A | 7/2000 | Ueda | |
| 6,084,437 A | 7/2000 | Sako | |
| 6,091,845 A | 7/2000 | Pierrat et al. | |
| 6,099,584 A | 8/2000 | Arnold et al. | |
| 6,100,025 A | 8/2000 | Wigler et al. | |
| 6,114,071 A | 9/2000 | Chen et al. | |
| 6,144,227 A | 11/2000 | Sato | |
| 6,159,839 A | 12/2000 | Jeng et al. | |
| 6,166,415 A | 12/2000 | Sakemi et al. | |
| 6,166,560 A | 12/2000 | Ogura et al. | |
| 6,174,742 B1 | 1/2001 | Sudhindranath et al. | |
| 6,182,272 B1 | 1/2001 | Andreev et al. | |
| 6,194,104 B1 | 2/2001 | Hsu | |
| 6,194,252 B1 | 2/2001 | Yamaguchi | |
| 6,194,912 B1 | 2/2001 | Or-Bach | |
| 6,209,123 B1 | 3/2001 | Maziasz et al. | |
| 6,230,299 B1 | 5/2001 | McSherry et al. | |
| 6,232,173 B1 | 5/2001 | Hsu et al. | |
| 6,240,542 B1 | 5/2001 | Kapur | |
| 6,249,902 B1 | 6/2001 | Igusa et al. | |
| 6,255,600 B1 | 7/2001 | Schaper | |
| 6,255,845 B1 | 7/2001 | Wong et al. | |
| 6,262,487 B1 | 7/2001 | Igarashi et al. | |
| 6,269,472 B1 | 7/2001 | Garza et al. | |

(56) References Cited

U.S. PATENT DOCUMENTS

| | | |
|---|---|---|
| 6,275,973 B1 | 8/2001 | Wein |
| 6,282,696 B1 | 8/2001 | Garza et al. |
| 6,291,276 B1 | 9/2001 | Gonzalez |
| 6,297,668 B1 | 10/2001 | Schober |
| 6,297,674 B1 | 10/2001 | Kono et al. |
| 6,303,252 B1 | 10/2001 | Lin |
| 6,331,733 B1 | 12/2001 | Or-Bach et al. |
| 6,331,791 B1 | 12/2001 | Huang |
| 6,335,250 B1 | 1/2002 | Egi |
| 6,338,972 B1 | 1/2002 | Sudhindranath et al. |
| 6,347,062 B2 | 2/2002 | Nii et al. |
| 6,356,112 B1 | 3/2002 | Tran et al. |
| 6,359,804 B2 | 3/2002 | Kuriyama et al. |
| 6,370,679 B1 | 4/2002 | Chang et al. |
| 6,378,110 B1 | 4/2002 | Ho |
| 6,380,592 B2 | 4/2002 | Tooher et al. |
| 6,388,296 B1 | 5/2002 | Hsu |
| 6,393,601 B1 | 5/2002 | Tanaka et al. |
| 6,399,972 B1 | 6/2002 | Masuda et al. |
| 6,400,183 B2 | 6/2002 | Yamashita et al. |
| 6,408,427 B1 * | 6/2002 | Cong .............. G06F 17/5077 716/129 |
| 6,415,421 B2 | 7/2002 | Anderson et al. |
| 6,416,907 B1 | 7/2002 | Winder et al. |
| 6,417,549 B1 | 7/2002 | Oh |
| 6,421,820 B1 | 7/2002 | Mansfield et al. |
| 6,425,112 B1 | 7/2002 | Bula et al. |
| 6,425,117 B1 | 7/2002 | Pasch et al. |
| 6,426,269 B1 | 7/2002 | Haffner et al. |
| 6,436,805 B1 | 8/2002 | Trivedi |
| 6,445,049 B1 | 9/2002 | Iranmanesh |
| 6,445,065 B1 | 9/2002 | Gheewala et al. |
| 6,467,072 B1 | 10/2002 | Yang et al. |
| 6,469,328 B2 | 10/2002 | Yanai et al. |
| 6,470,489 B1 | 10/2002 | Chang et al. |
| 6,476,493 B2 | 11/2002 | Or-Bach et al. |
| 6,477,695 B1 | 11/2002 | Gandhi |
| 6,480,032 B1 | 11/2002 | Aksamit |
| 6,480,989 B2 | 11/2002 | Chan et al. |
| 6,492,066 B1 | 12/2002 | Capodieci et al. |
| 6,496,965 B1 | 12/2002 | van Ginneken et al. |
| 6,504,186 B2 | 1/2003 | Kanamoto et al. |
| 6,505,327 B2 | 1/2003 | Lin |
| 6,505,328 B1 | 1/2003 | van Ginneken et al. |
| 6,507,941 B1 | 1/2003 | Leung et al. |
| 6,509,952 B1 | 1/2003 | Govil et al. |
| 6,514,849 B1 | 2/2003 | Hui et al. |
| 6,516,459 B1 | 2/2003 | Sahouria |
| 6,523,156 B2 | 2/2003 | Cirit |
| 6,525,350 B1 | 2/2003 | Kinoshita et al. |
| 6,536,028 B1 | 3/2003 | Katsioulas et al. |
| 6,543,039 B1 | 4/2003 | Watanabe |
| 6,553,544 B2 | 4/2003 | Tanaka et al. |
| 6,553,559 B2 | 4/2003 | Liebmann et al. |
| 6,553,562 B2 | 4/2003 | Capodieci et al. |
| 6,566,720 B2 | 5/2003 | Aldrich |
| 6,570,234 B1 | 5/2003 | Gardner |
| 6,571,140 B1 | 5/2003 | Wewalaarachchi |
| 6,571,379 B2 | 5/2003 | Takayama |
| 6,574,786 B1 | 6/2003 | Pohlenz et al. |
| 6,578,190 B2 | 6/2003 | Ferguson et al. |
| 6,583,041 B1 | 6/2003 | Capodieci |
| 6,588,005 B1 | 7/2003 | Kobayashi et al. |
| 6,590,289 B2 | 7/2003 | Shively |
| 6,591,207 B2 | 7/2003 | Naya et al. |
| 6,609,235 B2 | 8/2003 | Ramaswamy et al. |
| 6,610,607 B1 | 8/2003 | Armbrust et al. |
| 6,617,621 B1 | 9/2003 | Gheewala et al. |
| 6,620,561 B2 | 9/2003 | Winder et al. |
| 6,621,132 B2 | 9/2003 | Onishi et al. |
| 6,632,741 B1 | 10/2003 | Clevenger et al. |
| 6,633,182 B2 | 10/2003 | Pileggi et al. |
| 6,635,935 B2 | 10/2003 | Makino |
| 6,642,744 B2 | 11/2003 | Or-Bach et al. |
| 6,643,831 B2 | 11/2003 | Chang et al. |
| 6,650,014 B2 | 11/2003 | Kariyazaki |
| 6,661,041 B2 | 12/2003 | Keeth |
| 6,662,350 B2 | 12/2003 | Fried et al. |
| 6,664,587 B2 | 12/2003 | Guterman et al. |
| 6,673,638 B1 | 1/2004 | Bendik et al. |
| 6,677,649 B2 | 1/2004 | Minami et al. |
| 6,687,895 B2 | 2/2004 | Zhang |
| 6,690,206 B2 | 2/2004 | Rikino et al. |
| 6,691,297 B1 | 2/2004 | Misaka et al. |
| 6,700,405 B1 | 3/2004 | Hirairi |
| 6,703,170 B1 | 3/2004 | Pindo |
| 6,709,880 B2 | 3/2004 | Yamamoto et al. |
| 6,714,903 B1 | 3/2004 | Chu et al. |
| 6,732,334 B2 | 5/2004 | Nakatsuka |
| 6,732,338 B2 | 5/2004 | Crouse et al. |
| 6,732,344 B2 | 5/2004 | Sakamoto et al. |
| 6,734,506 B2 | 5/2004 | Oyamatsu |
| 6,737,199 B1 | 5/2004 | Hsieh |
| 6,737,318 B2 | 5/2004 | Murata et al. |
| 6,737,347 B1 | 5/2004 | Houston et al. |
| 6,745,372 B2 | 6/2004 | Cote et al. |
| 6,745,380 B2 | 6/2004 | Bodendorf et al. |
| 6,749,972 B2 | 6/2004 | Yu |
| 6,750,555 B2 | 6/2004 | Satomi et al. |
| 6,760,269 B2 | 7/2004 | Nakase et al. |
| 6,765,245 B2 | 7/2004 | Bansal |
| 6,777,138 B2 | 8/2004 | Pierrat et al. |
| 6,777,146 B1 | 8/2004 | Samuels |
| 6,787,823 B2 | 9/2004 | Shibutani |
| 6,789,244 B1 | 9/2004 | Dasasathyan et al. |
| 6,789,246 B1 | 9/2004 | Mohan et al. |
| 6,792,591 B2 | 9/2004 | Shi et al. |
| 6,792,593 B2 | 9/2004 | Takashima et al. |
| 6,794,677 B2 | 9/2004 | Tamaki et al. |
| 6,794,914 B2 | 9/2004 | Sani et al. |
| 6,795,332 B2 | 9/2004 | Yamaoka et al. |
| 6,795,358 B2 | 9/2004 | Tanaka et al. |
| 6,795,952 B1 | 9/2004 | Stine et al. |
| 6,795,953 B2 | 9/2004 | Bakarian et al. |
| 6,800,883 B2 | 10/2004 | Furuya et al. |
| 6,806,180 B2 | 10/2004 | Cho et al. |
| 6,807,663 B2 | 10/2004 | Cote et al. |
| 6,809,399 B2 | 10/2004 | Shimizu et al. |
| 6,812,574 B2 | 11/2004 | Tomita et al. |
| 6,818,389 B2 | 11/2004 | Fritze et al. |
| 6,818,929 B2 | 11/2004 | Tsutsumi et al. |
| 6,819,136 B2 | 11/2004 | Or-Bach |
| 6,820,248 B1 | 11/2004 | Gan |
| 6,826,738 B2 | 11/2004 | Cadouri |
| 6,834,375 B1 | 12/2004 | Stine et al. |
| 6,835,991 B2 * | 12/2004 | Pell, III .............. G03F 1/36 257/448 |
| 6,841,880 B2 | 1/2005 | Matsumoto et al. |
| 6,850,854 B2 | 2/2005 | Naya et al. |
| 6,854,096 B2 | 2/2005 | Eaton et al. |
| 6,854,100 B1 | 2/2005 | Chuang et al. |
| 6,867,073 B1 | 3/2005 | Enquist |
| 6,871,338 B2 | 3/2005 | Yamauchi |
| 6,872,990 B1 | 3/2005 | Kang |
| 6,877,144 B1 | 4/2005 | Rittman et al. |
| 6,881,523 B2 | 4/2005 | Smith |
| 6,884,712 B2 | 4/2005 | Yelehanka et al. |
| 6,885,045 B2 | 4/2005 | Hidaka |
| 6,889,370 B1 | 5/2005 | Kerzman et al. |
| 6,897,517 B2 | 5/2005 | Houdt et al. |
| 6,897,536 B2 | 5/2005 | Nomura et al. |
| 6,898,770 B2 | 5/2005 | Boluki et al. |
| 6,904,582 B1 | 6/2005 | Rittman et al. |
| 6,918,104 B2 | 7/2005 | Pierrat et al. |
| 6,920,079 B2 | 7/2005 | Shibayama |
| 6,921,982 B2 | 7/2005 | Joshi et al. |
| 6,922,354 B2 | 7/2005 | Ishikura et al. |
| 6,924,560 B2 | 8/2005 | Wang et al. |
| 6,928,635 B2 | 8/2005 | Pramanik et al. |
| 6,931,617 B2 | 8/2005 | Sanie et al. |
| 6,953,956 B2 | 10/2005 | Or-Bach et al. |
| 6,954,918 B2 | 10/2005 | Houston |
| 6,957,402 B2 | 10/2005 | Templeton et al. |
| 6,968,527 B2 | 11/2005 | Pierrat |

(56) References Cited

U.S. PATENT DOCUMENTS

| | | |
|---|---|---|
| 6,974,978 B1 | 12/2005 | Possley |
| 6,977,856 B2 | 12/2005 | Tanaka et al. |
| 6,978,436 B2 | 12/2005 | Cote et al. |
| 6,978,437 B1 | 12/2005 | Rittman et al. |
| 6,980,211 B2 | 12/2005 | Lin et al. |
| 6,992,394 B2 | 1/2006 | Park |
| 6,992,925 B2 | 1/2006 | Peng |
| 6,993,741 B2 | 1/2006 | Liebmann et al. |
| 6,994,939 B1 | 2/2006 | Ghandehari et al. |
| 6,998,722 B2 | 2/2006 | Madurawe |
| 7,003,068 B2 | 2/2006 | Kushner et al. |
| 7,009,862 B2 | 3/2006 | Higeta et al. |
| 7,016,214 B2 | 3/2006 | Kawamata |
| 7,022,559 B2 | 4/2006 | Barnak et al. |
| 7,028,285 B2 | 4/2006 | Cote et al. |
| 7,041,568 B2 | 5/2006 | Goldbach et al. |
| 7,052,972 B2 | 5/2006 | Sandhu et al. |
| 7,053,424 B2 | 5/2006 | Ono |
| 7,063,920 B2 | 6/2006 | Baba-Ali |
| 7,064,068 B2 | 6/2006 | Chou et al. |
| 7,065,731 B2 | 6/2006 | Jacques et al. |
| 7,079,413 B2 | 7/2006 | Tsukamoto et al. |
| 7,079,989 B2 | 7/2006 | Wimer |
| 7,093,208 B2 | 8/2006 | Williams et al. |
| 7,093,228 B2 | 8/2006 | Andreev et al. |
| 7,103,870 B2 | 9/2006 | Misaka et al. |
| 7,105,871 B2 | 9/2006 | Or-Bach et al. |
| 7,107,551 B1 | 9/2006 | de Dood et al. |
| 7,115,343 B2 | 10/2006 | Gordon et al. |
| 7,115,920 B2 | 10/2006 | Bernstein et al. |
| 7,120,882 B2 | 10/2006 | Kotani et al. |
| 7,124,386 B2 | 10/2006 | Smith et al. |
| 7,126,837 B1 | 10/2006 | Banachowicz et al. |
| 7,132,203 B2 | 11/2006 | Pierrat |
| 7,137,092 B2 | 11/2006 | Maeda |
| 7,141,853 B2 | 11/2006 | Campbell et al. |
| 7,143,380 B1 | 11/2006 | Anderson et al. |
| 7,149,999 B2 | 12/2006 | Kahng et al. |
| 7,152,215 B2 | 12/2006 | Smith et al. |
| 7,155,685 B2 | 12/2006 | Mori et al. |
| 7,155,689 B2 | 12/2006 | Pierrat et al. |
| 7,159,197 B2 | 1/2007 | Falbo et al. |
| 7,174,520 B2 | 2/2007 | White et al. |
| 7,175,940 B2 | 2/2007 | Laidig et al. |
| 7,176,508 B2 | 2/2007 | Joshi et al. |
| 7,177,215 B2 | 2/2007 | Tanaka et al. |
| 7,183,611 B2 | 2/2007 | Bhattacharyya |
| 7,185,294 B2 | 2/2007 | Zhang |
| 7,188,322 B2 | 3/2007 | Cohn et al. |
| 7,194,712 B2 | 3/2007 | Wu |
| 7,200,835 B2 | 4/2007 | Zhang et al. |
| 7,202,517 B2 | 4/2007 | Dixit et al. |
| 7,205,191 B2 | 4/2007 | Kobayashi |
| 7,208,794 B2 | 4/2007 | Hofmann et al. |
| 7,214,579 B2 | 5/2007 | Widdershoven et al. |
| 7,219,326 B2 | 5/2007 | Reed et al. |
| 7,221,031 B2 | 5/2007 | Ryoo et al. |
| 7,225,423 B2 | 5/2007 | Bhattacharya et al. |
| 7,227,183 B2 | 6/2007 | Donze et al. |
| 7,228,510 B2 | 6/2007 | Ono |
| 7,231,628 B2 | 6/2007 | Pack et al. |
| 7,235,424 B2 | 6/2007 | Chen et al. |
| 7,243,316 B2 | 7/2007 | White et al. |
| 7,252,909 B2 | 8/2007 | Shin et al. |
| 7,257,017 B2 | 8/2007 | Liaw |
| 7,264,990 B2 | 9/2007 | Rueckes et al. |
| 7,266,787 B2 | 9/2007 | Hughes et al. |
| 7,269,803 B2 | 9/2007 | Khakzadi et al. |
| 7,278,118 B2 | 10/2007 | Pileggi et al. |
| 7,279,727 B2 | 10/2007 | Ikoma et al. |
| 7,287,320 B2 | 10/2007 | Wang et al. |
| 7,294,534 B2 | 11/2007 | Iwaki |
| 7,302,651 B2 | 11/2007 | Allen et al. |
| 7,308,669 B2 | 12/2007 | Buehler et al. |
| 7,312,003 B2 | 12/2007 | Cote et al. |
| 7,315,994 B2 | 1/2008 | Aller et al. |
| 7,327,591 B2 | 2/2008 | Sadra et al. |
| 7,329,938 B2 | 2/2008 | Kinoshita |
| 7,335,966 B2 | 2/2008 | Ihme et al. |
| 7,337,421 B2 | 2/2008 | Kamat |
| 7,338,896 B2 | 3/2008 | Vanhaelemeersch et al. |
| 7,345,909 B2 | 3/2008 | Chang et al. |
| 7,346,885 B2 | 3/2008 | Semmler |
| 7,350,183 B2 | 3/2008 | Cui et al. |
| 7,353,492 B2 | 4/2008 | Gupta et al. |
| 7,358,131 B2 | 4/2008 | Bhattacharyya |
| 7,360,179 B2 | 4/2008 | Smith et al. |
| 7,360,198 B2 | 4/2008 | Rana et al. |
| 7,366,997 B1 | 4/2008 | Rahmat et al. |
| 7,367,008 B2 | 4/2008 | White et al. |
| 7,376,931 B2 | 5/2008 | Kokubun |
| 7,383,521 B2 | 6/2008 | Smith et al. |
| 7,397,260 B2 | 7/2008 | Chanda et al. |
| 7,400,627 B2 | 7/2008 | Wu et al. |
| 7,402,848 B2 | 7/2008 | Chang et al. |
| 7,404,154 B1 | 7/2008 | Venkatraman et al. |
| 7,404,173 B2 | 7/2008 | Wu et al. |
| 7,411,252 B2 | 8/2008 | Anderson et al. |
| 7,421,678 B2 | 9/2008 | Barnes et al. |
| 7,423,298 B2 | 9/2008 | Mariyama et al. |
| 7,424,694 B2 | 9/2008 | Ikeda |
| 7,424,695 B2 | 9/2008 | Tamura et al. |
| 7,424,696 B2 | 9/2008 | Vogel et al. |
| 7,426,710 B2 | 9/2008 | Zhang et al. |
| 7,432,562 B2 | 10/2008 | Bhattacharyya |
| 7,434,185 B2 | 10/2008 | Dooling et al. |
| 7,441,211 B1 | 10/2008 | Gupta et al. |
| 7,442,630 B2 | 10/2008 | Kelberlau et al. |
| 7,444,609 B2 | 10/2008 | Charlebois et al. |
| 7,446,352 B2 | 11/2008 | Becker et al. |
| 7,449,371 B2 | 11/2008 | Kemerling et al. |
| 7,458,045 B2 | 11/2008 | Cote et al. |
| 7,459,792 B2 | 12/2008 | Chen |
| 7,465,973 B2 | 12/2008 | Chang et al. |
| 7,466,607 B2 | 12/2008 | Hollis et al. |
| 7,469,396 B2 | 12/2008 | Hayashi et al. |
| 7,480,880 B2 | 1/2009 | Visweswariah et al. |
| 7,480,891 B2 | 1/2009 | Sezginer |
| 7,484,197 B2 | 1/2009 | Allen et al. |
| 7,485,934 B2 | 2/2009 | Liaw |
| 7,487,475 B1 | 2/2009 | Kriplani et al. |
| 7,492,013 B2 | 2/2009 | Correale, Jr. |
| 7,500,211 B2 | 3/2009 | Komaki |
| 7,502,275 B2 | 3/2009 | Nii et al. |
| 7,503,026 B2 | 3/2009 | Ichiryu et al. |
| 7,504,184 B2 | 3/2009 | Hung et al. |
| 7,506,300 B2 | 3/2009 | Sezginer et al. |
| 7,508,238 B2 | 3/2009 | Yamagami |
| 7,509,621 B2 | 3/2009 | Melvin, III |
| 7,509,622 B2 | 3/2009 | Sinha et al. |
| 7,512,017 B2 | 3/2009 | Chang |
| 7,512,921 B2 | 3/2009 | Shibuya |
| 7,514,355 B2 | 4/2009 | Katase |
| 7,514,959 B2 | 4/2009 | Or-Bach et al. |
| 7,523,429 B2 | 4/2009 | Kroyan et al. |
| 7,527,900 B2 | 5/2009 | Zhou et al. |
| 7,538,368 B2 | 5/2009 | Yano |
| 7,543,262 B2 | 6/2009 | Wang et al. |
| 7,563,701 B2 | 7/2009 | Chang et al. |
| 7,564,134 B2 | 7/2009 | Lee et al. |
| 7,568,174 B2 | 7/2009 | Sezginer et al. |
| 7,569,309 B2 | 8/2009 | Blatchford et al. |
| 7,569,310 B2 | 8/2009 | Wallace et al. |
| 7,569,894 B2 | 8/2009 | Suzuki |
| 7,575,973 B2 | 8/2009 | Mokhlesi et al. |
| 7,598,541 B2 | 10/2009 | Okamoto et al. |
| 7,598,558 B2 | 10/2009 | Hashimoto et al. |
| 7,614,030 B2 | 11/2009 | Hsu |
| 7,625,790 B2 | 12/2009 | Yang |
| 7,632,610 B2 | 12/2009 | Wallace et al. |
| 7,640,522 B2 | 12/2009 | Gupta et al. |
| 7,646,651 B2 | 1/2010 | Lee et al. |
| 7,653,884 B2 | 1/2010 | Furnish et al. |
| 7,665,051 B2 | 2/2010 | Ludwig et al. |

(56) References Cited

U.S. PATENT DOCUMENTS

| | | |
|---|---|---|
| 7,700,466 B2 | 4/2010 | Booth et al. |
| 7,712,056 B2 | 5/2010 | White et al. |
| 7,739,627 B2 | 6/2010 | Chew et al. |
| 7,749,662 B2 | 7/2010 | Matthew et al. |
| 7,755,110 B2 | 7/2010 | Gliese et al. |
| 7,770,144 B2 | 8/2010 | Dellinger |
| 7,791,109 B2 | 9/2010 | Wann et al. |
| 7,802,219 B2 | 9/2010 | Tomar et al. |
| 7,825,437 B2 | 11/2010 | Pillarisetty et al. |
| 7,842,975 B2 | 11/2010 | Becker et al. |
| 7,873,929 B2 | 1/2011 | Kahng et al. |
| 7,882,456 B2 | 2/2011 | Zach |
| 7,888,705 B2 | 2/2011 | Becker et al. |
| 7,898,040 B2 | 3/2011 | Nawaz |
| 7,906,801 B2 | 3/2011 | Becker et al. |
| 7,908,578 B2 | 3/2011 | Becker et al. |
| 7,910,958 B2 | 3/2011 | Becker et al. |
| 7,910,959 B2 | 3/2011 | Becker et al. |
| 7,917,877 B2 | 3/2011 | Singh et al. |
| 7,917,879 B2 | 3/2011 | Becker et al. |
| 7,923,266 B2 | 4/2011 | Thijs et al. |
| 7,923,337 B2 | 4/2011 | Chang et al. |
| 7,923,757 B2 | 4/2011 | Becker et al. |
| 7,926,001 B2 | 4/2011 | Pierrat |
| 7,932,544 B2 | 4/2011 | Becker et al. |
| 7,932,545 B2 | 4/2011 | Becker et al. |
| 7,934,184 B2 | 4/2011 | Zhang |
| 7,939,443 B2 * | 5/2011 | Fox et al. ............... 438/599 |
| 7,943,966 B2 | 5/2011 | Becker et al. |
| 7,943,967 B2 | 5/2011 | Becker et al. |
| 7,948,012 B2 | 5/2011 | Becker et al. |
| 7,948,013 B2 | 5/2011 | Becker et al. |
| 7,952,119 B2 | 5/2011 | Becker et al. |
| 7,956,421 B2 | 6/2011 | Becker |
| 7,958,465 B2 | 6/2011 | Lu et al. |
| 7,962,867 B2 | 6/2011 | White et al. |
| 7,962,879 B2 | 6/2011 | Tang et al. |
| 7,964,267 B1 | 6/2011 | Lyons et al. |
| 7,971,160 B2 | 6/2011 | Osawa et al. |
| 7,989,847 B2 | 8/2011 | Becker et al. |
| 7,989,848 B2 | 8/2011 | Becker et al. |
| 7,992,122 B1 | 8/2011 | Burstein et al. |
| 7,994,583 B2 | 8/2011 | Inaba |
| 8,004,042 B2 | 8/2011 | Yang et al. |
| 8,022,441 B2 | 9/2011 | Becker et al. |
| 8,030,689 B2 | 10/2011 | Becker et al. |
| 8,035,133 B2 | 10/2011 | Becker et al. |
| 8,044,437 B1 | 10/2011 | Venkatraman et al. |
| 8,058,671 B2 | 11/2011 | Becker et al. |
| 8,058,690 B2 | 11/2011 | Chang |
| 8,072,003 B2 | 12/2011 | Becker et al. |
| 8,072,053 B2 | 12/2011 | Li |
| 8,088,679 B2 | 1/2012 | Becker et al. |
| 8,088,680 B2 | 1/2012 | Becker et al. |
| 8,088,681 B2 | 1/2012 | Becker et al. |
| 8,088,682 B2 | 1/2012 | Becker et al. |
| 8,089,098 B2 | 1/2012 | Becker et al. |
| 8,089,099 B2 | 1/2012 | Becker et al. |
| 8,089,100 B2 | 1/2012 | Becker et al. |
| 8,089,101 B2 | 1/2012 | Becker et al. |
| 8,089,102 B2 | 1/2012 | Becker et al. |
| 8,089,103 B2 | 1/2012 | Becker et al. |
| 8,089,104 B2 | 1/2012 | Becker et al. |
| 8,101,975 B2 | 1/2012 | Becker et al. |
| 8,110,854 B2 | 2/2012 | Becker et al. |
| 8,129,750 B2 | 3/2012 | Becker et al. |
| 8,129,751 B2 | 3/2012 | Becker et al. |
| 8,129,752 B2 | 3/2012 | Becker et al. |
| 8,129,754 B2 | 3/2012 | Becker et al. |
| 8,129,755 B2 | 3/2012 | Becker et al. |
| 8,129,756 B2 | 3/2012 | Becker et al. |
| 8,129,757 B2 | 3/2012 | Becker et al. |
| 8,129,819 B2 | 3/2012 | Becker et al. |
| 8,130,529 B2 | 3/2012 | Tanaka |
| 8,134,183 B2 | 3/2012 | Becker et al. |
| 8,134,184 B2 | 3/2012 | Becker et al. |
| 8,134,185 B2 | 3/2012 | Becker et al. |
| 8,134,186 B2 | 3/2012 | Becker et al. |
| 8,138,525 B2 | 3/2012 | Becker et al. |
| 8,161,427 B2 | 4/2012 | Morgenshtein et al. |
| 8,178,905 B2 | 5/2012 | Toubou |
| 8,178,909 B2 | 5/2012 | Venkatraman et al. |
| 8,198,656 B2 | 6/2012 | Becker et al. |
| 8,207,053 B2 | 6/2012 | Becker et al. |
| 8,214,778 B2 | 7/2012 | Quandt et al. |
| 8,217,428 B2 | 7/2012 | Becker et al. |
| 8,225,239 B2 | 7/2012 | Reed et al. |
| 8,225,261 B2 * | 7/2012 | Hong et al. ............... 716/122 |
| 8,245,180 B2 | 8/2012 | Smayling et al. |
| 8,247,846 B2 | 8/2012 | Becker |
| 8,253,172 B2 | 8/2012 | Becker et al. |
| 8,253,173 B2 | 8/2012 | Becker et al. |
| 8,258,547 B2 | 9/2012 | Becker et al. |
| 8,258,548 B2 | 9/2012 | Becker et al. |
| 8,258,549 B2 | 9/2012 | Becker et al. |
| 8,258,550 B2 | 9/2012 | Becker et al. |
| 8,258,551 B2 | 9/2012 | Becker et al. |
| 8,258,552 B2 | 9/2012 | Becker et al. |
| 8,258,581 B2 | 9/2012 | Becker et al. |
| 8,264,007 B2 | 9/2012 | Becker et al. |
| 8,264,008 B2 | 9/2012 | Becker et al. |
| 8,264,009 B2 | 9/2012 | Becker et al. |
| 8,283,701 B2 | 10/2012 | Becker et al. |
| 8,294,212 B2 | 10/2012 | Wang et al. |
| 8,316,327 B2 | 11/2012 | Herold |
| 8,356,268 B2 | 1/2013 | Becker et al. |
| 8,378,407 B2 | 2/2013 | Audzeyeu et al. |
| 8,395,224 B2 | 3/2013 | Becker et al. |
| 8,402,397 B2 | 3/2013 | Robles et al. |
| 8,405,163 B2 | 3/2013 | Becker et al. |
| 8,422,274 B2 | 4/2013 | Tomita et al. |
| 8,436,400 B2 | 5/2013 | Becker et al. |
| 8,453,094 B2 | 5/2013 | Kornachuk et al. |
| 8,575,706 B2 | 11/2013 | Becker et al. |
| 8,667,443 B2 | 3/2014 | Smayling et al. |
| 8,701,071 B2 | 4/2014 | Kornachuk et al. |
| 8,735,995 B2 | 5/2014 | Becker et al. |
| 8,756,551 B2 | 6/2014 | Becker et al. |
| 8,836,045 B2 | 9/2014 | Becker et al. |
| 8,839,162 B2 | 9/2014 | Amundson et al. |
| 8,839,175 B2 | 9/2014 | Smayling et al. |
| 8,847,329 B2 | 9/2014 | Becker et al. |
| 8,863,063 B2 | 10/2014 | Becker et al. |
| 9,202,779 B2 | 12/2015 | Kornachuk et al. |
| 9,336,344 B2 | 5/2016 | Smayling |
| 2001/0049813 A1 * | 12/2001 | Chan et al. ............... 716/8 |
| 2002/0003270 A1 | 1/2002 | Makino |
| 2002/0015899 A1 | 2/2002 | Chen et al. |
| 2002/0030510 A1 | 3/2002 | Kono et al. |
| 2002/0063582 A1 | 5/2002 | Rikino |
| 2002/0068423 A1 | 6/2002 | Park et al. |
| 2002/0079927 A1 | 6/2002 | Katoh et al. |
| 2002/0149392 A1 | 10/2002 | Cho |
| 2002/0166107 A1 | 11/2002 | Capodieci et al. |
| 2002/0194575 A1 | 12/2002 | Allen et al. |
| 2003/0042930 A1 | 3/2003 | Pileggi et al. |
| 2003/0046653 A1 | 3/2003 | Liu |
| 2003/0061592 A1 | 3/2003 | Agrawal et al. |
| 2003/0088839 A1 | 5/2003 | Watanabe |
| 2003/0088842 A1 | 5/2003 | Cirit |
| 2003/0103176 A1 | 6/2003 | Abe et al. |
| 2003/0106037 A1 | 6/2003 | Moniwa et al. |
| 2003/0117168 A1 | 6/2003 | Uneme et al. |
| 2003/0124847 A1 | 7/2003 | Houston et al. |
| 2003/0125917 A1 | 7/2003 | Rich et al. |
| 2003/0126569 A1 | 7/2003 | Rich et al. |
| 2003/0145288 A1 | 7/2003 | Wang et al. |
| 2003/0145299 A1 | 7/2003 | Fried et al. |
| 2003/0177465 A1 | 9/2003 | MacLean et al. |
| 2003/0185076 A1 | 10/2003 | Worley |
| 2003/0203287 A1 | 10/2003 | Miyagawa |
| 2003/0229868 A1 | 12/2003 | White et al. |
| 2003/0229875 A1 | 12/2003 | Smith et al. |
| 2004/0029372 A1 | 2/2004 | Jang et al. |

(56) References Cited

U.S. PATENT DOCUMENTS

| | | |
|---|---|---|
| 2004/0049754 A1 | 3/2004 | Liao et al. |
| 2004/0063038 A1 | 4/2004 | Shin et al. |
| 2004/0115539 A1 | 6/2004 | Broeke et al. |
| 2004/0139412 A1 | 7/2004 | Ito et al. |
| 2004/0145028 A1 | 7/2004 | Matsumoto et al. |
| 2004/0153979 A1 | 8/2004 | Chang |
| 2004/0161878 A1 | 8/2004 | Or-Bach et al. |
| 2004/0164360 A1 | 8/2004 | Nishida et al. |
| 2004/0169201 A1 | 9/2004 | Hidaka |
| 2004/0194050 A1 | 9/2004 | Hwang et al. |
| 2004/0196705 A1 | 10/2004 | Ishikura et al. |
| 2004/0229135 A1 | 11/2004 | Wang et al. |
| 2004/0232444 A1 | 11/2004 | Shimizu |
| 2004/0243966 A1 | 12/2004 | Dellinger |
| 2004/0262640 A1 | 12/2004 | Suga |
| 2005/0009312 A1 | 1/2005 | Butt et al. |
| 2005/0009344 A1 | 1/2005 | Hwang et al. |
| 2005/0012157 A1 | 1/2005 | Cho et al. |
| 2005/0044522 A1* | 2/2005 | Maeda ............... 716/18 |
| 2005/0055828 A1 | 3/2005 | Wang et al. |
| 2005/0076320 A1 | 4/2005 | Maeda |
| 2005/0087806 A1 | 4/2005 | Hokazono |
| 2005/0093147 A1 | 5/2005 | Tu |
| 2005/0101112 A1 | 5/2005 | Rueckes et al. |
| 2005/0110130 A1 | 5/2005 | Kitabayashi et al. |
| 2005/0135134 A1 | 6/2005 | Yen |
| 2005/0136340 A1 | 6/2005 | Baselmans et al. |
| 2005/0138598 A1 | 6/2005 | Kokubun |
| 2005/0156200 A1 | 7/2005 | Kinoshita |
| 2005/0185325 A1 | 8/2005 | Hur |
| 2005/0189604 A1 | 9/2005 | Gupta et al. |
| 2005/0189614 A1 | 9/2005 | Ihme et al. |
| 2005/0196685 A1 | 9/2005 | Wang et al. |
| 2005/0205894 A1 | 9/2005 | Sumikawa et al. |
| 2005/0212018 A1 | 9/2005 | Schoellkopf et al. |
| 2005/0224982 A1 | 10/2005 | Kemerling et al. |
| 2005/0229130 A1 | 10/2005 | Wu et al. |
| 2005/0251771 A1 | 11/2005 | Robles |
| 2005/0264320 A1 | 12/2005 | Chan et al. |
| 2005/0264324 A1 | 12/2005 | Nakazato |
| 2005/0266621 A1 | 12/2005 | Kim |
| 2005/0268256 A1 | 12/2005 | Tsai et al. |
| 2005/0278673 A1 | 12/2005 | Kawachi |
| 2005/0280031 A1 | 12/2005 | Yano |
| 2006/0036976 A1* | 2/2006 | Cohn ............... G06F 17/505 716/119 |
| 2006/0038234 A1 | 2/2006 | Liaw |
| 2006/0063334 A1 | 3/2006 | Donze et al. |
| 2006/0070018 A1 | 3/2006 | Semmler |
| 2006/0084261 A1 | 4/2006 | Iwaki |
| 2006/0091550 A1 | 5/2006 | Shimazaki et al. |
| 2006/0095872 A1 | 5/2006 | McElvain |
| 2006/0101370 A1 | 5/2006 | Cui et al. |
| 2006/0112355 A1 | 5/2006 | Pileggi et al. |
| 2006/0113533 A1 | 6/2006 | Tamaki et al. |
| 2006/0113567 A1 | 6/2006 | Ohmori et al. |
| 2006/0120143 A1 | 6/2006 | Liaw |
| 2006/0121715 A1 | 6/2006 | Chang et al. |
| 2006/0123376 A1 | 6/2006 | Vogel et al. |
| 2006/0125024 A1 | 6/2006 | Ishigaki |
| 2006/0131609 A1 | 6/2006 | Kinoshita et al. |
| 2006/0136848 A1 | 6/2006 | Ichiryu et al. |
| 2006/0146638 A1 | 7/2006 | Chang et al. |
| 2006/0151810 A1 | 7/2006 | Ohshige |
| 2006/0158270 A1 | 7/2006 | Gibet et al. |
| 2006/0170108 A1* | 8/2006 | Hiroi ............... H01L 23/564 257/774 |
| 2006/0177744 A1 | 8/2006 | Bodendorf et al. |
| 2006/0181310 A1 | 8/2006 | Rhee |
| 2006/0195809 A1 | 8/2006 | Cohn et al. |
| 2006/0195810 A1* | 8/2006 | Morton ............... 716/14 |
| 2006/0197557 A1 | 9/2006 | Chung |
| 2006/0206854 A1 | 9/2006 | Barnes et al. |
| 2006/0223302 A1 | 10/2006 | Chang et al. |
| 2006/0248495 A1 | 11/2006 | Sezginer |
| 2006/0261417 A1 | 11/2006 | Suzuki |
| 2006/0277521 A1 | 12/2006 | Chen |
| 2007/0001304 A1 | 1/2007 | Liaw |
| 2007/0002617 A1 | 1/2007 | Houston |
| 2007/0004147 A1 | 1/2007 | Toubou |
| 2007/0007574 A1 | 1/2007 | Ohsawa |
| 2007/0038973 A1 | 2/2007 | Li et al. |
| 2007/0074145 A1 | 3/2007 | Tanaka |
| 2007/0094634 A1 | 4/2007 | Seizginer et al. |
| 2007/0101305 A1 | 5/2007 | Smith et al. |
| 2007/0105023 A1 | 5/2007 | Zhou et al. |
| 2007/0106971 A1 | 5/2007 | Lien et al. |
| 2007/0113216 A1 | 5/2007 | Zhang |
| 2007/0172770 A1 | 7/2007 | Witters et al. |
| 2007/0186196 A1 | 8/2007 | Tanaka |
| 2007/0196958 A1 | 8/2007 | Bhattacharya et al. |
| 2007/0209029 A1 | 9/2007 | Ivonin et al. |
| 2007/0210391 A1 | 9/2007 | Becker et al. |
| 2007/0234252 A1 | 10/2007 | Visweswariah et al. |
| 2007/0234262 A1 | 10/2007 | Uedi et al. |
| 2007/0241810 A1 | 10/2007 | Onda |
| 2007/0256039 A1 | 11/2007 | White |
| 2007/0257277 A1 | 11/2007 | Takeda et al. |
| 2007/0264758 A1 | 11/2007 | Correale |
| 2007/0274140 A1 | 11/2007 | Joshi et al. |
| 2007/0277129 A1 | 11/2007 | Allen et al. |
| 2007/0288882 A1 | 12/2007 | Kniffin et al. |
| 2007/0290361 A1 | 12/2007 | Chen |
| 2007/0294652 A1 | 12/2007 | Bowen |
| 2007/0297249 A1 | 12/2007 | Chang et al. |
| 2008/0001176 A1 | 1/2008 | Gopalakrishnan |
| 2008/0005712 A1 | 1/2008 | Charlebois et al. |
| 2008/0021689 A1 | 1/2008 | Yamashita et al. |
| 2008/0022247 A1 | 1/2008 | Kojima et al. |
| 2008/0046846 A1 | 2/2008 | Chew et al. |
| 2008/0081472 A1 | 4/2008 | Tanaka |
| 2008/0082952 A1 | 4/2008 | O'Brien |
| 2008/0086712 A1 | 4/2008 | Fujimoto |
| 2008/0097641 A1 | 4/2008 | Miyashita et al. |
| 2008/0098334 A1 | 4/2008 | Pileggi et al. |
| 2008/0098341 A1 | 4/2008 | Kobayashi et al. |
| 2008/0099795 A1 | 5/2008 | Bernstein et al. |
| 2008/0127000 A1 | 5/2008 | Majumder et al. |
| 2008/0127029 A1 | 5/2008 | Graur et al. |
| 2008/0134128 A1 | 6/2008 | Blatchford et al. |
| 2008/0144361 A1 | 6/2008 | Wong |
| 2008/0148216 A1 | 6/2008 | Chan et al. |
| 2008/0163141 A1 | 7/2008 | Scheffer et al. |
| 2008/0168406 A1 | 7/2008 | Rahmat et al. |
| 2008/0211028 A1 | 9/2008 | Suzuki |
| 2008/0216207 A1 | 9/2008 | Tsai |
| 2008/0244494 A1 | 10/2008 | McCullen |
| 2008/0251779 A1 | 10/2008 | Kakoschke et al. |
| 2008/0265290 A1 | 10/2008 | Nielsen et al. |
| 2008/0276105 A1 | 11/2008 | Hoberman et al. |
| 2008/0283910 A1 | 11/2008 | Dreeskornfeld et al. |
| 2008/0285331 A1 | 11/2008 | Torok et al. |
| 2008/0308848 A1 | 12/2008 | Inaba |
| 2008/0308880 A1 | 12/2008 | Inaba |
| 2008/0315258 A1 | 12/2008 | Masuda et al. |
| 2009/0014811 A1 | 1/2009 | Becker et al. |
| 2009/0024974 A1 | 1/2009 | Yamada |
| 2009/0031261 A1 | 1/2009 | Smith et al. |
| 2009/0032898 A1 | 2/2009 | Becker et al. |
| 2009/0032967 A1 | 2/2009 | Becker et al. |
| 2009/0037864 A1 | 2/2009 | Becker et al. |
| 2009/0057780 A1 | 3/2009 | Wong et al. |
| 2009/0075485 A1 | 3/2009 | Ban et al. |
| 2009/0077524 A1 | 3/2009 | Nagamura |
| 2009/0085067 A1 | 4/2009 | Hayashi et al. |
| 2009/0087991 A1 | 4/2009 | Yatsuda et al. |
| 2009/0101940 A1 | 4/2009 | Barrows et al. |
| 2009/0106714 A1 | 4/2009 | Culp et al. |
| 2009/0155990 A1 | 6/2009 | Yanagidaira et al. |
| 2009/0181314 A1 | 7/2009 | Shyu et al. |
| 2009/0187871 A1 | 7/2009 | Cork |
| 2009/0206443 A1 | 8/2009 | Juengling |
| 2009/0224408 A1 | 9/2009 | Fox |
| 2009/0228853 A1 | 9/2009 | Hong et al. |

(56) References Cited

U.S. PATENT DOCUMENTS

| | | |
|---|---|---|
| 2009/0228857 A1 | 9/2009 | Kornachuk et al. |
| 2009/0235215 A1 | 9/2009 | Lavin |
| 2009/0273100 A1 | 11/2009 | Aton et al. |
| 2009/0280582 A1 | 11/2009 | Thijs et al. |
| 2009/0302372 A1 | 12/2009 | Chang et al. |
| 2009/0319977 A1 | 12/2009 | Saxena et al. |
| 2010/0001321 A1 | 1/2010 | Becker et al. |
| 2010/0006897 A1 | 1/2010 | Becker et al. |
| 2010/0006898 A1 | 1/2010 | Becker et al. |
| 2010/0006899 A1 | 1/2010 | Becker et al. |
| 2010/0006900 A1 | 1/2010 | Becker et al. |
| 2010/0006901 A1 | 1/2010 | Becker et al. |
| 2010/0006902 A1 | 1/2010 | Becker et al. |
| 2010/0006903 A1 | 1/2010 | Becker et al. |
| 2010/0006947 A1 | 1/2010 | Becker et al. |
| 2010/0006948 A1 | 1/2010 | Becker et al. |
| 2010/0006950 A1 | 1/2010 | Becker et al. |
| 2010/0006951 A1 | 1/2010 | Becker et al. |
| 2010/0006986 A1 | 1/2010 | Becker et al. |
| 2010/0011327 A1 | 1/2010 | Becker et al. |
| 2010/0011328 A1 | 1/2010 | Becker et al. |
| 2010/0011329 A1 | 1/2010 | Becker et al. |
| 2010/0011330 A1 | 1/2010 | Becker et al. |
| 2010/0011331 A1 | 1/2010 | Becker et al. |
| 2010/0011332 A1 | 1/2010 | Becker et al. |
| 2010/0011333 A1 | 1/2010 | Becker et al. |
| 2010/0012981 A1 | 1/2010 | Becker et al. |
| 2010/0012982 A1 | 1/2010 | Becker et al. |
| 2010/0012983 A1 | 1/2010 | Becker et al. |
| 2010/0012984 A1 | 1/2010 | Becker et al. |
| 2010/0012985 A1 | 1/2010 | Becker et al. |
| 2010/0012986 A1 | 1/2010 | Becker et al. |
| 2010/0017766 A1 | 1/2010 | Becker et al. |
| 2010/0017767 A1 | 1/2010 | Becker et al. |
| 2010/0017768 A1 | 1/2010 | Becker et al. |
| 2010/0017769 A1 | 1/2010 | Becker et al. |
| 2010/0017770 A1 | 1/2010 | Becker et al. |
| 2010/0017771 A1 | 1/2010 | Becker et al. |
| 2010/0017772 A1 | 1/2010 | Becker et al. |
| 2010/0019280 A1 | 1/2010 | Becker et al. |
| 2010/0019281 A1 | 1/2010 | Becker et al. |
| 2010/0019282 A1 | 1/2010 | Becker et al. |
| 2010/0019283 A1 | 1/2010 | Becker et al. |
| 2010/0019284 A1 | 1/2010 | Becker et al. |
| 2010/0019285 A1 | 1/2010 | Becker et al. |
| 2010/0019286 A1 | 1/2010 | Becker et al. |
| 2010/0019287 A1 | 1/2010 | Becker et al. |
| 2010/0019288 A1 | 1/2010 | Becker et al. |
| 2010/0019308 A1 | 1/2010 | Chan et al. |
| 2010/0023906 A1 | 1/2010 | Becker et al. |
| 2010/0023907 A1 | 1/2010 | Becker et al. |
| 2010/0023908 A1 | 1/2010 | Becker et al. |
| 2010/0023911 A1 | 1/2010 | Becker et al. |
| 2010/0025731 A1 | 2/2010 | Becker et al. |
| 2010/0025732 A1 | 2/2010 | Becker et al. |
| 2010/0025733 A1 | 2/2010 | Becker et al. |
| 2010/0025734 A1 | 2/2010 | Becker et al. |
| 2010/0025735 A1 | 2/2010 | Becker et al. |
| 2010/0025736 A1 | 2/2010 | Becker et al. |
| 2010/0032722 A1 | 2/2010 | Becker et al. |
| 2010/0032723 A1 | 2/2010 | Becker et al. |
| 2010/0032724 A1 | 2/2010 | Becker et al. |
| 2010/0032726 A1 | 2/2010 | Becker et al. |
| 2010/0037194 A1 | 2/2010 | Becker et al. |
| 2010/0037195 A1 | 2/2010 | Becker et al. |
| 2010/0096671 A1 | 4/2010 | Becker et al. |
| 2010/0115484 A1 | 5/2010 | Frederick |
| 2010/0203689 A1 | 8/2010 | Bernstein et al. |
| 2010/0224943 A1 | 9/2010 | Kawasaki |
| 2010/0229140 A1 | 9/2010 | Strolenberg et al. |
| 2010/0232212 A1 | 9/2010 | Anderson et al. |
| 2010/0252865 A1 | 10/2010 | Van Der Zanden |
| 2010/0252896 A1 | 10/2010 | Smayling |
| 2010/0264468 A1 | 10/2010 | Xu |
| 2010/0270681 A1 | 10/2010 | Bird et al. |
| 2010/0287518 A1 | 11/2010 | Becker |
| 2010/0301482 A1 | 12/2010 | Schultz et al. |
| 2011/0016909 A1 | 1/2011 | Mirza et al. |
| 2011/0108890 A1 | 5/2011 | Becker et al. |
| 2011/0108891 A1 | 5/2011 | Becker et al. |
| 2011/0154281 A1 | 6/2011 | Zach |
| 2011/0207298 A1 | 8/2011 | Anderson et al. |
| 2011/0260253 A1 | 10/2011 | Inaba |
| 2011/0298025 A1 | 12/2011 | Haensch et al. |
| 2011/0317477 A1 | 12/2011 | Liaw |
| 2012/0012932 A1 | 1/2012 | Perng et al. |
| 2012/0118854 A1 | 5/2012 | Smayling |
| 2012/0273841 A1 | 11/2012 | Quandt et al. |
| 2013/0097574 A1 | 4/2013 | Balabanov et al. |
| 2013/0200465 A1 | 8/2013 | Becker et al. |
| 2013/0200469 A1 | 8/2013 | Becker et al. |
| 2013/0207198 A1 | 8/2013 | Becker et al. |
| 2013/0207199 A1 | 8/2013 | Becker et al. |
| 2013/0254732 A1 | 9/2013 | Kornachuk et al. |
| 2014/0197543 A1 | 7/2014 | Kornachuk et al. |
| 2015/0249041 A1 | 9/2015 | Becker et al. |
| 2015/0270218 A1 | 9/2015 | Becker et al. |

FOREIGN PATENT DOCUMENTS

| | | |
|---|---|---|
| EP | 1394858 | 3/2004 |
| EP | 1670062 | 6/2006 |
| EP | 1833091 | 8/2007 |
| EP | 1730777 | 9/2007 |
| EP | 2251901 | 11/2010 |
| FR | 2860920 | 4/2005 |
| JP | 58-182242 | 10/1983 |
| JP | 58-215827 | 12/1983 |
| JP | 61-182244 | 8/1986 |
| JP | S63-310136 A | 12/1988 |
| JP | H01284115 | 11/1989 |
| JP | 03-165061 | 7/1991 |
| JP | H05152937 A | 6/1993 |
| JP | H05211437 | 8/1993 |
| JP | H05218362 | 8/1993 |
| JP | H07-153927 A | 6/1995 |
| JP | 2684980 | 7/1995 |
| JP | 1995-302706 | 11/1995 |
| JP | 1997-09289251 A | 11/1997 |
| JP | 10-116911 | 5/1998 |
| JP | 1999-045948 | 2/1999 |
| JP | 2001-068558 | 3/2001 |
| JP | 2001-168707 | 6/2001 |
| JP | 2002-026125 | 1/2002 |
| JP | 2002-026296 A | 1/2002 |
| JP | 2002-184870 A | 6/2002 |
| JP | 2001-056463 | 9/2002 |
| JP | 2002-258463 | 9/2002 |
| JP | 2002-289703 | 10/2002 |
| JP | 2001-272228 | 3/2003 |
| JP | 2003-100872 | 4/2003 |
| JP | 2003-264231 | 9/2003 |
| JP | 2004-013920 | 1/2004 |
| JP | 2004-200300 | 7/2004 |
| JP | 2004-241529 | 8/2004 |
| JP | 2004-342757 A | 12/2004 |
| JP | 2005-020008 | 1/2005 |
| JP | 2003-359375 | 5/2005 |
| JP | 2005-135971 A | 5/2005 |
| JP | 2005-149265 | 6/2005 |
| JP | 2005-183793 | 7/2005 |
| JP | 2005-203447 | 7/2005 |
| JP | 2005-268610 | 9/2005 |
| JP | 2006-073696 | 3/2006 |
| JP | 2005-114752 | 10/2006 |
| JP | 2006-303022 A | 11/2006 |
| JP | 2007-012855 | 1/2007 |
| JP | 2007-013060 | 1/2007 |
| JP | 2007-043049 | 2/2007 |
| JP | 2007-141971 | 6/2007 |
| JP | 2011-515841 | 5/2011 |
| KR | 10-0417093 | 6/1997 |
| KR | 10-1998-087485 | 12/1998 |
| KR | 1998-0084215 A | 12/1998 |

(56) References Cited

FOREIGN PATENT DOCUMENTS

| | | |
|---|---|---|
| KR | 10-1999-0057943 A | 7/1999 |
| KR | 2000-0005660 | 1/2000 |
| KR | 10-2000-0028830 A | 5/2000 |
| KR | 10-2002-0034313 | 5/2002 |
| KR | 10-2002-0070777 | 9/2002 |
| KR | 2003-0022006 | 3/2003 |
| KR | 2004-0005609 | 1/2004 |
| KR | 10-2005-0030347 A | 3/2005 |
| KR | 2005-0037965 A | 4/2005 |
| KR | 2006-0108233 A | 10/2006 |
| TW | 386288 | 4/2000 |
| TW | 200709309 | 3/2007 |
| TW | 200709565 | 3/2007 |
| TW | 200811704 A | 3/2008 |
| TW | 200947567 A | 11/2009 |
| WO | WO 2005/104356 | 11/2005 |
| WO | WO 2006/014849 | 2/2006 |
| WO | WO 2006/052738 | 5/2006 |
| WO | WO 2006/090445 | 8/2006 |
| WO | WO 2007/014053 | 2/2007 |
| WO | WO 2007/103587 | 9/2007 |

OTHER PUBLICATIONS

Acar, et al., "A Linear-Centric Simulation Framework for Parametric Fluctuations", 2002, IEEE, Carnegie Mellon University USA, pp. 1-8, Jan. 28, 2002.

Amazawa, et al., "Fully Planarized Four-Level Interconnection with Stacked VLAS Using CMP of Selective CVD-A1 and Insulator and its Application to Quarter Micron Gate Array LSIs", 1995, IEEE, Japan, pp. 473-476, Dec. 10, 1995.

Axelrad et al. "Efficient Full-Chip Yield Analysis Methodology for OPC-Corrected VLSI Design", 2000, International Symposium on Quality Electronic Design (ISQED), Mar. 20, 2000.

Balasinski et al. "Impact of Subwavelength CD Tolerance on Device Performance", 2002, SPIE vol. 4692, Jul. 11, 2002.

Burkhardt, et al., "Dark Field Double Dipole Lithography (DDL) for Back-End-Of-Line Processes", 2007, SPIE Proceeding Series, vol. 6520; Mar. 26, 2007.

Capetti, et al., "Sub k1 = 0.25 Lithography with Double Patterning Technique for 45nm Technology Node Flash Memory Devices at λ = 193nm", 2007, SPIE Proceeding Series, vol. 6520; Mar. 27, 2007.

Capodieci, L., et al., "Toward a Methodology for Manufacturability-Driven Design Rule Exploration," DAC 2004, Jun. 7, 2004, San Diego, CA.

Chandra, et al., "An Interconnect Channel Design Methodology for High Performance Integrated Circuits", 2004, IEEE, Carnegie Mellon University, pp. 1-6, Feb. 16, 2004.

Cheng, et al., "Feasibility Study of Splitting Pitch Technology on 45nm Contact Patterning with 0.93 NA", 2007, SPIE Proceeding Series, vol. 6520; Feb. 25, 2007.

Chow, et al., "The Design of a SRAM-Based Field-Programmable Gate Array—Part II: Circuit Design and Layout", 1999, IEEE, vol. 7 # 3 pp. 321-330, Sep. 1, 1999.

Clark et al. "Managing Standby and Active Mode Leakage Power in Deep Sub-Micron Design", Aug. 9, 2004, ACM.

Cobb et al. "Using OPC to Optimize for Image Slope and Improve Process Window", 2003, SPIE vol. 5130, Apr. 16, 2003.

Devgan "Leakage Issues in IC Design: Part 3", 2003, ICCAD, Nov. 9, 2003.

DeVor, et al., "Statistical Quality Design and Control", 1992, Macmillan Publishing Company, pp. 264-267, Jan. 3, 1992.

Dictionary.com, "channel," in Collins English Dictionary—Complete & Unabridged 10th Edition. Source location: HarperCollins Publishers. Sep. 3, 2009.

Dusa, et al. "Pitch Doubling Through Dual Patterning Lithography Challenges in Integration and Litho Budgets", 2007, SPIE Proceeding Series, vol. 6520; Feb. 25, 2007.

El-Gamal, "Fast, Cheap and Under Control: The Next Implementation Fabric", Jun. 2, 2003, ACM Press, pp. 354-355.

Firedberg, et al., "Modeling Within-Field Gate Length Spatial Variation for Process-Design Co-Optimization," 2005 Proc. of SPIE vol. 5756, pp. 178-188, Feb. 27, 2005.

Frankel, "Quantum State Control Interference Lithography and Trim Double Patterning for 32-16nm Lithography", 2007, SPIE Proceeding Series, vol. 6520; Feb. 27, 2007.

Garg, et al. "Lithography Driven Layout Design", 2005, IEEE VLSI Design 2005, Jan. 3, 2005.

Grobman et al. "Reticle Enhancement Technology Trends: Resource and Manufacturability Implications for the Implementation of Physical Designs" Apr. 1, 2001, ACM.

Grobman et al. "Reticle Enhancement Technology: Implications and Challenges for Physical Design" Jun. 18, 2001, ACM.

Gupta et al. "Enhanced Resist and Etch CD Control by Design Perturbation", Oct. 4, 2006, Society of Photo-Optical Instrumentation Engineers.

Gupta et al. "A Practical Transistor-Level Dual Threshold Voltage Assignment Methodology", 2005, Sixth International Symposium on Quality Electronic Design (ISQED), Mar. 21, 2005.

Gupta et al. "Detailed Placement for Improved Depth of Focus and CD Control", 2005, ACM, Jan. 18, 2005.

Gupta et al. "Joining the Design and Mask Flows for Better and Cheaper Masks", Oct. 14, 2004, Society of Photo-Optical Instrumentation Engineers.

Gupta et al. "Manufacturing-Aware Physical Design", ICCAD 2003, Nov. 9, 2003.

Gupta et al. "Selective Gate-Length Biasing for Cost-Effective Runtime Leakage Control", Jun. 7, 2004, ACM.

Gupta et al. "Wafer Topography-Aware Optical Proximity Correction for Better DOF Margin and CD Control", Apr. 13, 2005, SPIE.

Gupta, Puneet, et al., "Manufacturing-aware Design Methodology for Assist Feature Correctness," SPIE vol. 5756, May 13, 2005.

Ha et al., "Reduction in the Mask Error Factor by Optimizing the Diffraction Order of a Scattering Bar in Lithography," Journal of the Korean Physical Society, vol. 46, No. 5, May 5, 2005, pp. 1213-1217.

Hakko, et al., "Extension of the 2D-TCC Technique to Optimize Mask Pattern Layouts," 2008 Proc. of SPIE vol. 7028, 11 pages, Apr. 16, 2008.

Halpin et al., "Detailed Placement with Net Length Constraints," Publication Year 2003, Proceedings of the 3rd IEEE International Workshop on System-on-Chip for Real-Time Applications, pp. 22-27, Jun. 30, 2003.

Hayashida, et al., "Manufacturable Local Interconnect technology Fully Compatible with Titanium Salicide Process", Jun. 11, 1991, VMIC Conference.

Heng, et al., "A VLSI Artwork Legalization Technique Base on a New Criterion of Minimum Layout Perturbation", Proceedings of 1997 International Symposium on Physical Design, pp. 116-121, Apr. 14, 1997.

Heng, et al., "Toward Through-Process Layout Quality Metrics", Mar. 3, 2005, Society of Photo-Optical Instrumentation Engineers.

Hu, et al., "Synthesis and Placement Flow for Gain-Based Programmable Regular Fabrics", Apr. 6, 2003, ACM Press, pp. 197-203.

Hur et al., "Mongrel: Hybrid Techniques for Standard Cell Placement," Publication Year 2000, IEEE/ACM International Conference on Computer Aided Design, ICCAD-2000, pp. 165-170, Nov. 5, 2000.

Hutton, et al., "A Methodology for FPGA to Structured-ASIC Synthesis and Verification", 2006, EDAA, pp. 64-69, Mar. 6, 2006.

Intel Core Microarchitecture White Paper "Introducing the 45 nm Next-Generation Intel Core Microarchitecture," Intel Corporation, 2007 (best available publication date).

Jayakumar, et al., "A Metal and Via Maskset Programmable VLSI Design Methodology using PLAs", 2004, IEEE, pp. 590-594, Nov. 7, 2004.

Jhaveri, T. et al., Maximization of Layout Printability/Manufacturability by Extreme Layout Regularity, Proc. of the SPIE vol. 6156, Feb. 19, 2006.

Kang, S.M., Metal-Metal Matrix (M3) for High-Speed MOS VLSI Layout, IEEE Trans. on CAD, vol. CAD-6, No. 5, Sep. 1, 1987.

(56) References Cited

OTHER PUBLICATIONS

Kawashima, et al., "Mask Optimization for Arbitrary Patterns with 2D-TCC Resolution Enhancement Technique," 2008 Proc. of SPIE vol. 6924, 12 pages, Feb. 24, 2008.
Kheterpal, et al., "Design Methodology for IC Manufacturability Based on Regular Logic-Bricks", DAC, Jun. 13, 2005, IEEE/AMC, vol. 6520.
Kheterpal, et al., "Routing Architecture Exploration for Regular Fabrics", DAC, Jun. 7, 2004, ACM Press, pp. 204-207.
Kim, et al., "Double Exposure Using 193nm Negative Tone Photoresist", 2007, SPIE Proceeding Series, vol. 6520; Feb. 25, 2007.
Kim, et al., "Issues and Challenges of Double Patterning Lithography in DRAM", 2007, SPIE Proceeding Series, vol. 6520; Feb. 25, 2007.
Koorapaty, et al., "Exploring Logic Block Granularity for Regular Fabrics", 2004, IEEE, pp. 1-6, Feb. 16, 2004.
Koorapaty, et al., "Heterogeneous Logic Block Architectures for Via-Patterned Programmable Fabric", 13th International Conference on Field Programmable Logic and Applications (FPL) 2003, Lecture Notes in Computer Science (LNCS), Sep. 1, 2003, Springer-Verlag, vol. 2778, pp. 426-436.
Koorapaty, et al., "Modular, Fabric-Specific Synthesis for Programmable Architectures", 12th International Conference on Field Programmable Logic and Applications (FPL_2002, Lecture Notes in Computer Science (LNCS)), Sep. 2, 2002, Springer-Verlag, vol. 2438 pp. 132-141.
Kuh et al., "Recent Advances in VLSI Layout," Proceedings of the IEEE, vol. 78, Issue 2, pp. 237-263, Feb. 1, 1990.
Lavin et al. "Backend DAR Flows for "Restrictive Design Rules"", 2004, IEEE, Nov. 7, 2004.
Li, et al., "A Linear-Centric Modeling Approach to Harmonic Balance Analysis", 2002, IEEE, pp. 1-6, Mar. 4, 2002.
Li, et al., "Nonlinear Distortion Analysis Via Linear-Centric Models", 2003, IEEE, pp. 897-903, Jan. 21, 2003.
Liebmann et al., "Integrating DfM Components into a Cohesive Design-to-Silicon Solution," Proc. SPIE 5756, Design and Process Integration for Microelectronic Manufacturing III, Feb. 27, 2005.
Liebmann et al., "Optimizing Style Options for Sub-Resolution Assist Features," Proc. of SPIE vol. 4346, Feb. 25, 2001, pp. 141-152.
Liebmann, et al., "High-Performance Circuit Design for the RET-Enabled 65nm Technology Node", Feb. 26, 2004, SPIE Proceeding Series, vol. 5379 pp. 20-29.
Liebmann, L. W., Layout Impact of Resolution Enhancement Techniques: Impediment or Opportunity?, International Symposium on Physical Design, Apr. 6, 2003.
Liu et al., "Double Patterning with Multilayer Hard Mask Shrinkage for Sub 0.25 k1 Lithography," Proc. SPIE 6520, Optical Microlithography XX, Feb. 25, 2007.
Mansfield et al., "Lithographic Comparison of Assist Feature Design Strategies," Proc. of SPIE vol. 4000, Feb. 27, 2000, pp. 63-76.
Miller, "Manufacturing-Aware Design Helps Boost IC Yield", Sep. 9, 2004, http://www.eetimes.com/showArticle.jhtml?articleID=47102054.
Mishra, P., et al., "FinFET Circuit Design," Nanoelectronic Circuit Design, pp. 23-54, Dec. 21, 2010.
Mo, et al., "Checkerboard: A Regular Structure and its Synthesis, International Workshop on Logic and Synthesis", Department of Electrical Engineering and Computer Sciences, UC Berkeley, California, pp. 1-7, Jun. 1, 2003.
Mo, et al., "PLA-Based Regular Structures and Their Synthesis", Department of Electrical Engineering and Computer Sciences, IEEE, pp. 723-729, Jun. 1, 2003.
Mo, et al., "Regular Fabrics in Deep Sub-Micron Integrated-Circuit Design", Kluwer Academic Publishers, Entire Book, Jun. 1, 2002.
Moore, Samuel K., "Intel 45-nanometer Penryn Processors Arrive," Nov. 13, 2007, IEEE Spectrum, http://spectrum.ieee.org/semiconductors/design/intel-45nanometer-penryn-processors-arrive.
Mutoh et al. "1-V Power Supply High-Speed Digital Circuit Technology with Multithreshold-Voltage CMOS", 1995, IEEE, Aug. 1, 1995.
Op de Beek, et al., "Manufacturability issues with Double Patterning for 50nm half pitch damascene applications, using RELACS® shrink and corresponding OPC", 2007, SPIE Proceeding Series, vol. 6520; Feb. 25, 2007.
Or-Bach, "Programmable Circuit Fabrics", Sep. 18, 2001, e-ASIC, pp. 1-36.
Otten, et al., "Planning for Performance", DAC 1998, ACM Inc., pp. 122-127, Jun. 15, 1998.
Pack et al. "Physical & Timing Verification of Subwavelength-Scale Designs-Part I: Lithography Impact on MOSFETs", 2003, SPIE vol. 5042, Feb. 23, 2003.
Pandini, et al., "Congestion-Aware Logic Synthesis", 2002, IEEE, pp. 1-8, Mar. 4, 2002.
Pandini, et al., "Understanding and Addressing the Impact of Wiring Congestion During Technology Mapping", ISPD Apr. 7, 2002, ACM Press, pp. 131-136.
Patel, et al., "An Architectural Exploration of Via Patterned Gate Arrays, ISPD 2003", Apr. 6, 2003, pp. 184-189.
Pham, D., et al., "FinFET Device Junction Formation Challenges," 2006 International Workshop on Junction Technology, pp. 73-77, Aug. 1, 2006.
Pileggi, et al., "Exploring Regular Fabrics to Optimize the Performance-Cost Trade-Offs, Proceedings of the 40th ACM/IEEE Design Automation Conference (DAC) 2003", Jun. 2, 2003, ACM Press, pp. 782-787.
Poonawala, et al., "ILT for Double Exposure Lithography with Conventional and Novel Materials", 2007, SPIE Proceeding Series, vol. 6520; Feb. 25, 2007.
Qian et al. "Advanced Physical Models for Mask Data Verification and Impacts on Physical Layout Synthesis" 2003 IEEE, Mar. 24, 2003.
Ran, et al., "An Integrated Design Flow for a Via-Configurable Gate Array", 2004, IEEE, pp. 582-589, Nov. 7, 2004.
Ran, et al., "Designing a Via-Configurable Regular Fabric", Custom Integrated Circuits Conference (CICC). Proceedings of the IEEE, Oct. 1, 2004, pp. 423-426.
Ran, et al., "On Designing Via-Configurable Cell Blocks for Regular Fabrics" Proceedings of the Design Automation Conference (DAC) 2004, Jun. 7, 2004, ACM Press, s 198-203.
Ran, et al., "The Magic of a Via-Configurable Regular Fabric", Proceedings of the IEEE International Conference on Computer Design (ICCD) Oct. 11, 2004.
Ran, et al., "Via-Configurable Routing Architectures and Fast Design Mappability Estimation for Regular Fabrics", 2005, IEEE, pp. 25-32, Sep. 1, 2006.
Reis, et al., "Physical Design Methodologies for Performance Predictability and Manufacturability", Apr. 14, 2004, ACM Press, pp. 390-397.
Robertson, et al., "The Modeling of Double Patterning Lithographic Processes", 2007, SPIE Proceeding Series, vol. 6520; Feb. 25, 2007.
Rosenbluth, et al., "Optimum Mask and Source Patterns to Print a Given Shape," 2001 Proc. of SPIE vol. 4346, pp. 486-502, Feb. 25, 2001.
Rovner, "Design for Manufacturability in Via Programmable Gate Arrays", May 1, 2003, Graduate School of Carnegie Mellon University.
Sengupta, "An Integrated CAD Framework Linking VLSI Layout Editors and Process Simulators", 1998, Thesis for Rice University, pp. 1-101, Nov. 1, 1998.
Sengupta, et al., "An Integrated CAD Framework Linking VLSI Layout Editors and Process Simulators", 1996, SPIE Proceeding Series, vol. 2726; pp. 244-252, Mar. 10, 1996.
Sherlekar, "Design Considerations for Regular Fabrics", Apr. 18, 2004, ACM Press, pp. 97-102.
Shi et al., "Understanding the Forbidden Pitch and Assist Feature Placement," Proc. of SPIE vol. 4562, pp. 968-979, Mar. 11, 2002.
Smayling et al., "APF Pitch Halving for 22 nm Logic Cells Using Gridded Design Rules," Proceedings of SPIE, USA, vol. 6925, Jan. 1, 2008, pp. 69251E-1-69251E-7.

(56) References Cited

OTHER PUBLICATIONS

Socha, et al., "Simultaneous Source Mask Optimization (SMO)," 2005 Proc. of SPIE vol. 5853, pp. 180-193, Apr. 13, 2005.
Sreedhar et al. "Statistical Yield Modeling for Sub-Wavelength Lithography", 2008 IEEE, Oct. 28, 2008.
Stapper, "Modeling of Defects in Integrated Circuit Photolithographic Patterns", Jul. 1, 1984, IBM, vol. 28 # 4, pp. 461-475.
Taylor, et al., "Enabling Energy Efficiency in Via-Patterned Gate Array Devices", Jun. 7, 2004, ACM Press, pp. 874-877.
Tian et al. "Model-Based Dummy Feature Placement for Oxide Chemical_Mechanical Polishing Manufacturability" IEEE, vol. 20, Issue 7, Jul. 1, 2001.
Tong, et al., "Regular Logic Fabrics for a Via Patterned Gate Array (VPGA), Custom Integrated Circuits Conference", Sep. 21, 2003, Proceedings of the IEEE, pp. 53-56.
Vanleenhove, et al., "A Litho-Only Approach to Double Patterning", 2007, SPIE Proceeding Series, vol. 6520; Feb. 25, 2007.
Wang, et al., "Performance Optimization for Gridded-Layout Standard Cells", vol. 5567 SPIE, Sep. 13, 2004.
Wang, J. et al., Standard Cell Layout with Regular Contact Placement, IEEE Trans. on Semicon. Mfg., vol. 17, No. 3, Aug. 9, 2004.
Webb, Clair, "45nm Design for Manufacturing," Intel Technology Journal, vol. 12, Issue 02, Jun. 17, 2008, ISSN 1535-864X, pp. 121-130.
Webb, Clair, "Layout Rule Trends and Affect upon CPU Design", vol. 6156 SPIE, Feb. 19, 2006.
Wenren, et al., "The Improvement of Photolithographic Fidelity of Two-dimensional Structures Though Double Exposure Method", 2007, SPIE Proceeding Series, vol. 6520; Feb. 25, 2007.
Wilcox, et al., "Design for Manufacturability: A Key to Semiconductor Manufacturing Excellence", 1998 IEEE, pp. 308-313, Sep. 23, 1998.
Wong, et al., "Resolution Enhancement Techniques and Design for Manufacturability: Containing and Accounting for Variabilities in Integrated Circuit Creation," J. Micro/Nanolith. MEMS MOEMS, Sep. 27, 2007, vol. 6(3), 2 pages.
Wu, et al., "A Study of Process Window Capabilities for Two-dimensional Structures under Double Exposure Condition", 2007, SPIE Proceeding Series, vol. 6520; Feb. 25, 2007.
Xiong, et al., "The Constrained Via Minimization Problem for PCB and VLSI Design", 1988 ACM Press/IEEE, pp. 573-578, Jun. 12, 1998.
Yamamoto, et al., "New Double Exposure Technique without Alternating Phase Shift Mask", SPIE Proceeding Series, vol. 6520; Feb. 25, 2007.
Yamazoe, et al., "Resolution Enhancement by Aerial Image Approximation with 2D-TCC," 2007 Proc. of SPIE vol. 6730, 12 pages, Sep. 17, 2007.
Yang, et al., "Interconnection Driven VLSI Module Placement Based on Quadratic Programming and Considering Congestion Using LFF Principles", 2004 IEEE, pp. 1243-1247, Jun. 27, 2004.
Yao, et al., "Multilevel Routing With Redundant Via Insertion", Oct. 23, 2006, IEEE, pp. 1148-1152.
Yu, et al., "True Process Variation Aware Optical Proximity Correction with Variational Lithography Modeling and Model Calibration," J. Micro/Nanolith. MEMS MOEMS, Sep. 11, 2007, vol. 6(3), 16 pages.
Zheng, et al."Modeling and Analysis of Regular Symmetrically Structured Power/Ground Distribution Networks", DAC, Jun. 10, 2002, ACM Press, pp. 395-398.
Zhu, et al., "A Stochastic Integral Equation Method for Modeling the Rough Surface Effect on Interconnect Capacitance", 2004 IEEE, Nov. 7, 2004.
Zhu, et al., "A Study of Double Exposure Process Design with Balanced Performance Parameters for Line/Space Applications", 2007, SPIE Proceeding Series, vol. 6520; Feb. 25, 2007.
Zuchowski, et al., "A Hybrid ASIC and FPGA Architecture", 2003 IEEE, pp. 187-194, Nov. 10, 2002.
Alam, Syed M. et al., "A Comprehensive Layout Methodology and Layout-Specific Circuit Analyses for Three-Dimensional Integrated Circuits," Mar. 21, 2002.
Alam, Syed M. et al., "Layout-Specific Circuit Evaluation in 3-D Integrated Circuits," May 1, 2003.
Aubusson, Russel, "Wafer-Scale Integration of Semiconductor Memory," Apr. 1, 1979.
Bachtold, "Logic Circuits with Carbon," Nov. 9, 2001.
Baker, R. Jacob, "CMOS: Circuit Design, Layout, and Simulation (2nd Edition)," Nov. 1, 2004.
Baldi et al., "A Scalable Single Poly EEPROM Cell for Embedded Memory Applications," pp. 1-4, Fig. 1, Sep. 1, 1997.
Cao, Ke, "Design for Manufacturing (DFM) in Submicron VLSI Design," Aug. 1, 2007.
Capodieci, Luigi, "From Optical Proximity Correction to Lithography-Driven Physical Design (1996-2006): 10 years of Resolution Enhancement Technology and the roadmap enablers for the next decade," Proc. SPIE 6154, Optical Microlithography XIX, 615401, Mar. 20, 2006.
Chang, Leland et al., "Stable Sram Cell Design for the 32 nm Node and Beyond," Jun. 16, 2005.
Cheung, Peter, "Layout Design," Apr. 4, 2004.
Chinnery, David, "Closing the Gap Between ASIC & Custom: Tools and Techniques for High-Performance ASIC Design," Jun. 30, 2002.
Chou, Dyiann et al., "Line End Optimization through Optical Proximity Correction (OPC): A Case Study," Feb. 19, 2006.
Clein, Dan, "CMOS IC Layout: Concepts, Methodologies, and Tools," Dec. 22, 1999.
Cowell, "Exploiting Non-Uniform Access Time," Jul. 1, 2003.
Das, Shamik, "Design Automation and Analysis of Three-Dimensional Integrated Circuits," May 1, 2004.
Dehaene, W. et al., "Technology-Aware Design of SRAM Memory Circuits," Mar. 1, 2007.
Deng, Liang et al., "Coupling-aware Dummy Metal Insertion for Lithography," p. 1, col. 2, Jan. 23, 2007.
Devoivre et al., "Validated 90nm CMOS Technology Platform with Low-k Copper Interconnects for Advanced System-on-Chip (SoC)," Jul. 12, 2002.
Enbody, R. J., "Near-Optimal n-Layer Channel Routing," Jun. 29, 1986.
Ferretti, Marcos et al., "High Performance Asynchronous ASIC Back-End Design Flow Using Single-Track Full-Buffer Standard Cells," Apr. 23, 2004.
Garg, Manish et al., "Litho-driven Layouts for Reducing Performance Variability," p. 2, Figs. 2b-2c, May 23, 2005.
Greenway, Robert et al., "32nm 1-D Regular Pitch SRAM Bitcell Design for Interference-Assisted Lithography," Oct. 6, 2008.
Gupta et al., "Modeling Edge Placement Error Distribution in Standard Cell Library," Feb. 23, 2006.
Grad, Johannes et al., "A standard cell library for student projects," Proceedings of the 2003 IEEE International Conference on Microelectronic Systems Education, Jun. 2, 2003.
Hartono, Roy et al., "Active Device Generation for Automatic Analog Layout Retargeting Tool," May 13, 2004.
Hartono, Roy et al., "IPRAIL—Intellectual Property Reuse-based Analog IC Layout Automation," Mar. 17, 2003.
Hastings, Alan, "The Art of Analog Layout (2nd Edition)," Jul. 4, 2005.
Hurat et al., "A Genuine Design Manufacturability Check for Designers," Feb. 19, 2006.
Institute of Microelectronic Systems, "Digital Subsystem Design," Oct. 13, 2006.
Ishida, M. et al., "A Novel 6T-SRAM Cell Technology Designed with Rectangular Patterns Scalable beyond 0.18 pm Generation and Desirable for Ultra High Speed Operation," IEDM 1998, Dec. 6, 1998.
Jakusovszky, "Linear IC Parasitic Element Simulation Methodology," Oct. 1, 1993.
Jangkrajarng, Nuttorn et al., "Template-Based Parasitic-Aware Optimization and Retargeting of Analog and RF Integrated Circuit Layouts," Nov. 5, 2006.

(56) References Cited

OTHER PUBLICATIONS

Kahng, Andrew B., "Design Optimizations DAC-2006 DFM Tutorial, part V)," Jul. 24, 2006.
Kang, Sung-Mo et al., "CMOS Digital Integrated Circuits Analysis & Design," Oct. 29, 2002.
Kottoor, Mathew Francis, "Development of a Standard Cell Library based on Deep Sub-Micron SCMOS Design Rules using Open Source Software (MS Thesis)," Aug. 1, 2005.
Kubicki, "Intel 65nm and Beyond (or Below): IDF Day 2 Coverage (available at http://www.anandtech.com/show/1468/4)," Sep. 9, 2004.
Kuhn, Kelin J., "Reducing Variation in Advanced Logic Technologies: Approaches to Process and Design for Manufacturability of Nanoscale CMOS," p. 27, Dec. 12, 2007.
Kurokawa, Atsushi et al., "Dummy Filling Methods for Reducing Interconnect Capacitance and Numbers of Fills, Proc. of ISQED," pp. 586-591, Mar. 21, 2005.
Lavin, Mark, "Open Access Requirements from RDR Design Flows," Nov. 11, 2004.
Liebmann, Lars et al., "Layout Methodology Impact of Resolution Enhancement Techniques," pp. 5-6, Apr. 6, 2003.
Liebmann, Lars et al., "TCAD development for lithography resolution enhancement," Sep. 1, 2001.
Lin, Chung-Wei et al., "Recent Research and Emerging Challenges in Physical Design for Manufacturability/Reliability," Jan. 26, 2007.
McCullen, Kevin W., "Layout Techniques for Phase Correct and Gridded Wiring," pp. 13, 17, Fig. 5, Dec. 1, 2006.
MOSIS, "Design Rules MOSIS Scalable CMOS (SCMOS) (Revision 8.00)," Oct. 4, 2004.
MOSIS, "MOSIS Scalable CMOS (SCMOS) Design Rules (Revision 7.2)," Jan. 1, 1995.
Muta et al., "Manufacturability-Aware Design of Standard Cells," pp. 2686-2690, Figs. 3, 12, Dec. 1, 2007.
Na, Kee-Yeol et al., "A Novel Single Polysilicon EEPROM Cell With a Polyfinger Capacitor," Nov. 30, 2007.
Pan et al., "Redundant Via Enhanced Maze Routing for Yield Improvement," DAC 2005, Jan. 18, 2005.
Park, Tae Hong, "Characterization and Modeling of Pattern Dependencies in Copper Interconnects for Integrated Circuits," Ph.D. Thesis, MIT, May 24, 2002.
Patel, Chetan, "An Architectural Exploration of Via Patterned Gate Arrays (CMU Master's Project)," May 1, 2003.
Pease, R. Fabian et al., "Lithography and Other Patterning Techniques for Future Electronics," IEEE 2008, vol. 96, Issue 2, Jan. 16, 2008.
Serrano, Diego Emilio, Pontificia Universidad Javeriana Facultad De Ingenieria, Departamento De Electronica, "Diseño De Multiplicador 4×8 en VLSI, Introduccion al VLSI," 2006 (best available publication date).
Pramanik, "Impact of layout on variability of devices for sub 90nm technologies," 2004 (best available publication date).
Pramanik, Dipankar et al., "Lithography-driven layout of logic cells for 65-nm node (SPIE Proceedings vol. 5042)," Jul. 10, 2003.
Roy et al., "Extending Aggressive Low-K1 Design Rule Requirements for 90 and 65 Nm Nodes Via Simultaneous Optimization of Numerical Aperture, Illumination and Optical Proximity Correction," J.Micro/Nanolith, MEMS MOEMS, 4(2), 023003, Apr. 26, 2005.
Saint, Christopher et al., "IC Layout Basics: A Practical Guide," Chapter 3, Nov. 5, 2001.
Saint, Christopher et al., "IC Mask Design: Essential Layout Techniques," May 24, 2002.
Scheffer, "Physical CAD Changes to Incorporate Design for Lithography and Manufacturability," Feb. 4, 2004.
Smayling, Michael C., "Part 3: Test Structures, Test Chips, In-Line Metrology & Inspection," Jul. 24, 2006.
Spence, Chris, "Full-Chip Lithography Simulation and Design Analysis: How OPC is changing IC Design, Emerging Lithographic Technologies IX," May 6, 2005.
Subramaniam, Anupama R., "Design Rule Optimization of Regular layout for Leakage Reduction in Nanoscale Design," pp. 474-478, Mar. 24, 2008.
Tang, C. W. et al., "A compact large signal model of LDMOS," Solid-State Electronics 46(2002) 2111-2115, May 17, 2002.
Taylor, Brian et al., "Exact Combinatorial Optimization Methods for Physical Design of Regular Logic Bricks," Jun. 8, 2007.
Tian, Ruiqi et al., "Dummy Feature Placement for Chemical-Mechanical Uniformity in a Shallow Trench Isolation Process," IEEE Trans. on Computer-Aided Design of Integrated Circuits and Systems, vol. 21, No. 1, pp. 63-71, Jan. 1, 2002.
Tian, Ruiqi et al., "Proximity Dummy Feature Placement and Selective Via Sizing for Process Uniformity in a Trench-First-Via-Last Dual-Inlaid Metal Process," Proc. of IITC, pp. 48-50, Jun. 6, 2001.
Torres, J. A. et al., "RET Compliant Cell Generation for sub-130nm Processes," SPIE vol. 4692, Mar. 6, 2002.
Uyemura, John P., "Introduction to VLSI Circuits and Systems," Chapters 2, 3, 5, and Part 3, Jul. 30, 2001.
Uyemura, John, "Chip Design for Submicron VLSI: CMOS Layout and Simulation," Chapters 2-5, 7-9, Feb. 8, 2005.
Verhaegen et al., "Litho Enhancements for 45nm-nod MuGFETs," Aug. 1, 2005.
Wong, Ban P., "Bridging the Gap between Dreams and Nano-Scale Reality (DAC-2006 DFM Tutorial)," Jul. 28, 2006.
Wang, Dunwei et al., "Complementary Symmetry Silicon Nanowire Logic: Power-Efficient Inverters with Gain," Aug. 17, 2006.
Wang, Jun et al., "Effects of grid-placed contacts on circuit performance," pp. 135-139, Figs. 2, 4-8, Feb. 28, 2003.
Wang, Jun et al., "Standard cell design with regularly placed contacts and gates (SPIE vol. 5379)," Feb. 22, 2004.
Wang, Jun et al., "Standard cell design with resolution-enhancement-techniquedriven regularly placed contacts and gates," J. Micro/Nanolith, MEMS MOEMS, 4(1), 013001, Mar. 16, 2005.
Watson, Bruce, "Challenges and Automata Applications in Chip-Design Software," pp. 38-40, Jul. 16, 2007.
Weste, Neil et al., "CMOS VLSI Design: A Circuits and Systems Perspective, 3rd Edition," May 21, 2004.
Wingerden, Johannes van, "Experimental verification of improved printability for litho-driven designs," Mar. 14, 2005.
Wong, Alfred K., "Microlithography: Trends, Challenges, Solutions and Their Impact on Design," Micro IEEE vol. 23, Issue 2, Apr. 29, 2003.
Xu, Gang, "Redundant-Via Enhanced Maze Routing for Yield Improvement," Proceedings of ASP-DAC 2005, Jan. 18, 2005.
Yang, Jie, "Manufacturability Aware Design," pp. 93, 102, Fig. 5.2, Jan. 16, 2008.
Yongshun, Wang et al., "Static Induction Devices with Planar Type Buried Gate," Chinese Journal of Semiconductors, vol. 25, No. 2, Feb. 1, 2004.
Zobrist, George (editor), "Progress in Computer Aided VLSI Design: Implementations (Ch. 5)," Ablex Publishing Corporation, Feb. 1, 1990.
Petley, Graham, "VLSI and ASIC Technology Standard Cell Library Design," from website www.vlsitechnology.org, Jan. 11, 2005.
Liebmann, Lars, et al., "Layout Optimization at the Pinnacle of Optical Lithography," Design and Process Integration for Microelectronic Manufacturing II, Proceedings of SPIE vol. 5042, Jul. 8, 2003.
Kawasaki, H., et al., "Challenges and Solutions of FinFET Integration in an SRAM Cell and a Logic Circuit 22 nm node and beyond," Electron Devices Meeeting (IEDM), 2009 IEEE International, IEEE, Piscataway, NJ, USA, Dec. 7, 2009, pp. 1-4.

* cited by examiner

SEMICONDUCTOR CHIP INCLUDING A CHIP LEVEL BASED ON A LAYOUT THAT INCLUDES BOTH REGULAR AND IRREGULAR WIRES

CLAIM OF PRIORITY

This application is a continuation application under 35 U.S.C. 120 of prior U.S. application Ser. No. 12/481,445, filed Jun. 9, 2009, which:

1) claims priority under 35 U.S.C. 119(e) to U.S. Provisional Patent Application No. 61/060,090, filed Jun. 9, 2008, and 2) is a continuation-in-part application under 35 U.S.C. 120 of U.S. application Ser. No. 12/013,342, filed Jan. 11, 2008, issued as U.S. Pat. No. 7,917,879, on Mar. 29, 2011, which claims priority under 35 U.S.C. 119(e) to both U.S. Provisional Patent Application No. 60/963,364, filed Aug. 2, 2007, and U.S. Provisional Patent Application No. 60/972,394, filed Sep. 14, 2007, and 3) is a continuation-in-part application under 35 U.S.C. 120 of prior U.S. application Ser. No. 12/212,562, filed Sep. 17, 2008, issued as U.S. Pat. No. 7,842,975, on Nov. 30, 2010, which is a continuation application under 35 U.S.C. 120 of U.S. application Ser. No. 11/683,402, filed Mar. 7, 2007, issued as U.S. Pat. No. 7,446,352, on Nov. 4, 2008, which claims priority under 35 U.S.C. 119(e) to U.S. Provisional Patent Application No. 60/781,288, filed Mar. 9, 2006.

The disclosure of each above-identified patent application is incorporated herein by reference in its entirety.

BACKGROUND

A push for higher performance and smaller die size drives the semiconductor industry to reduce circuit chip area by approximately 50% every two years. The chip area reduction provides an economic benefit for migrating to newer technologies. The 50% chip area reduction is achieved by reducing the feature sizes between 25% and 30%. The reduction in feature size is enabled by improvements in manufacturing equipment and materials. For example, improvement in the lithographic process has enabled smaller feature sizes to be achieved, while improvement in chemical mechanical polishing (CMP) has in-part enabled a higher number of interconnect layers.

In the evolution of lithography, as the minimum feature size approached the wavelength of the light source used to expose the feature shapes, unintended interactions occurred between neighboring features. Today minimum feature sizes are being reduced below 45 nm (nanometers), while the wavelength of the light source used in the photolithography process remains at 193 nm. The difference between the minimum feature size and the wavelength of light used in the photolithography process is defined as the lithographic gap. As the lithographic gap grows, the resolution capability of the lithographic process decreases.

An interference pattern occurs as each shape on the mask interacts with the light. The interference patterns from neighboring shapes can create constructive or destructive interference. In the case of constructive interference, unwanted shapes may be inadvertently created. In the case of destructive interference, desired shapes may be inadvertently removed. In either case, a particular shape is printed in a different manner than intended, possibly causing a device failure. Correction methodologies, such as optical proximity correction (OPC), attempt to predict the impact from neighboring shapes and modify the mask such that the printed shape is fabricated as desired. However, the quality of the light interaction prediction is declining as process geometries shrink and as the light interactions become more complex.

In view of the foregoing, solutions are sought for improvements in circuit design and layout that can improve management of lithographic gap issues as technology continues to progress toward smaller semiconductor device features sizes.

SUMMARY

In one embodiment, a method is disclosed for placing irregular layout shapes in a dynamic array architecture. The method includes bracketing an irregular wire layout region within a portion of a chip level layout. The bracketing is done by placing a first regular wire layout shape on a first side of the irregular wire layout region, and by placing a second regular wire layout shape on a second side of the irregular wire layout region. The method also includes placing one or more irregular wire layout shapes within the irregular wire layout region. A first edge spacing is maintained between the first regular wire layout shape and an outer irregular wire layout shape within the irregular wire layout region nearest to the first regular wire layout shape. A second edge spacing is maintained between the second regular wire layout shape and an outer irregular wire layout shape within the irregular wire layout region nearest to the second regular wire layout shape. The first and second edge spacings are defined to optimize lithography of the first and second regular wire layout shapes and of the irregular wire layout shapes within the irregular wire layout region.

In one embodiment, a computer readable storage medium is disclosed to include a semiconductor chip layout recorded in a digital format. The semiconductor chip layout includes irregular layout shapes placed in a dynamic array architecture. Also in the semiconductor chip layout, an irregular wire layout region within a portion of a chip level layout is bracketed by a first regular wire layout shape on a first side of the irregular wire layout region and by a second regular wire layout shape on a second side of the irregular wire layout region. The semiconductor chip layout further includes one or more irregular wire layout shapes placed within the irregular wire layout region. A first edge spacing is maintained between the first regular wire layout shape and an outer irregular wire layout shape within the irregular wire layout region nearest to the first regular wire layout shape. A second edge spacing is maintained between the second regular wire layout shape and an outer irregular wire layout shape within the irregular wire layout region nearest to the second regular wire layout shape. The first and second edge spacings are defined to optimize lithography of the first and second regular wire layout shapes and of the irregular wire layout shapes within the irregular wire layout region.

In one embodiment, a method is disclosed for defining a virtual grate for a layout of a portion of a semiconductor chip level. The method includes an operation for identifying a preferred routing direction for a portion of a given chip level. The method also includes an operation for identifying each contact level related to the portion of the given chip level. Each identified contact level is defined by a respective related virtual grate defined by a respective set of parallel virtual lines extending in the preferred routing direction. Layout shapes within a given contact level are placed in accordance with the respective related virtual grate of the given contact level. The method further includes an operation for defining a trial virtual grate for the portion of the given chip level as a set of parallel virtual lines extending in the preferred routing direction. The set of parallel virtual lines of the trial virtual grate is defined to enable required connections between layout shapes placed in accordance with the trial virtual grate within the portion of the given chip level and layout shapes within each identified contact level. The method continues with an operation for determining whether a perpendicular spacing between adjacent virtual lines of the trial virtual grate provides for adequate lithographic reinforcement of layout shapes to be placed in accordance with the trial virtual grate. If the perpendicular spacing between adjacent virtual lines of the trial virtual grate is determined adequate, the method proceeds with recording the trial virtual grate as a final virtual grate of the portion of the given chip level. However, if the perpendicular spacing between adjacent virtual lines of the trial virtual grate is determined inadequate, the method proceeds by adjusting at least one related virtual grate of any identified contact level and by repeating the method operations beginning with the operation for defining a trial virtual grate for the portion of the given chip level.

Other aspects and advantages of the invention will become more apparent from the following detailed description, taken in conjunction with the accompanying drawings, illustrating by way of example the present invention.

DETAILED DESCRIPTION

Figure 1:
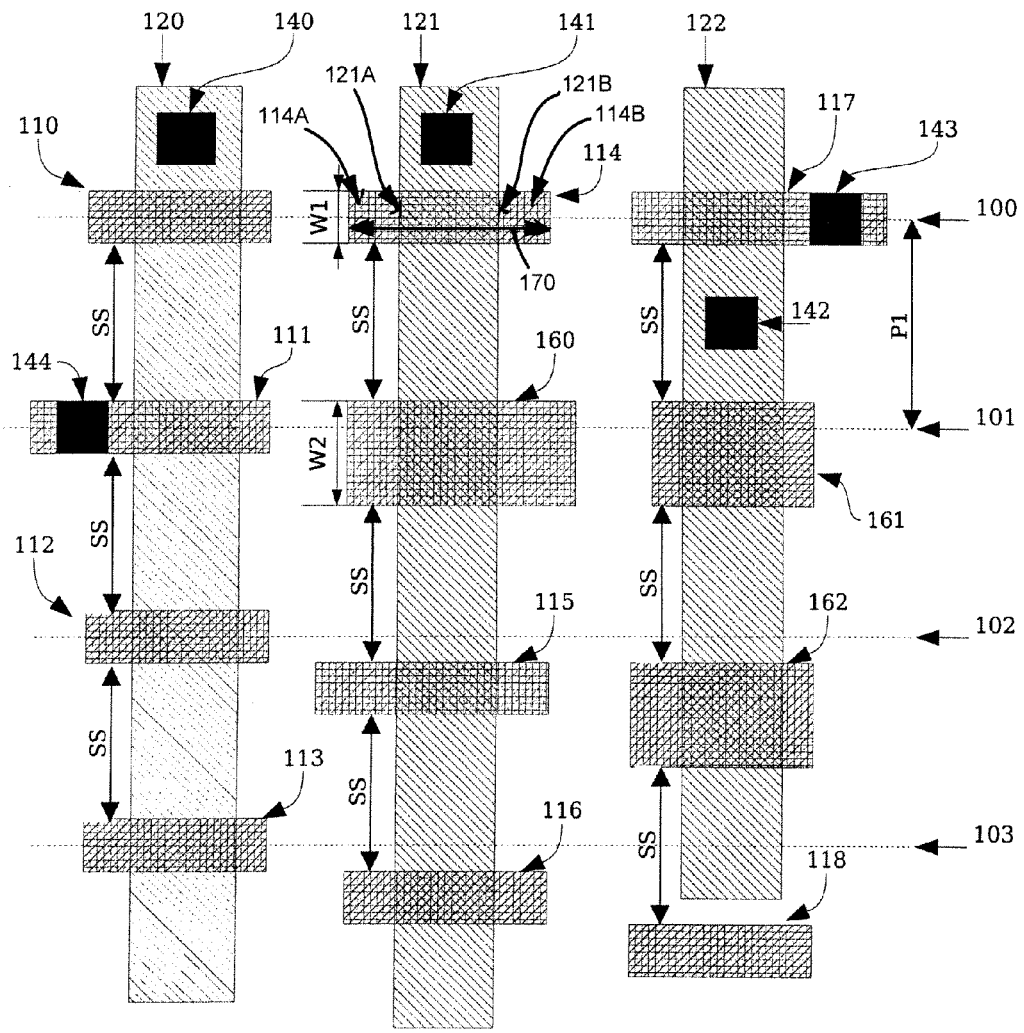
FIG. 1 shows an exemplary CMOS transistor configuration, in accordance with one embodiment of the present invention.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Dynamic Array Architecture

The dynamic array architecture represents a semiconductor device design paradigm in which linear-shaped layout features are defined along a regular-spaced virtual grate (or regular-spaced virtual grid) in a number of levels of a cell, i.e., in a number of levels of a semiconductor chip. The virtual grate is defined by a set of equally spaced, parallel virtual lines extending across a given level in a given chip area. The virtual grid is defined by a first set of equally spaced, parallel virtual lines extending across a given level in a given chip area in a first direction, and by a second set of equally spaced, parallel virtual lines extending across the given level in the given chip area in a second direction, where the second direction is perpendicular to the first direction. In one embodiment, the virtual grate of a given level is oriented to be substantially perpendicular to the virtual grate of an adjacent level. However, in other embodiments, the virtual grate of a given level is oriented to be either perpendicular or parallel to the virtual grate of an adjacent level.

In one embodiment, each linear-shaped layout feature of a given level is substantially centered upon one of the virtual lines of the virtual grate associated with the given level. A linear-shaped layout feature is considered to be substantially centered upon a particular line of a virtual grate when a deviation in alignment between of the centerline of the linear-shaped layout feature and the particular line of the virtual grate is sufficiently small so as to not reduce a manufacturing process window from what would be achievable with a true alignment between of the centerline of the linear-shaped layout feature and the line of the virtual grate.

In one embodiment, the above-mentioned manufacturing process window is defined by a lithographic domain of focus and exposure that yields an acceptable fidelity of the layout feature. In one embodiment, the fidelity of a layout feature is defined by a characteristic dimension of the layout feature. Also, it should be understood that the centerline of a given linear-shaped layout feature is defined as a virtual line that passes through the cross-sectional centroid of the linear-shaped layout feature at all points along its length, wherein the cross-sectional centroid of the linear-shaped layout feature at any given point along its length is the centroid of its vertical cross-section area at the given point.

In another embodiment, some linear-shaped layout features in a given level may not be centered upon a virtual line of the virtual grate associated with the given level. However, in this embodiment, the linear-shaped layout features remain parallel to the virtual lines of the virtual grate, and hence parallel to the other linear-shaped layout features in the given level. Therefore, it should be understood that the various linear-shaped layout features defined in a layout of a given level are oriented to extend across the given level in a parallel manner.

Also, in the dynamic array architecture, in one embodiment, each linear-shaped layout feature is defined to be devoid of a substantial change in direction along its length. The lack of substantial change in direction of a linear-shaped layout feature is considered relative to the line of the virtual grate along which the linear-shaped layout feature is defined. In one embodiment, a substantial change in direction of a linear-shaped layout feature exists when the width of the linear-shaped layout feature at any point thereon changes by more than 50% of the nominal width of the linear-shaped layout feature along its entire length. In another embodiment, a substantial change in direction of a linear-shaped layout feature exists when the width of the linear-shaped layout feature changes from any first location on the linear-shaped layout feature to any second location on the linear-shaped layout feature by more that 50% of the linear-shaped layout feature width at the first location. Therefore, it should be appreciated that the dynamic array architecture specifically avoids the use of non-linear-shaped layout features, wherein a non-linear-shaped layout feature includes one or more bends within a plane of the associated level.

In the dynamic array architecture, variations in a vertical cross-section shape of an as-fabricated linear-shaped layout feature can be tolerated to an extent, so long as the variation in the vertical cross-section shape is predictable from a manufacturing perspective and does not adversely impact the manufacture of the given linear-shaped layout feature or its neighboring layout features. In this regard, the vertical cross-section shape corresponds to a cut of the as-fabricated linear-shaped layout feature in a plane perpendicular to the centerline of the linear-shaped layout feature. It should be appreciated that variation in the vertical cross-section of an as-fabricated linear-shaped layout feature along its length can correspond to a variation in width along its length.

Therefore, the dynamic array architecture also accommodates variation in the width of an as-fabricated linear-shaped layout feature along its length, so long as the width variation is predictable from a manufacturing perspective and does not adversely impact the manufacture of the linear-shaped layout feature or its neighboring layout features.

Additionally, different linear-shaped layout features within a given level can be designed to have the same width or different widths. Also, the widths of a number of linear-shaped layout features defined along adjacent lines of a given virtual grate can be designed such that the number of linear-shaped layout features contact each other so as to form a single linear-shaped layout feature having a width equal to the sum of the widths of the number of linear-shaped layout features.

Within a given level defined according to the dynamic array architecture, proximate ends of adjacent, co-aligned linear-shaped layout features may be separated from each other by a substantially uniform gap. More specifically, adjacent ends of linear-shaped layout features defined along a common line of a virtual grate are separated by an end gap, and such end gaps within the level associated with the virtual grate may be defined to span a substantially uniform distance. Additionally, in one embodiment, a size of the end gaps is minimized within a manufacturing process capability so as to optimize filling of a given level with linear-shaped layout features.

Also, in the dynamic array architecture, a level can be defined to have any number of virtual grate lines occupied by any number of linear-shaped layout features. In one example, a given level can be defined such that all lines of its virtual grate are occupied by at least one linear-shaped layout feature. In another example, a given level can be defined such that some lines of its virtual grate are occupied by at least one linear-shaped layout feature, and other lines of its virtual grate are vacant, i.e., not occupied by any linear-shaped layout features. Furthermore, in a given level, any number of successively adjacent virtual grate lines can be left vacant. Also, the occupancy versus vacancy of virtual grate lines by linear-shaped layout features in a given level may be defined according to a pattern or repeating pattern across the given level.

Additionally, within the dynamic array architecture, vias and contacts are defined to interconnect a number of the linear-shaped layout features in various levels so as to form a number of functional electronic devices, e.g., transistors, and electronic circuits. Layout features for the vias and contacts can be aligned to a virtual grid, wherein a specification of this virtual grid is a function of the specifications of the virtual grates associated with the various levels to which the vias and contacts will connect. Thus, a number of the linear-shaped layout features in various levels form functional components of an electronic circuit. Additionally, some of the linear-shaped layout features within various levels may be non-functional with respect to an electronic circuit, but are manufactured nonetheless so as to reinforce manufacturing of neighboring linear-shaped layout features. It should be understood that the dynamic array architecture is defined to enable accurate prediction of semiconductor device manufacturability with a high probability.

In view of the foregoing, it should be understood that the dynamic array architecture is defined by placement of linear-shaped layout features on a regular-spaced grate (or regular-spaced grid) in a number of levels of a cell, such that linear-shaped layout features in a given level of the cell are oriented to be substantially parallel with each other in their traversal direction across the cell. Also, in one embodiment of the dynamic array architecture, prior to process compensation technique (PCT) processing, each linear-shaped layout feature is defined to be devoid of a substantial change in direction relative to its traversal direction.

Nomenclature

In the figures and text herein, certain naming conventions are applied as follows:

VG: virtual grate;

VG lines: virtual lines of a virtual grate;

Wire: a linear shaped layout feature on a given level with a centerline parallel to a VG line of the given level and region thereof under consideration;

Conductive layout feature: a layout shape on a level such as active, gate electrode, local interconnect, metal (interconnect) level, or other level that may be conductive and is not a contact or via level;

Long edge: a linear shaped layout feature's edge that is oriented parallel to VG lines of the level in which the linear shaped layout feature is defined, regardless of the aspect ratio of the linear shaped layout feature;

Line end: a linear shaped layout feature edge that is oriented orthogonal (perpendicular) to VG lines for the level in which the linear shaped layout feature is defined;

End gap: a space between line ends of linear shaped layout features placed line end-to-line end;

Parallel wires: wires having parallel long edges and offset centerlines;

Width: a wire dimension orthogonal to the VG line upon which the wire is placed;

Regular wires: a number of wires of common width placed according to a VG of a given level;

Standard gap (standard spacing): a distance measured perpendicularly between facing long edges of adjacent and parallel regular wires;

Irregular wire: a wire in a given level that does not have the common width of other regular wires in the given level or that is not centered on a VG line of the given level;

Irregular spacing: a distance measured perpendicularly between long edges of wires that is not equal to the standard gap (standard spacing);

Spacing variation: a difference between irregular spacing and standard gap (standard spacing). In one embodiment, spacing variation may be defined as a maximum spacing variation within an area of a given level. In another embodiment, spacing variation may be defined as an average value within an area of a given level. In another embodiment, spacing variation may be defined based on a single instance of irregular spacing;

Sub-resolution (sub-res) shape: a shape that is drawn but intentionally not manufactured due to having one or more dimensions below the resolution capability of a manufacturing system. For example, at least one dimension (length or width, etc.) of the sub-res shape may be small enough to guarantee that the sub-res shape will not be resolved as a manufactured feature, even when the sub-res shape is placed in compliance with normal edge spacing constraints relative to other layout shapes;

Gate: a gate electrode feature defined as part of a transistor;

Irregular wire layout region: a layout region bounded by regular wires within which one or more irregular wires are placed.

Exemplary Embodiments

In one embodiment, a layout defined in accordance with the dynamic array architecture may include the following attributes: 1) shapes are rectangular, i.e., linear-shaped, 2) wire and contact pitch is substantially constant in a direction orthogonal to routing, 3) wire width is substantially constant, 4) side-to-side and end-of-line wire spacings are substantially constant, 5) overall shape density is as uniform as possible, and 6) the proximity of gaps in wires to other wire shapes is managed to avoid lithographic disturbance. It should be understood, however, that in some embodiments, a layout defined in accordance with the dynamic array architecture may not include all of the attributes associated with the above-mentioned embodiment. Methods and techniques are disclosed herein for enhancing layout in situations where particular layout areas or layout shapes do not strictly follow the dynamic array architecture but are contained within a layout that substantially follows the dynamic array architecture.

An exemplary CMOS transistor configuration is shown in FIG. 1. Gate electrode (gate) wires 160-162 each have a different width W2 in comparison to a standard width W1 of gate wires 110-118. Gate wires 110-117 and 160-162 form gate electrodes of transistors where they overlap with active shapes 120-122. Gate level wire 118 is an example of a wire on a gate electrode level that does not traverse an active level and is not used to form a gate electrode. Source or drain contact shapes such as 140-142 and gate contacts such as 143 and 144 are indicated as examples of shapes on the contact (CON) level.

Each gate electrode is defined to extend beyond the edges of its underlying active region. Each portion of a gate electrode that extends beyond an edge of its underlying active region is referred to as an overlap portion of the gate electrode. A traversal direction of a gate electrode relative to its underlying active region is defined as a direction that extends between the overlap portions of the gate electrode and that is perpendicular to the edges of the underlying active region beyond which the overlap portions of the gate electrode extend. For example, considering gate electrode feature 114, overlapping portions 114A and 114B extend beyond active region edges 121A and 121B, respectively. Therefore, arrow 170 represents the traversal direction of gate electrode 114, as arrow 170 extends between the overlap portions 114A and 114B of the gate electrode 114 and is perpendicular to the edges 121A and 121B of the underlying active region 121 beyond which the overlap portions 114A and 114B of the gate electrode 114 extend.

Gate dimensions which run perpendicular to the traversal direction of the gate over its underlying active region, such as W1 and W2, are referred to as gate channel lengths. Use of multiple gate channel lengths in a given level represents one of many cases in which multiple values for a given type of dimension, e.g., width, can be applied to different layout shapes on a given level. This invention applies to any level in which non-standard shape dimensions may occur, wherein a given shape dimension is considered non-standard in a given level when a value of the given shape dimension varies among layout features in the given level. For ease of discussion, the principles of the present invention are described herein with respect to a gate level in various exemplary embodiments. However, it should be understood that the principles of the present invention as referenced to a gate level in the exemplary embodiments herein can be equally applied to any chip level. For example, the principles of the present invention can be equally applied to an active level, a local interconnect level, a metal (interconnect) level, a contact level, a via level, or essentially any other chip level.

Figure 2A:
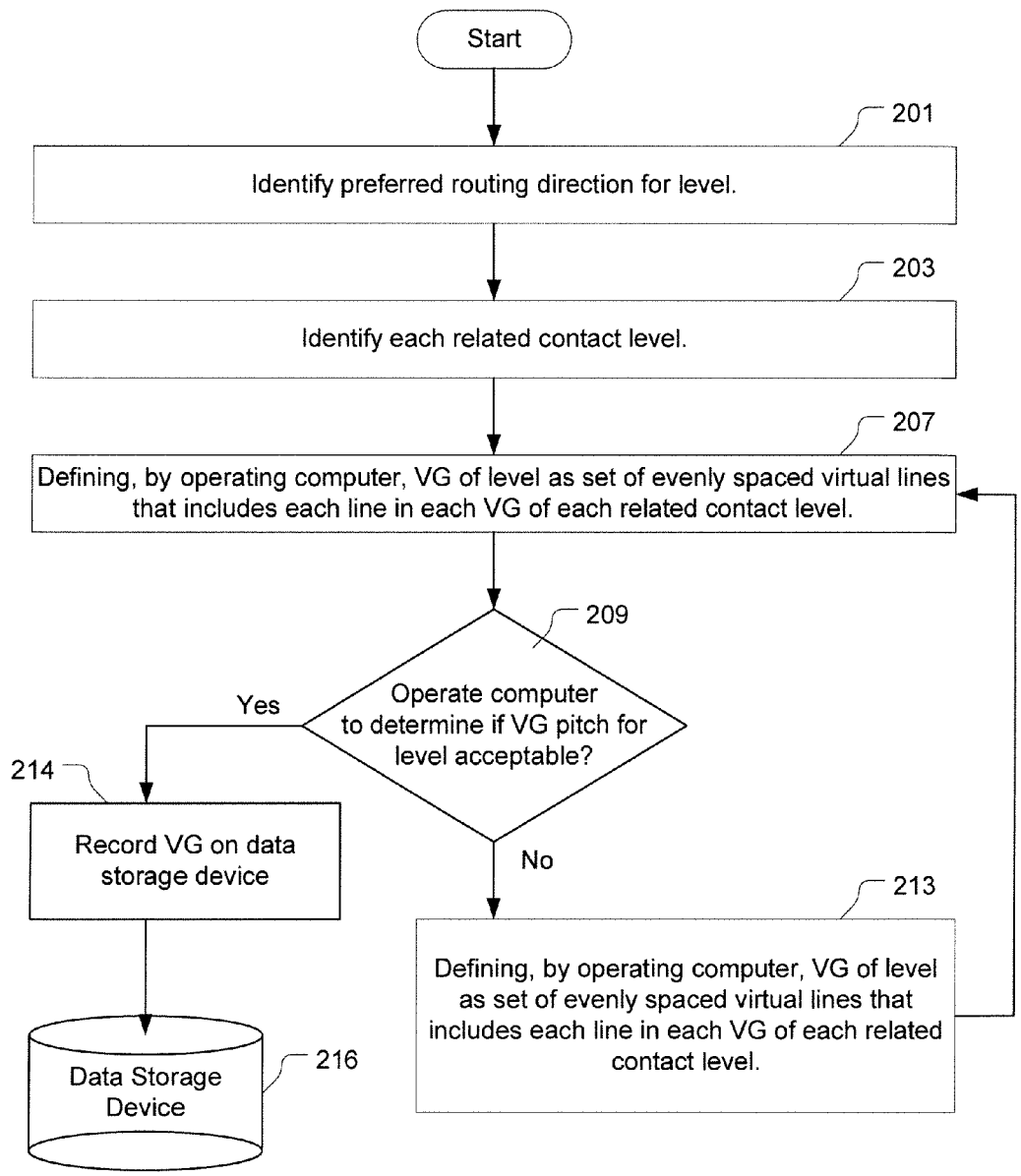
FIG. 2A shows a flowchart of a method for defining a virtual grate for a given chip level, or portion thereof, in accordance with one embodiment of the present invention.
Figure 2B:
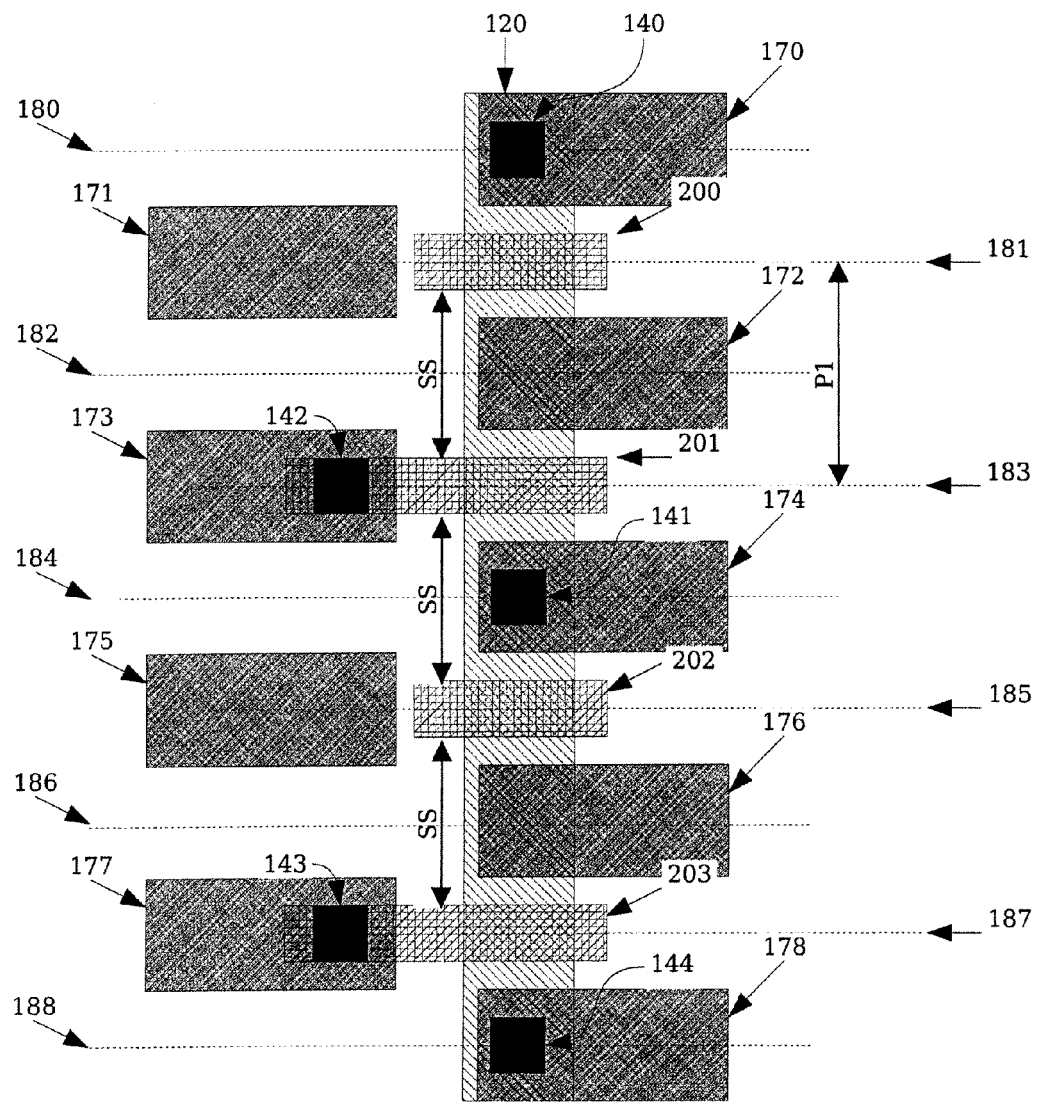
FIG. 2B shows virtual lines of a contact level virtual grate which indicate preferred placement locations in one dimension for contact level shapes, in accordance with one embodiment of the present invention.

Also shown in FIG. 1 are lines 100-103 of a virtual grate (VG) for the gate level. The virtual lines 100-103 are spaced apart from each other by a constant line-to-line pitch P1. FIG. 2A is an illustration showing a flowchart of one method for defining a VG for a given chip level, or portion thereof, referred to as the given level hereafter. The method includes an operation 201 for identifying a preferred routing direction for the given level. The method also includes an operation 203 for identifying each related contact level, wherein a related contact level includes at least one shape that is to make contact with a shape in the given level. Virtual lines of a contact level VG indicate preferred placement locations in one dimension for contact level shapes, even if contact level shapes are not present on every virtual line of the contact level VG in a layout under consideration. An example of this may be seen in FIG. 2B, where a VG for gate CON shapes includes virtual lines 181, 183, 185, and 187. The example of FIG. 2B shows gate CON shapes 142 and 143 present on VG lines 183 and 187, and no gate CON shapes present on the other VG lines 181 and 185 for the gate CON level.

The method described in FIG. 2A also includes an operation 207 for defining the VG for the given level as a set of evenly spaced virtual lines that represent centerline locations of wires to be placed on the given level. The VG for the given level is defined such that a number of its virtual lines coincide with virtual lines of the contact level VG, such that wires placed in the given level according to the VG of the given level can provide sufficient coverage of contacts placed according to the contact level VG lines, wherein the contact level VG lines are commonly oriented with the VG lines of the given level and hence with the routing direction of wire placed in the given level. In FIG. 2B, a VG for source/drain CON shapes 140, 141, and 144 includes virtual lines 180, 182, 184, 186, and 188. It should be appreciated that source/drain CON shapes 140, 141, and 144 are electrically connected to active region 120. A VG for MET1 level shapes 170-178 includes VG lines 180-188. Because the MET1 level shapes are related (i.e., connect) to the source/drain CON shapes (140, 141, 144) and/or to the gate CON shapes (142, 143), the VG for the MET1 level includes both the virtual lines (181, 183, 185, 187) of the gate CON VG, and the virtual lines (180, 182, 184, 186, 188) of the source/drain CON VG. A VG for gate level shapes 200-203 includes VG lines 181, 183, 185, and 187. Because the gate level shapes (200-203) are related (i.e., connect) to the gate CON shapes (142, 143), the VG for the gate level includes the virtual lines (181, 183, 185, 187) of the gate CON VG. As shown in FIG. 2B, the VG for the gate level is defined by parallel virtual lines (181, 183, 185, 187) spaced at a line-to-line pitch P1.

The method of FIG. 2A further includes an operation 209 for determining whether or not the line-to-line spacing of the VG for the given level allows for enforcement of the dynamic array architecture within the given level so as to ensure optimal manufacturability of shapes in the given level. Examples of sub-optimal VG pitches include, but are not limited to: 1) a VG pitch that may be too large for shapes placed in accordance therewith to provide sufficient lithographic reinforcing benefits to each other, or 2) a VG pitch that may be too small to identify shape placements in accordance therewith, such that shapes are sufficiently regularly spaced and/or such that shapes are positioned for optimal lithography or manufacturing. If the VG pitch for the given level is acceptable, the method proceeds with an operation 214 in which the VG is recorded on a data storage device 216. However, if the VG pitch for the given level is NOT acceptable, the method proceeds with an operation 213. In operation 213, an adjustment is made to the VG of one or more of the related contact levels as previously identified in operation 203. Following operation 213, the method reverts back to operation 207.

With reference back to the exemplary embodiment of FIG. 1, each space SS between the long edges of neighboring gate wires 110-118 and 160-162 is substantially equivalent. Such consistency in long edge-to-long edge spacing may be beneficial to manufacturing results. However, since the widths W1 and W2 of the gate wires are not equal, use of the substantially equivalent long edge-to-long edge spacing SS causes some gate wire centerlines to be placed off of the virtual lines 100-103 of the gate level VG. For example, centerlines of shape 160 (having the non-standard width W2) and shapes 115 and 116 therebelow are not aligned with the VG lines 101-103, respectively. Similarly, in this example, centerlines of shape 161 (having the non-standard width W2) and shapes 102 and 103 therebelow are not aligned with the VG lines 101-103, respectively. Therefore, in this embodiment, gate wire shapes below VG line 100 are not placed so as to have their respective centerlines align with a VG, and consequently do not comply with the dynamic array architecture attribute regarding placement of linear features according to a VG within a given layout area, wherein the VG is defined by a set of parallel virtual lines spaced according to a substantially constant line-to-line pitch. Additionally, because the gate wire shapes below VG line 100 do not comply with the dynamic array architecture attribute regarding placement of linear features according to a VG within a given layout area, definition of the gate wire shapes below VG line 100 may not be optimal for manufacturing or layout efficiency.

Figure 3A:
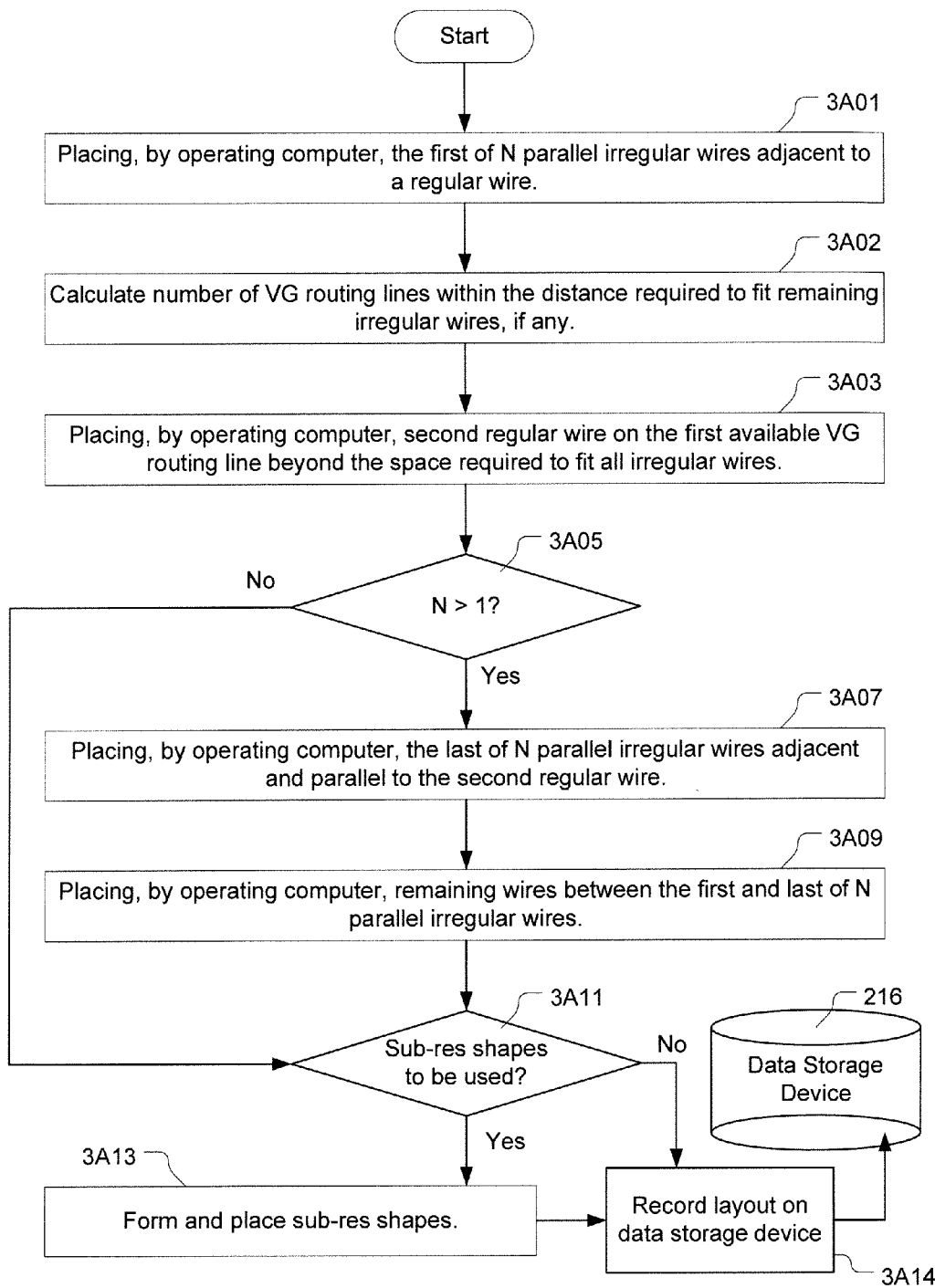
FIG. 3A shows a flowchart of a method for placement of shapes such that the impact of using irregular wires in conjunction with the dynamic array architecture may be minimized, and re-alignment to a virtual grate occurs for regular shapes outside of a layout region where there are irregular wires, in accordance with one embodiment of the present invention.

FIG. 3A is an illustration showing a flowchart of a method for placement of shapes such that the impact of using irregular wires in conjunction with the dynamic array architecture may be minimized, and re-alignment to a VG occurs for regular shapes outside of a layout region where there are irregular wires. The method includes an operation 3A01 in which a first irregular wire is placed next to a first regular wire. It should be understood that numerical designations used for particular wires, e.g., "first" irregular wire, "first" regular wire, etc., do not denote absolute wire position within a layout, but rather are used to differentiate between wires. Determination of the distance between facing long edges of the first irregular wire and the first regular wire may be based on one or more of the following considerations: 1) making such a distance substantially equivalent to a standard distance between adjacent facing long edges of regular wires, 2) providing sufficient room for a dummy shape or a sub-res shape to be inserted between the first irregular wire and the first regular wire, 3) using a distance that enables even spacing between centerlines of irregular wires within the irregular wire layout region, 4) using a distance that enables even spacing between facing long edges of adjacently placed irregular wires within the irregular wire layout region, 5) forcing irregular wires to be centered on a VG line, or 6) enabling some other desired spacing pattern for layout shapes within the irregular wire layout region, among others. The first irregular wire may belong to a group of N irregular wires that are parallel and adjacent, or it may be a solitary irregular wire with regular wires placed parallel and adjacent to both long edges of the solitary irregular wire. It should be understood that in the case of a solitary wire placed within the irregular wire layout region (N=1), the first and last irregular wire mentioned in the method of FIG. 3A refer to the same irregular wire.

The method also includes an operation 3A02 in which a calculation is made of a number of VG routing lines within the distance required to fit all remaining irregular wires parallel to the first irregular wire. In one embodiment, the calculation of operation 3A02 takes into account the space required to allow a regular wire to be placed on a VG line beyond the area with irregular wires. The method also includes an operation 3A03 in which a second regular wire is placed with it's centerline co-linear with a first available VG line beyond the VG line required to place the N-th irregular shape, as calculated in operation 3A02. In the decision operation 3A05, if the number of parallel irregular wires is greater than one (N>1), the method continues with an operation 3A07.

In the operation 3A07, a last irregular wire is placed adjacent (albeit spaced apart from) and parallel to the second regular wire. Determination of the distance between facing long edges of last irregular wire and second regular wire may be based on placement considerations for the irregular wire such as those considerations described for operation 3A01. The method continues with an operation 3A09 in which all other irregular wires between the first and last irregular wires are placed. Operation 3A09 may involve placement considerations similar to those described for operation 3A01.

From the operation 3A09, the method proceeds with an operation 3A11. Also, with reference back to the decision operation 3A05, if the number of parallel irregular wires is one (N=1), the method proceeds to operation 3A11. In the operation 3A11, an evaluation is made regarding the use of sub-res shapes, which may provide lithographic reinforcement to shapes in their vicinity, thereby resulting in improved manufacturing results. If the evaluation of operation 3A11 determines that sub-res shapes are not to be used, the method proceeds with an operation 3A14 for recording the layout on the data storage device 216. If the evaluation of operation 3A11 determines that sub-res shapes are to be used, the method proceeds to an operation 3A13, in which sub-res shapes are formed and placed. Sub-res shape formation is the determination of the polygonal outline of a sub-res shape. Sub-res shape placement may be in spaces adjacent to long edges of irregular or regular wires and may be influenced by considerations for optimal spacing, as described in conjunction with operation 3A01. Following the completion of operation 3A13, the method proceeds with the operation 3A14 for recording the layout on the data storage device 216.

It should be understood that for parallel and adjacent placement of more than one successive irregular wire, the method described in FIG. 3A has an operational order that provides for regular wire bracketing of the region of irregular wires, prior to placement of multiple irregular wires. This operational order facilitates calculation of where to place the last irregular wire (operation 3A07), and other irregular wires between the first and last irregular wires. In addition to the foregoing, however, it should be understood that the various operations of the method of FIG. 3A may be performed in a non-sequential order in some embodiments. Additionally, it should be understood that the method of FIG. 3A represents one exemplary method for achieving the layout features and principles illustrated in the figures herein. It should be appreciated that other methods, including variants of the method of FIG. 3A, may be utilized to achieve the layout features and principles illustrated in the figures herein. Moreover, it should be understood that the methods described herein and the layouts defined in accordance with those methods are not restricted to a particular VG or to a particular wire routing direction. Specifically, the methods described herein can be applied to a layout region of any chip level and can be implemented using either a vertically oriented VG or a horizontally oriented VG.

In one embodiment, an optimal spacing between facing long edges of a regular wire and an irregular wire, or between facing long edges of two adjacent irregular wires, is determined by maximizing the number of times that these long edge-to-long edge spacings are equal to a standard spacing. In this embodiment, the standard spacing is defined as a distance measured perpendicularly between facing long edges of adjacent and parallel regular wires.

Figure 3B:
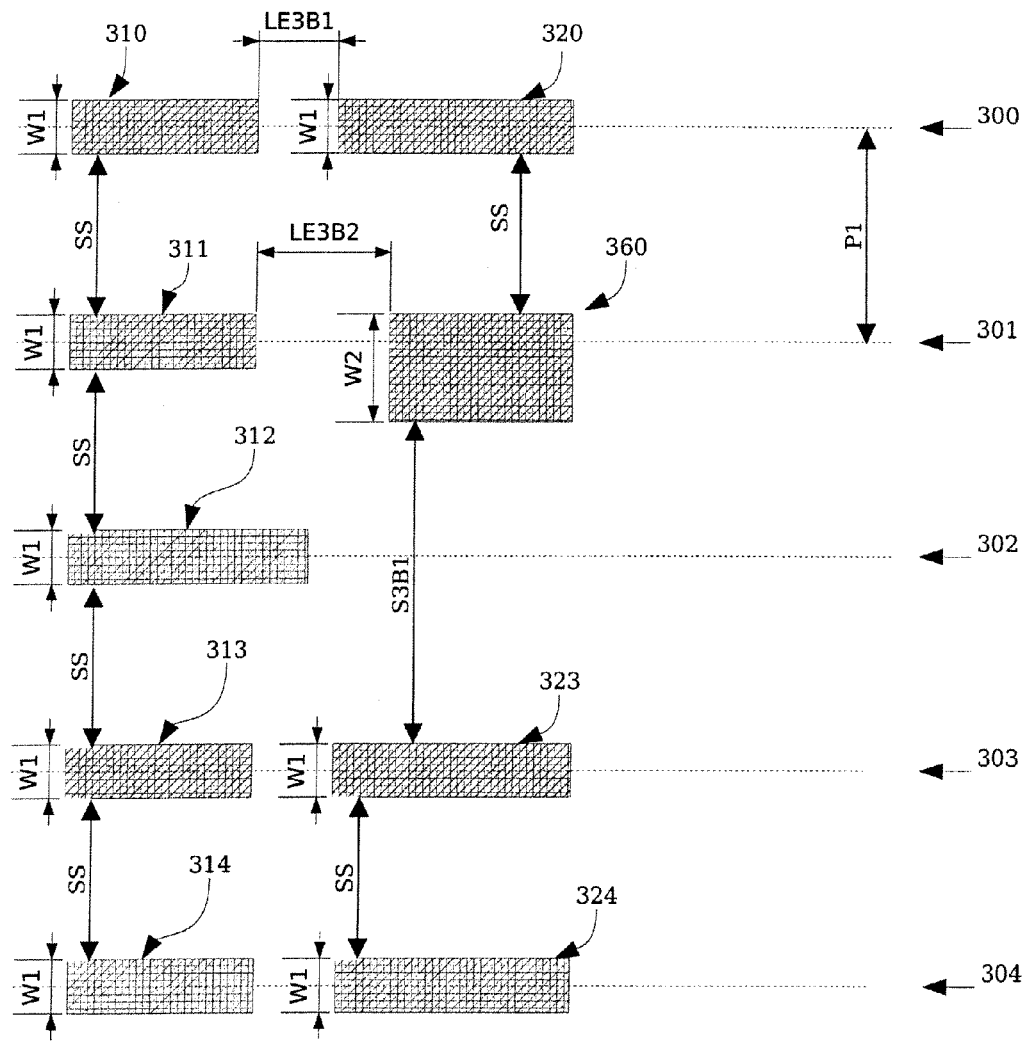
FIG. 3B shows an exemplary layout defined in accordance with the method of FIG. 3A in which one irregular wire is placed such that a standard long edge-to-long edge spacing is used between one long edge of the irregular wire and a facing edge thereto of an adjacent and parallel regular wire, in accordance with one embodiment of the present invention.

FIG. 3B is an illustration showing an exemplary layout defined in accordance with the method of FIG. 3A in which one irregular wire 360 is placed (N=1) such that a standard long edge-to-long edge spacing SS is used between one long edge of the irregular wire and a facing edge thereto of an adjacent and parallel regular wire 320. In the exemplary layout of FIG. 3B, each of regular wires 310-314, 320, 323, and 324 having width W1 is placed in a centered manner on a respective virtual line 300-304 of a VG. Adjacent virtual lines 300-304 of the VG are spaced at a substantially constant pitch P1. The single irregular wire 360 has a width W2 and is placed such that the spacing from a first of its long edges to the facing long edge of the parallel and adjacent regular wire 320 is set to the standard spacing SS. As a result, the distance between a second long edge of the irregular wire 360 (opposite to the first long edge) and a facing long edge thereto of the adjacent and parallel regular wire 323 may be non-standard, as illustrated by non-standard spacing S3B1 in FIG. 3B. A spacing variation (SV3B) in this example is defined as a difference between the non-standard spacing S3B1 and the standard spacing SS, i.e., SV3B=S3B1−SS.

In FIG. 3B, regular wire 323 and regular wires below it, such as regular wire 324, are centered on a VG virtual line. In other words, regular wires can be re-aligned to the VG beyond the irregular wire layout region within which the irregular wires are placed. Also, re-alignment of regular wires to the VG may commence at a first virtual line instance of the VG that is a sufficient distance away from an outer irregular wire, wherein the outer irregular wire is peripherally placed within the irregular wire layout region. If the irregular wire layout region contains one irregular wire, then the one irregular wire is considered a peripherally placed irregular wire, and hence an outer irregular wire. If the irregular wire layout region contains two irregular wires, then each of the two irregular wires is considered a peripherally placed irregular wire, and hence an outer irregular wire. Additionally, if the irregular wire layout region includes three or more irregular wires, numbered in an adjacent sequential manner as irregular wire one through irregular wire N, then each of irregular wire one and irregular wire N is considered a peripherally placed irregular wire, and hence an outer irregular wire. Moreover, a sufficiency of the distance away from the outer irregular wire at which re-alignment of regular wires to the VG may commence can be evaluated based on whether both the outer irregular wire and the regular wire adjacent thereto are within an applicable manufacturing process window as defined by a lithographic domain of focus and exposure that yields an acceptable fidelity of both the outer irregular wire and the regular wire adjacent thereto. Based on the example of FIG. 3B, and other examples described hereafter, is should be appreciated that the method of FIG. 3A provides a beneficial effect of limiting a size of the irregular wire layout region within a given level.

As shown in FIG. 3B, line ends of shapes on different VG lines may or may not be aligned. For example, line ends of wires 311 and 312 are not aligned, but line ends of wires 313 and 314 are aligned. Furthermore, a distance between facing line ends of wires which overlie a common virtual line of the VG, i.e., end gap, may or may not be constant. For example, an end gap LE3B1 between facing line ends of wires 310 and 320 is different than an end gap LE3B2 between facing line ends of wires 311 and 360. It should be understood that unless otherwise specified, end gaps and alignments between line ends of adjacent parallel wires, as illustrated in the embodiments herein, are provided by way of example and do not imply a restriction on end gaps or line end alignments. Also, it should be understood that unless otherwise specified, irregular wire widths as illustrated in the exemplary embodiments herein do not imply a restriction or requirement with regard to irregular wire widths or relationships therebetween.

Figure 3C:
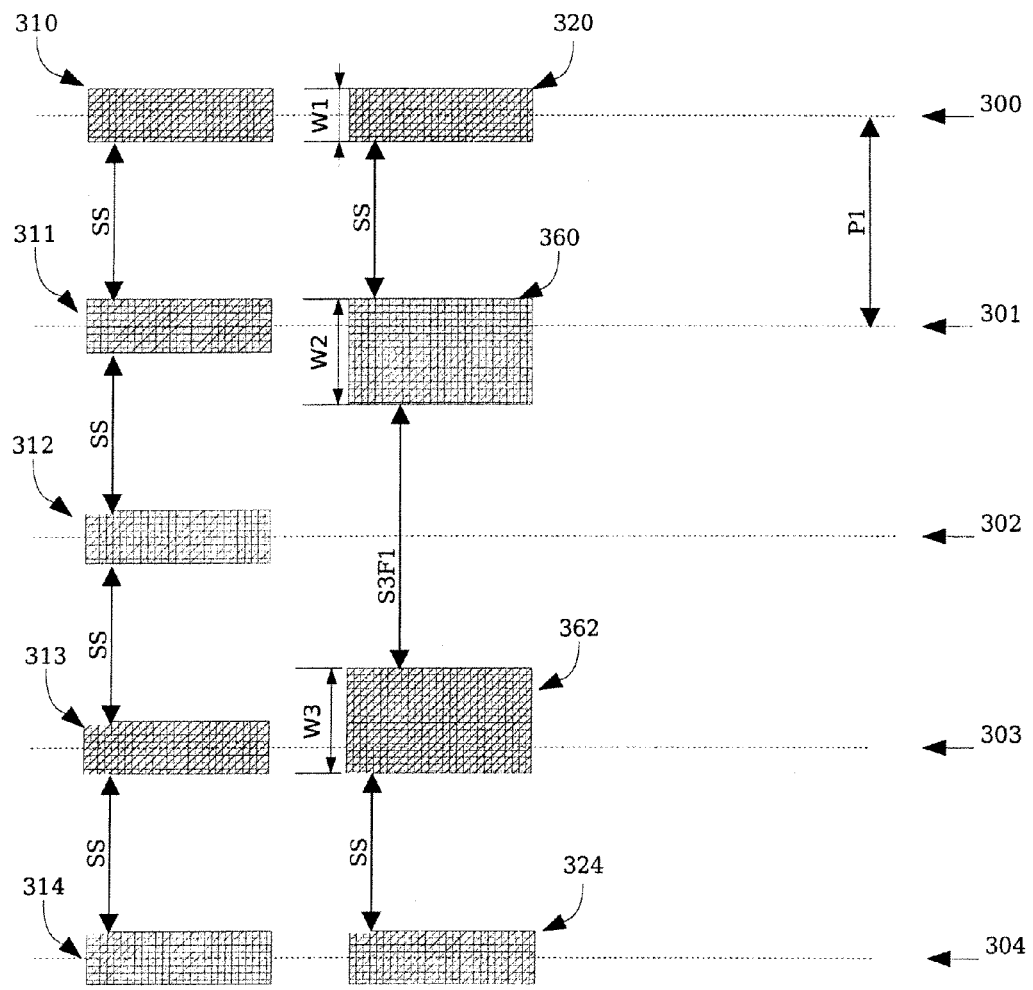
FIG. 3C shows an exemplary layout defined in accordance with the method of FIG. 3A in which multiple irregular wires are placed such that a standard long edge-to-long edge spacing is used between one long edge of each of the irregular wires and a facing edge thereto of an adjacent and parallel regular wire, in accordance with one embodiment of the present invention.

FIG. 3C is an illustration showing an exemplary layout defined in accordance with the method of FIG. 3A in which multiple irregular wires 360 and 362 (N>1) are placed such that a standard long edge-to-long edge spacing SS is used between one long edge of each of the irregular wires 360 and 362 and a facing edge thereto of an adjacent and parallel regular wire 320 and 324, respectively. Thus, the exemplary layout of FIG. 3C has a standard gap SS between long edges of first and last irregular wires 360 and 362 and facing long edges of regular wires 320 and 324, respectively. In FIG. 3C, the two irregular wires 360 and 362 (N=2) have irregular widths W2 and W3, respectively. Use of the standard gap SS outboard of both the first and last irregular wires 360 and 362 with N=2 results in only one irregular spacing S3F1 and a spacing variation SV3F=S3F1−SS.

Figure 3D:
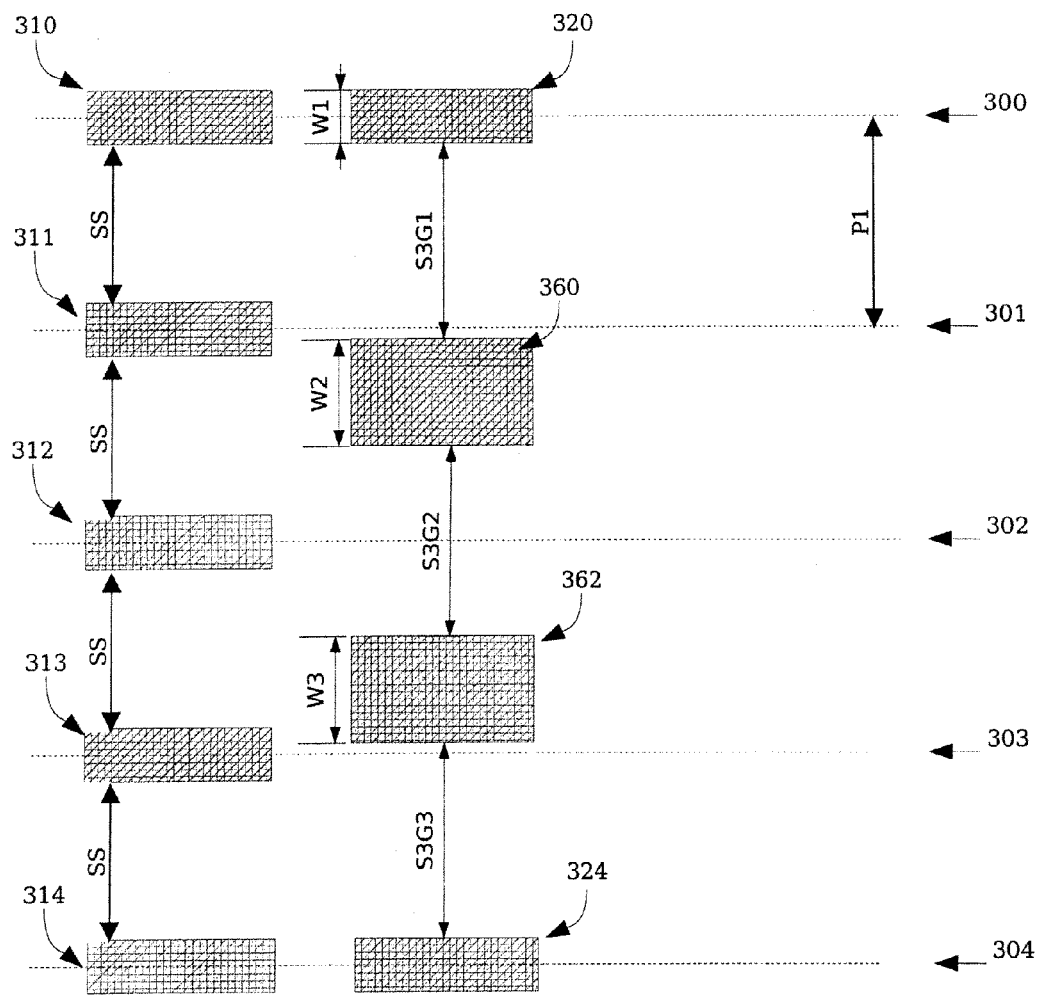
FIG. 3D shows an exemplary layout defined in accordance with the method of FIG. 3A in which optimal spacing between facing long edges of adjacent regular and irregular wires and between facing long edges of adjacent irregular wires within an irregular wire layout region is based on minimization of differences between these long edge-to-long edge spacings within the irregular wire layout region, in accordance with one embodiment of the present invention.

In one embodiment, optimal spacing between facing long edges of adjacent regular and irregular wires and/or between facing long edges of adjacent irregular wires within an irregular wire layout region is based on minimization of differences between these long edge-to-long edge spacings within the irregular wire layout region. FIG. 3D is an illustration showing an exemplary layout defined in accordance with the method of FIG. 3A in which optimal spacing between facing long edges of adjacent regular and irregular wires and between facing long edges of adjacent irregular wires within an irregular wire layout region is based on minimization of differences between these long edge-to-long edge spacings within the irregular wire layout region. In the exemplary layout of FIG. 3D, the long edges of wires 360 and 362 are separated from facing long edges of regular wires 320 and 324, respectively, by spacings S3G1 and S3G3, which is not equal to the standard spacing SS. This forces a reduction in a space S3G2 between irregular wires 360 and 362, as compared to the corresponding spacing S3F1 between irregular wires 360 and 362 in FIG. 3C. It is possible to make each of long edge-to-long edge spacings S3G1, S3G2, and S3G3 more similar to the standard spacing SS than long edge-to-long edge spacing S3F1 from FIG. 3C.

FIG. 3D illustrates how a maximum spacing variation SV3G for the irregular wire layout region may be reduced by minimizing differences between the long edge-to-long edge spacings within the irregular wire layout region, wherein SV3G=MAX(S3G1,S3G2,S3G3)−SS. Generally speaking, maximum spacing variation within an irregular wire layout region is minimized when long edge-to-long edge spacings within the irregular wire layout region are equalized. For example, in the embodiment of FIG. 3D, the maximum spacing variation SV3G within the irregular wire layout region is minimized when long edge-to-long edge spacings within the irregular wire layout region are equal, i.e., when S3G1=S3G2=S3G3. It should be appreciated that reduction of maximum or average spacing variation in an irregular wire layout region may be beneficial to manufacturing.

In another embodiment, optimal definition and placement of irregular wires within an irregular wire layout region may require that a spacing between facing long edges of adjacent regular and irregular wires and/or between facing long edges of adjacent irregular wires within the irregular wire layout region be based on criteria other than minimization of differences between the long edge-to-long edge spacings within the irregular wire layout region. Consequently, optimal definition and placement of irregular wires within an irregular wire layout region may require that a number of long edge-to-long edge spacings within the irregular wire layout region be intentionally defined different from a standard long edge-to-long edge spacing. For example, due to non-standard widths of irregular wires or other considerations, the optimum spacing between a long edge of an irregular wire and a facing long edge of an adjacent wire (regular or irregular) may not be the same as the standard spacing between facing long edges of two adjacent regular wires. For example, in the embodiment of FIG. 3D, the optimum long edge-to-long edge spacings S3G1, S3G2, S3G3 within the irregular wire layout region may be set according to irregular wire spacing optimization criteria other than minimization of the maximum spacing variation SV3G within the irregular wire layout region.

In one embodiment, spacing variation may be reduced by increasing the number N of parallel and adjacently placed irregular wires within the irregular wire layout region. Increasing the number N of irregular wires may reduce spacing variation for certain values of irregular wire width and long edge-to-long edge wire spacing within the irregular wire layout region, including spacings between facing long edges of adjacent regular and irregular wires and between facing long edges of adjacent irregular wires within the irregular wire layout region. A long edge-to-long edge spacing adjustment to be applied across an irregular wire layout region, to enable centering of two regular wires on respective virtual lines of the VG bordering the irregular wire layout region, can be shared among more long edge-to-long edge wire spaces within the irregular wire layout region when the number N of irregular wires is increased. Therefore, increasing the number N of irregular wires within the irregular wire layout region may reduce a magnitude of individual wire spacing adjustment within the irregular wire layout region that is necessary to minimize spacing variation.

Figure 3E:
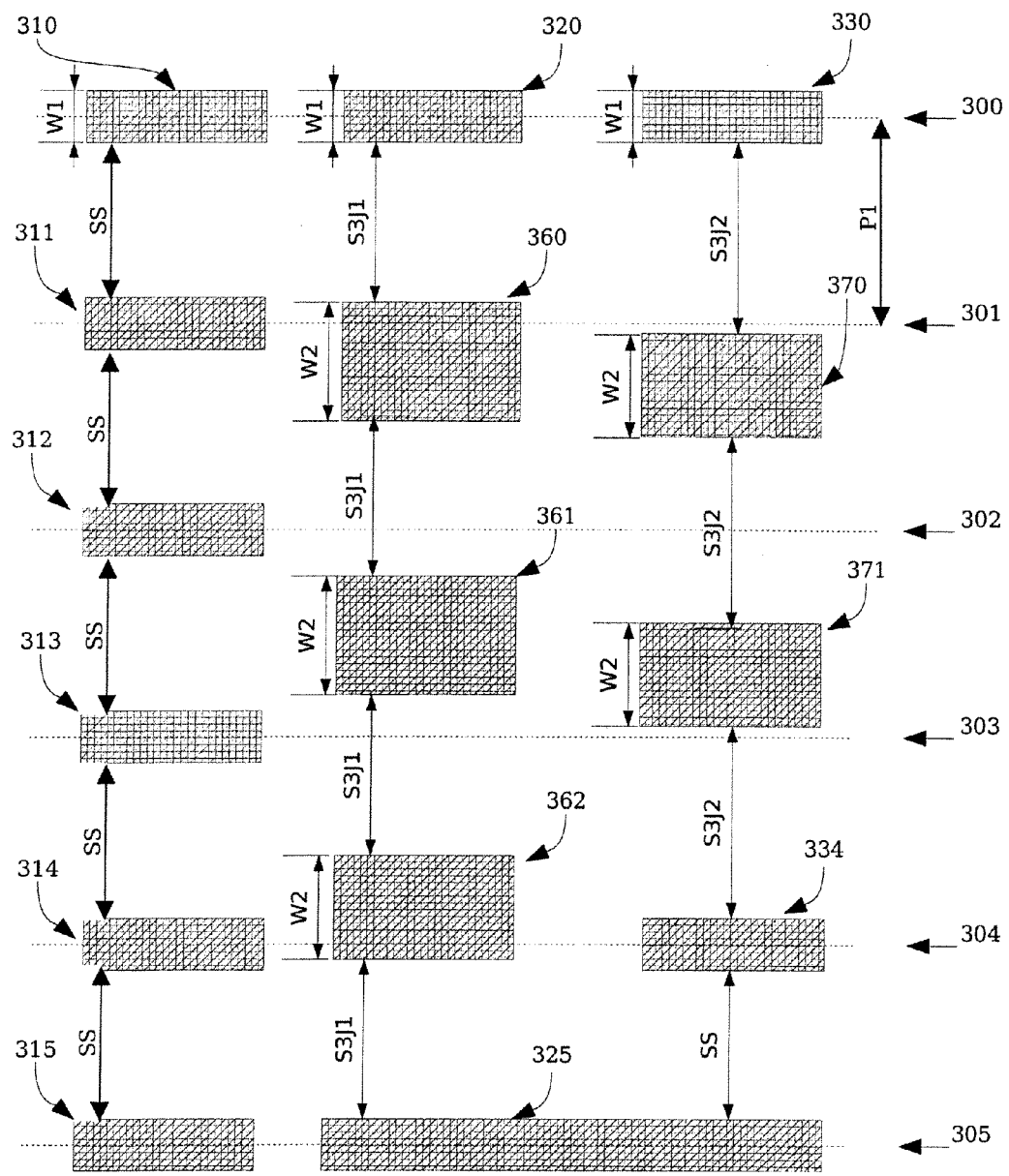
FIG. 3E shows an exemplary layout that demonstrates how spacing variation can be reduced by increasing the number of irregular wires within an irregular wire layout region, in accordance with one embodiment of the present invention.

FIG. 3E is an illustration showing an exemplary layout that demonstrates how spacing variation can be reduced by increasing the number N of irregular wires within an irregular wire layout region. Irregular wires 360-362 are placed in a first irregular wire layout region within which an equal long edge-to-long edge wire spacing S3J1 is utilized. Irregular wires 370-371 are placed in a second irregular wire layout region within with an equal long edge-to-long edge wire spacing S3J2 is utilized. In the exemplary layout of FIG. 3E, each of irregular wires 360-362 and 370-371 has a width W2. Equal irregular wire spacings (S3J1 and S3J2, respectively) and equal irregular wire width (W2) are utilized in the exemplary layout of FIG. 3E for ease of description. However, it should be understood that use of an equal irregular wire spacing and use of an equal irregular wire width is not a pre-requisite for implementing the embodiment in which spacing variation is reduced by increasing the number N of irregular wires within an irregular wire layout region.

A term NVG is defined as a number of virtual lines of the VG that are located between the two regular wires which bound the irregular wire layout region. For the first irregular wire region including irregular wires 360-362, NVG equals 4 and includes virtual lines 301-304. For the second irregular wire region including irregular wires 370-371, NVG equals 3 and includes virtual lines 301-303. In the example of FIG. 3E, a standard spacing SS between regular wires is defined as SS=P1−W1, wherein P1 is the VG pitch and W1 is a width of the regular wires (310-315, 320, 325, 330, 334). For each irregular wire layout region, irregular spacing S3Jn= ((NVGn+1)*P1−W1−Nn*W2)/(Nn+1), wherein (n) identifies the irregular wire layout region. For the first irregular wire layout region (n=1) including irregular wires 360-362, N1=3 and NVG1=4, thereby yielding irregular spacing S3J1=(5P1−W1−3*W2)/4. For the second irregular wire layout region (n=2) including wires 370-371, N2=2 and NVG2=3, thereby yielding irregular spacing S3J2=(3P1−W1−2*W2)/3. For discussion purposes consider that W2=2*W1 and P1=3*W1. Then, SS=2*W1, S3J1=2*W1, and S3J2=(4/3)*W1. For the first irregular wire layout region, spacing variation SVR1=SS−S3J1=0. For the second irregular wire layout region, spacing variation SVR2=SS−S3J2=(2/3)*W1. Therefore, the exemplary layout of FIG. 3E demonstrates how an increase in the number N of irregular wires within an irregular wire layout region serves to reduce spacing variation.

Figure 3F:
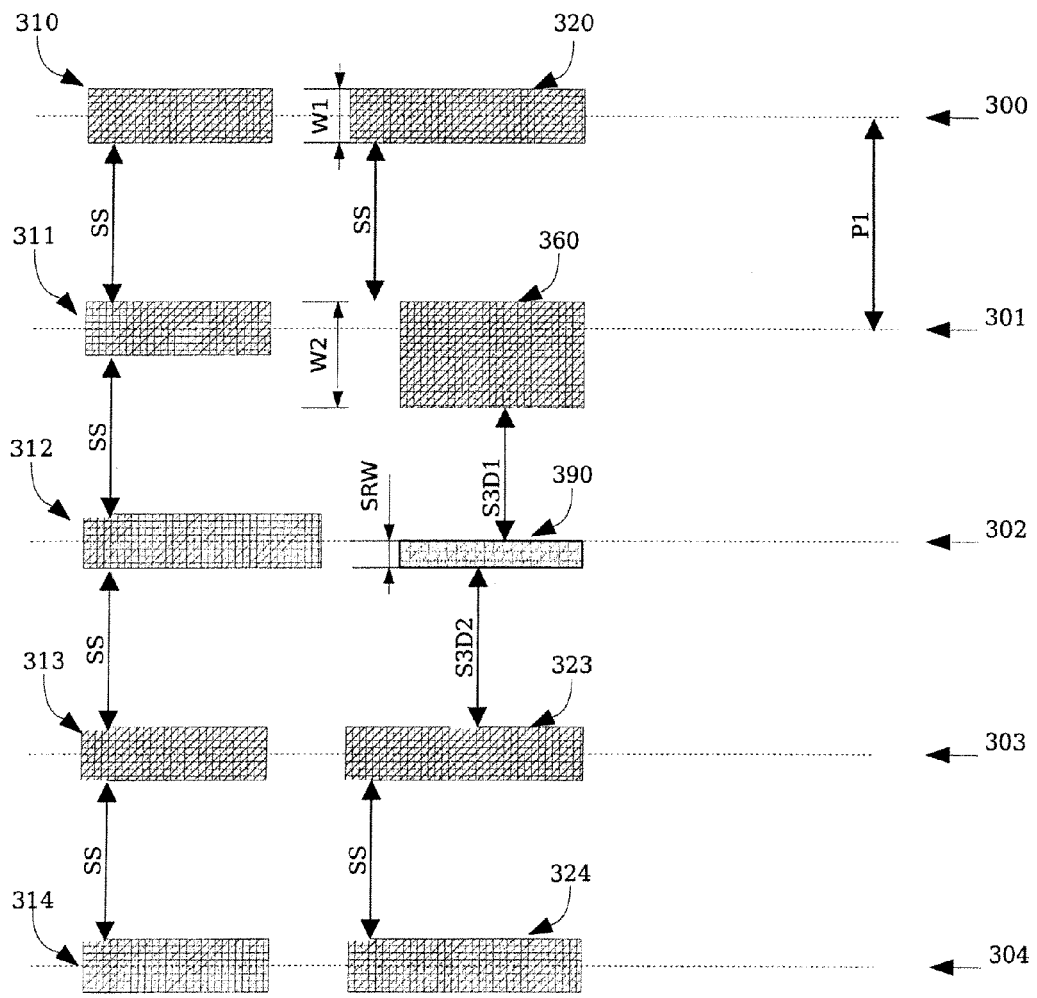
FIG. 3F shows a variant of the exemplary layout of FIG. 3B, defined in accordance with the method of FIG. 3A, in which one irregular wire is placed in conjunction with a sub-res wire within the irregular wire layout region, in accordance with one embodiment of the present invention.

FIG. 3F is an illustration showing a variant of the exemplary layout of FIG. 3B, defined in accordance with the method of FIG. 3A, in which one irregular wire 360 is placed (N=1) in conjunction with a sub-res wire 390 within the irregular wire layout region. The sub-res wire 390 is defined to have a width SRW, and is placed between irregular wire 360 and regular wire 323. Use of the sub-res wire 390 eliminates the large wire spacing S3B1, as shown in FIG. 3B, and introduces smaller wire spacings S3D1 and S3D2. It should be noted that as compared to wire spacing S3B1, both of wire spacings S3D1 and S3D2 are closer to the standard spacing SS. Therefore, use of the sub-res wire 390 improves on the embodiment described in FIG. 3B in that spacing variation is reduced, which may be beneficial to manufacturing.

Figure 3G:
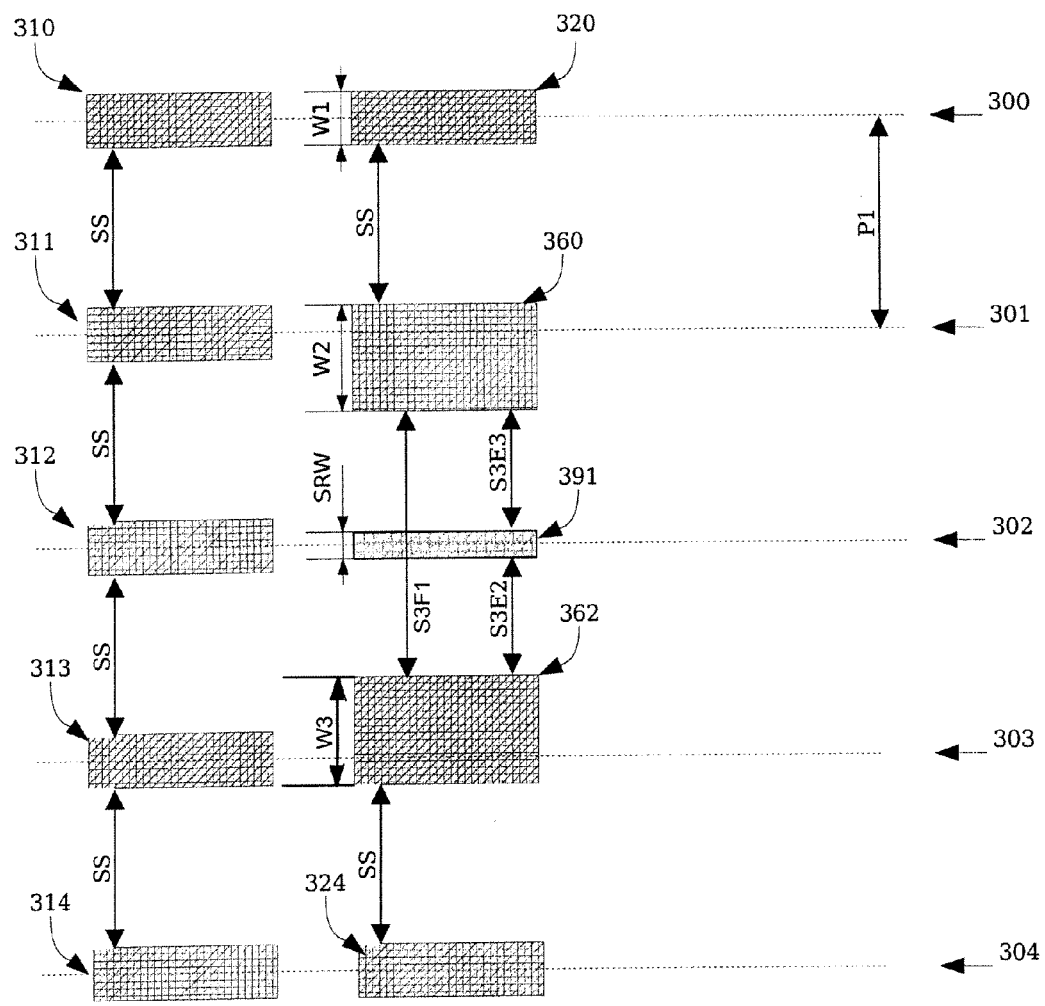
FIG. 3G is an illustration showing a variant of the exemplary layout of FIG. 3C, defined in accordance with the method of FIG. 3A, in which two irregular wires are placed in conjunction with a sub-res wire within the irregular wire layout region, in accordance with one embodiment of the present invention.

FIG. 3G is an illustration showing a variant of the exemplary layout of FIG. 3C, defined in accordance with the method of FIG. 3A, in which two irregular wires 360 and 362 are placed (N=2) in conjunction with a sub-res wire 391 within the irregular wire layout region. The sub-res wire 391 is defined to have a width SRW, and is placed between irregular wire 360 and irregular wire 362. Use of the sub-res wire 391 eliminates the large wire spacing S3F1, as shown in FIG. 3C, and introduces smaller wire spacings S3E2 and S3E3. It should be noted that as compared to wire spacing S3F1, both of wire spacings S3E2 and S3E3 are closer to the standard spacing SS. Therefore, use of the sub-res wire 391 improves on the embodiment described in FIG. 3C in that spacing variation is reduced, which may be beneficial to manufacturing.

Figure 4:
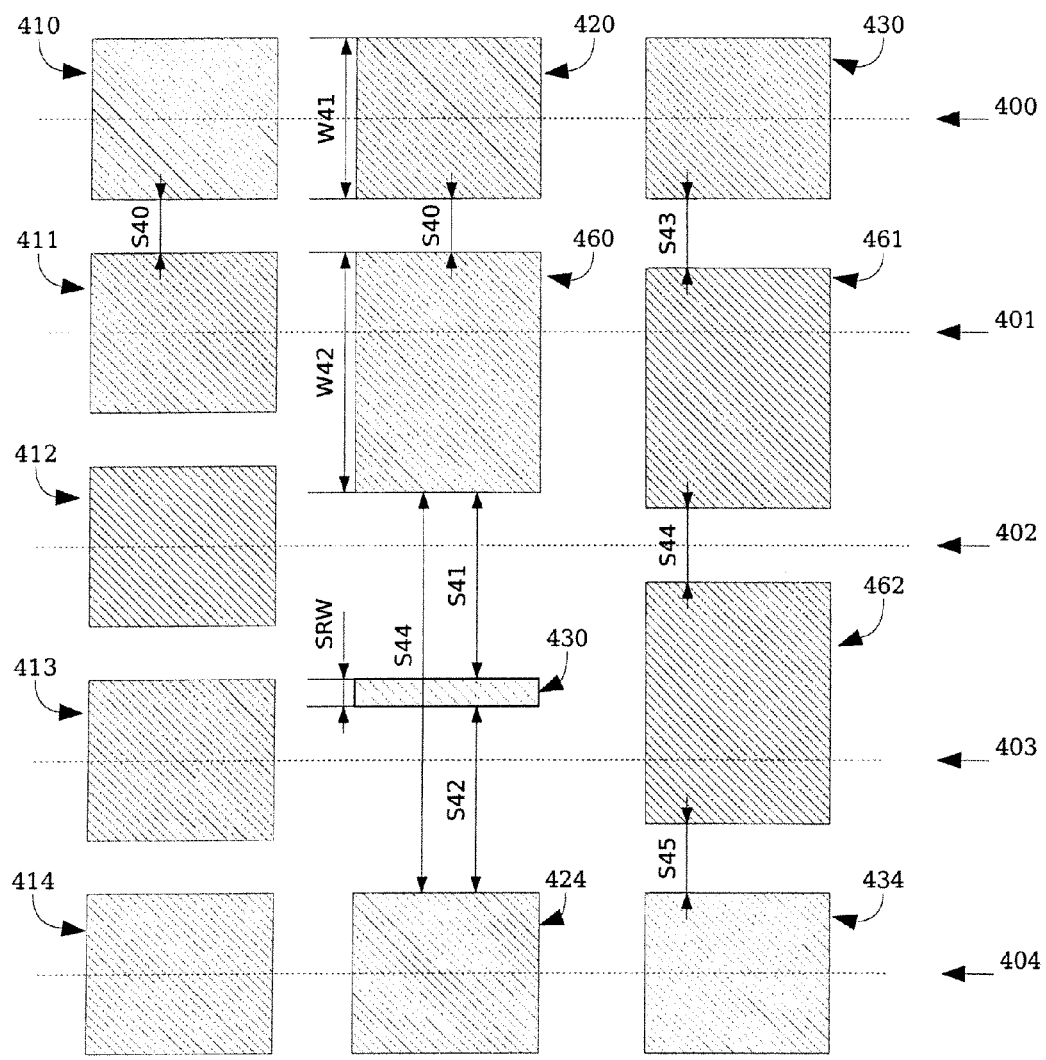
FIG. 4 shows an exemplary layout for a diffusion level, defined in accordance with the method of FIG. 3A, in accordance with one embodiment of the present invention.

It should be understood that the methods and layout techniques disclosed herein can be applied to any chip level. FIG. 4 shows an exemplary layout for a diffusion level, defined in accordance with the method of FIG. 3A. In one embodiment, layout shapes shown in FIG. 4 correspond to doped silicon regions, and may be referred to as active shapes or diffusion shapes. A VG for the diffusion level is defined by virtual lines 400-404. A number of regular diffusion shapes 410-414, 420, 424, 430, and 434 are defined to have standard width W41, and are placed with a standard spacing S40. Irregular diffusion shape 460 of width W42 is placed such that the standard spacing S40 exists between its outboard long edge and a facing long edge of adjacent regular diffusion shape 420. In one embodiment, a vacant irregular spacing S44 exists between facing long edge of irregular diffusion shape 460 and regular diffusion shape 424. In another embodiment, a sub-res shape 430 is inserted between irregular diffusion shape 460 and regular diffusion shape 424, resulting in irregular spacings S41 and S42. As compared to irregular spacing S44, irregular spacings S41 and S42 may be more similar to standard spacing SS, thereby providing a reduced spacing variation as compared to the embodiment without the sub-res shape 430. In another embodiment, multiple irregular diffusion shapes 461 and 462 are placed between parallel regular diffusion shapes 430 and 434. In this embodiment, spacings extending perpendicularly away from long edges of irregular diffusion shapes 461 and 462 are shown as S43, S44, and S45. In one embodiment, spacings S43-S45 are made similar or equal to each other to reduce the maximum spacing variation between standard spacing S40 and spacings S43-S45.

Figure 5A:
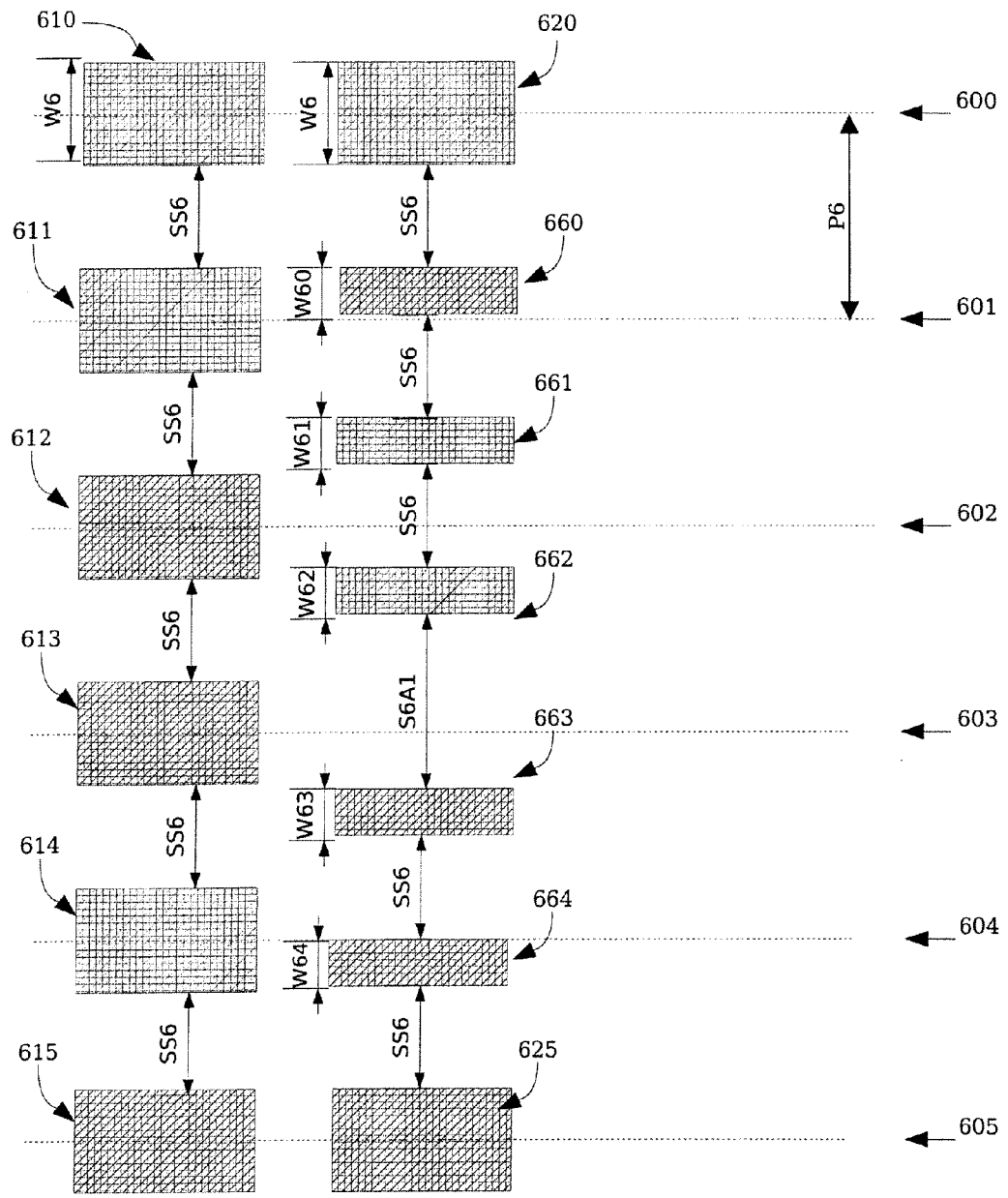
FIG. 5A shows an exemplary layout in which irregular wires have non-standard widths, which may or may not be equal to each other and which are smaller than a standard width for regular wires, in accordance with one embodiment of the present invention.

In some embodiments an irregular wire width may be smaller than a standard wire width. FIG. 5A shows an exemplary layout in which irregular wires 660-664 have non-standard widths W60-W64, which may or may not be equal to each other and which are smaller than a standard width W6 for regular wires 610-615, 620, and 625. A standard spacing SS6 is defined between facing long edges of adjacent regular wires 610-615. In FIG. 5A, irregular wires 660-664 are placed to maximize the occurrence of standard spacing SS6 within the irregular wire layout region. Generally speaking, the number N of irregular wires in an irregular wire layout region, and the respective widths thereof, may be defined such that for a given VG pitch it is not possible to place each irregular wire to have long edge-to-long edge spacings equivalent to the standard spacing. For example, the number N=5 of irregular wires 660-664 in the irregular wire layout region of FIG. 5A, and the respective widths thereof W60-W64, may be defined such that for a given VG (virtual lines 600-605) of pitch P6 it is not possible to place each irregular wire 660-664 to have long edge-to-long edge spacings equivalent to the standard spacing SS6. Spacing of irregular wires 660-664 to maximize the occurrence of standard spacing SS6 results in a single non-standard spacing S6A1 between facing long edges of adjacently placed irregular wires 662 and 663. A spacing variation SV6A1 for the dimension S6A1 is expressed as: SV6A1=S6A1−SS6.

Figure 5B:
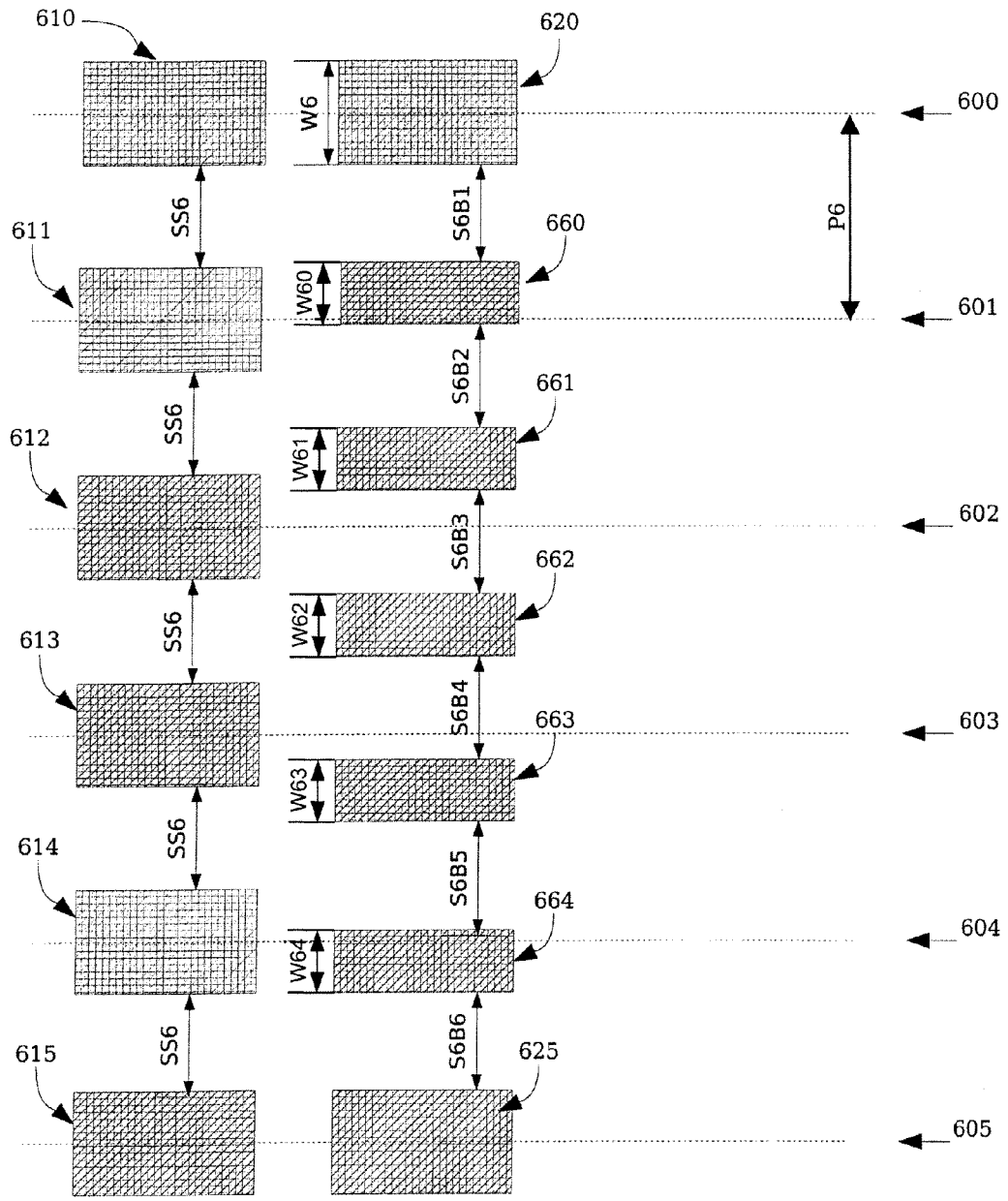
FIG. 5B shows an exemplary layout similar to that of FIG. 5A except that irregular wires, having widths that are less than standard width, are placed such that long edge-to-long edge spaces associated with irregular wires are defined to be similar to each other, but not necessarily equal to the standard spacing, in accordance with one embodiment of the present invention.

FIG. 5B shows an exemplary layout similar to that of FIG. 5A except that irregular wires 660-664, having widths W60-W64 that are less than standard width W6, are placed such that long edge-to-long edge spaces S6B1-S6B6 associated with irregular wires 660-664 are defined to be similar to each other, but not necessarily equal to the standard spacing SS6. Maximum spacing variation (SV6B=|MAX (S6B1,S6B2,S6B3,S6B4,S6B5,S6B6)−SS6|) may be minimized for this exemplary layout when irregular spacings S6B1 through S6B6 are equalized. With equal irregular spacings S6B1 through S6B6, the maximum spacing variation SV6B can be expressed as: SV6B=|S6B1−SS6|. This spacing variation SV6B may be less than the maximum spacing variation SV6A for the layout of FIG. 5A, because the extra space required to re-synchronize regular wires to the VG at the boundary of the irregular wire layout region is spread among all irregular spacings S6B1-S6B6 in the irregular wire layout region of FIG. 5B, whereas the extra space required to re-synchronize regular wires to the VG at the boundary of the irregular wire layout region is focused in the irregular spacing S6A1 between the two irregular wires 662 and 663 in the irregular wire layout region of FIG. 5A. It should be understood that an irregular spacing may be less than a standard spacing. For example, the irregular spacing S6B1 may be less than the standard spacing SS6 in FIG. 5B.

Figure 5C:
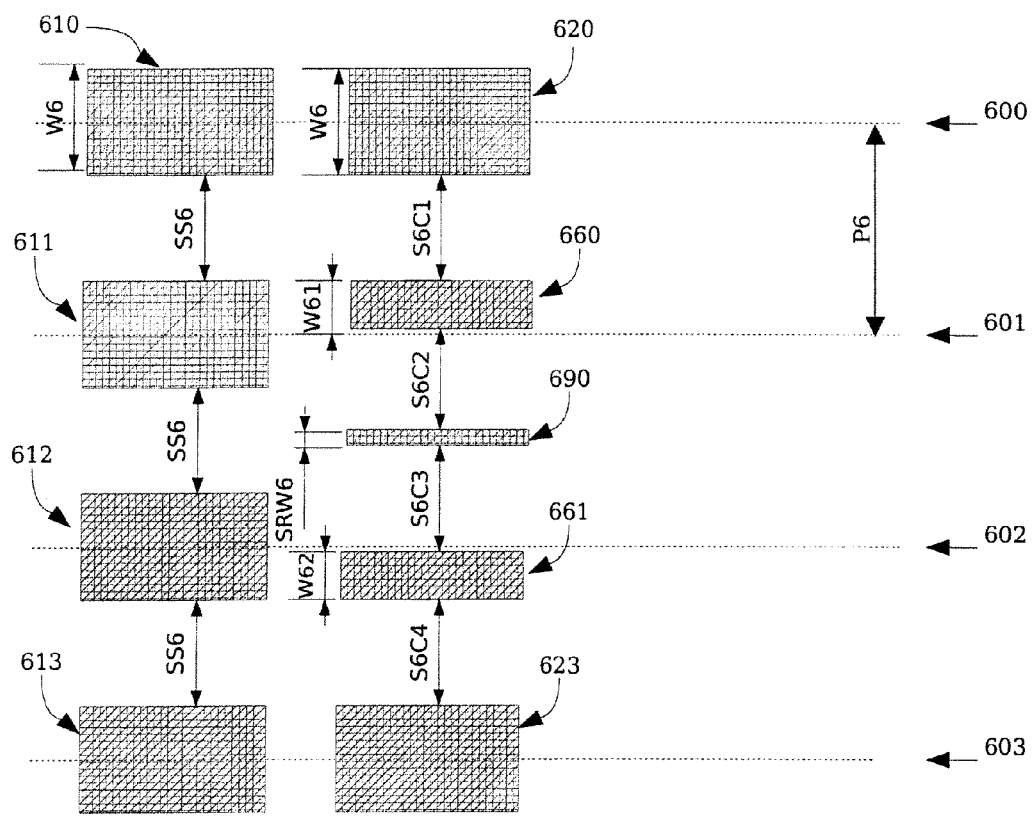
FIG. 5C shows an exemplary layout with irregular wires having widths that are less than a standard width, in accordance with one embodiment of the present invention.

FIG. 5C shows an exemplary layout with irregular wires 660-661 having widths W61-W62, respectively, that are less than a standard width SS6. A sub-res wire 690 of width SRW6 is placed between irregular wires 660 and 661. A spacing S6C1 exists between facing long edges of irregular wire 660 and regular wire 620. A spacing S6C2 exists between facing long edges of irregular wire 660 and sub-res wire 690. A spacing S6C3 exists between facing long edges of sub-res wire 690 and irregular wire 661. A spacing S6C4 exists between facing long edges of irregular wire 661 and regular wire 623. Use of the sub-res wire 690 avoids having a large irregular spacing between irregular wires 660 and 661, and thereby enables reduction in spacing variation, which may be beneficial to manufacturing. Also, the width SRW6 of sub-res wire 690 is somewhat adjustable so long as the sub-res wire 690 does not resolve during a manufacturing process. Therefore, in one embodiment, the irregular spacings S6C1-S6C4 may be set equal to the regular spacing SS6, if the width SRW6 of sub-res wire 690 can be correspondingly adjusted without causing resolution of the sub-res wire 690.

Figure 6:
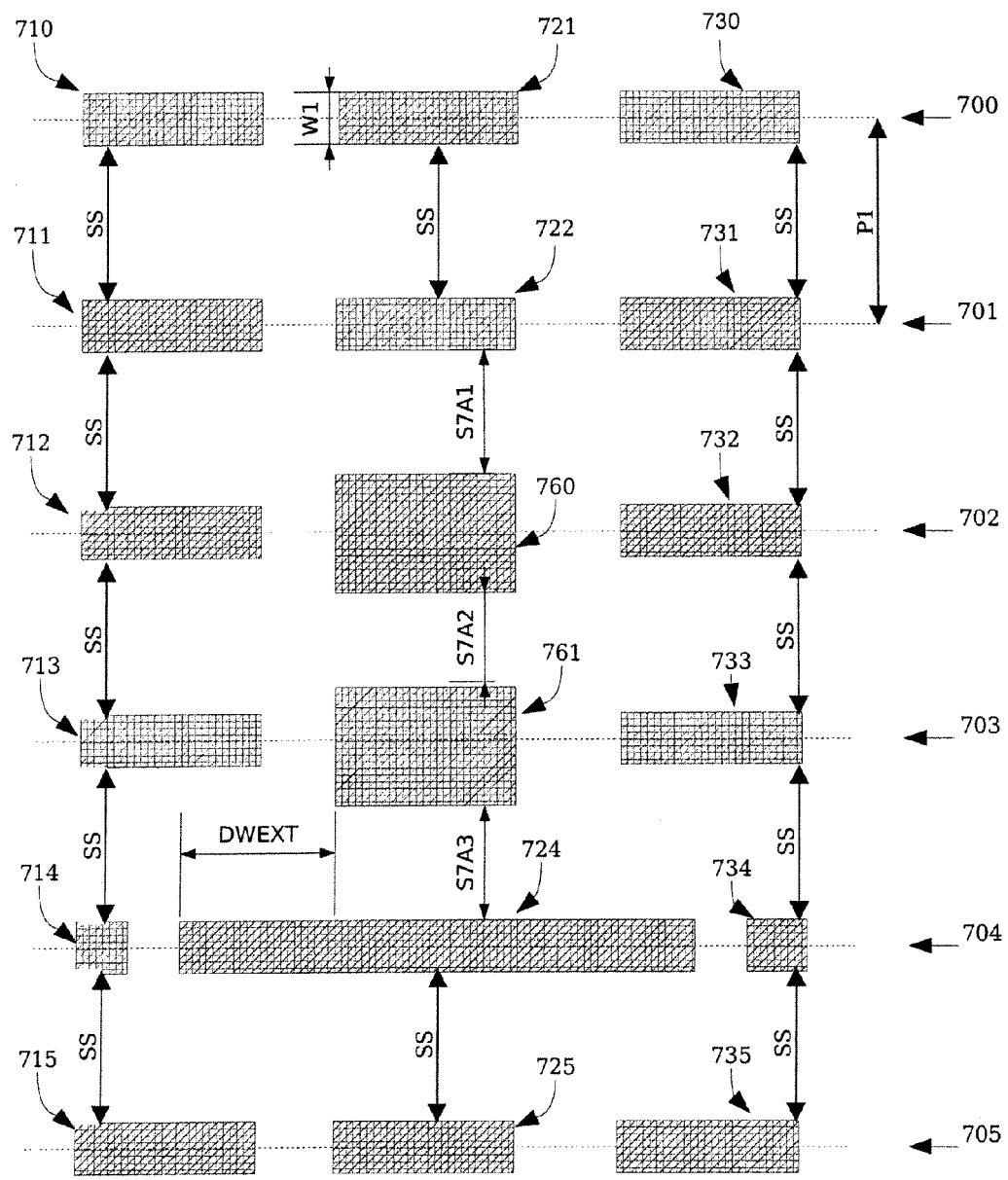
FIG. 6 shows an exemplary layout implementing a method to reduce negative electrical or manufacturing influences between layout shapes or layout regions by interposing other layout shapes between them, in accordance with one embodiment of the present invention.

A method to reduce negative electrical or manufacturing influences between layout shapes or layout regions is to interpose other layout shapes between them. These interposing layout shapes may have characteristics of regular wires, irregular wires, or sub-res wires and may provide protection between regions of irregular wires and regions of regular wires. FIG. 6 shows an exemplary layout implementing the above-mentioned method. FIG. 6 shows irregular wires 760 and 761 and regular wires 710-715, 721, 722, 724, 725, 730-725. An irregular wire layout region is defined between regular wires 722 and 724. Irregular spacings S7A1-S7A3 are utilized within the irregular wire layout region. The regular wire 722 is placed adjacent to irregular wire 760. Because the regular wire 722 may shield regular wire 721 from lithographic and/or electrical influences (such as adverse light wave interference and/or capacitive coupling) of irregular wire 760, the regular wire 722 is considered a protective shape. The long regular wire 724 is placed adjacent to irregular wire 761. Similarly, because the long regular wire 724 may shield regular wire 725 from the lithographic and/or electrical influences of irregular wire 761, the long regular wire 724 is considered a protective shape. Linear layout shapes may also by defined to perform an isolating or protecting function for other layout shapes in a direction of extent of the VG. For example, regular wires such as 712-713 may prevent unwanted lithographic or electrical interactions between layout shapes or layout regions adjacent to their left edges, i.e., to their left wire ends, and irregular wires 760 and 761, which are adjacent to the right wire ends of regular wires 712-713.

Another method to increase the effectiveness of placing a protective layout shape between layout shapes or layout regions includes ensuring that the protective layout shape is unbroken (does not have gaps) and/or that it extends beyond a boundary of a layout shape/region to be protected and in the direction parallel to VG lines. For example, in the exemplary layout of FIG. 6, the protective long regular wire 724 extends beyond the line end of irregular wire 761 by a distance of DWEXT. In this manner, undesired interactions, such as adverse lithographic and/or electrical influences, between irregular wire 761 and regular wires 715 and 725 are further reduced.

Figure 7:
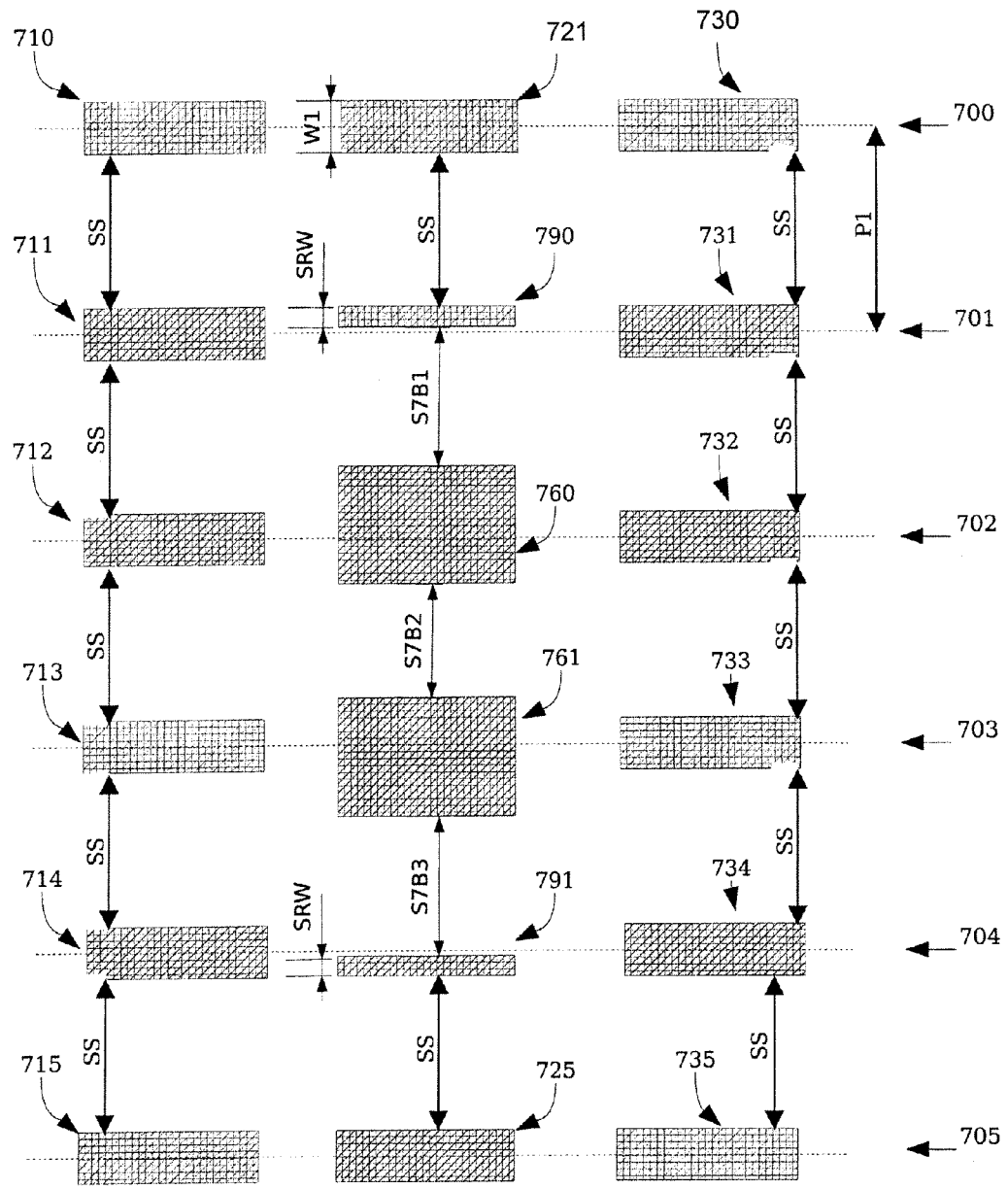
FIG. 7 shows a variation of the exemplary layout of FIG. 6 in which protective sub-res shapes are placed in lieu of protective regular wires, in accordance with one embodiment of the present invention.

Another method to reduce negative manufacturing influences between layout shapes or layout regions is to interpose sub-res shapes between them, such that the interposing sub-res shapes act as protective shapes. FIG. 7 shows a variation of the exemplary layout of FIG. 6 in which protective sub-res shapes 790 and 791 are placed in lieu of protective regular wires 722 and 724, respectively. In the exemplary layout of FIG. 7, an irregular wire layout region is defined between regular wires 721 and 725, to include irregular wires 760-761 and sub-res shapes 790-791. Each of sub-res shapes 790 and 791 is defined to have a width of SRW. Sub-res shape 790 is separated from adjacent regular wire 721 by the standard spacing SS. Irregular wire 760 is separated from sub-res shape 790 by irregular spacing S7B1. Irregular wire 761 is separated from irregular wire 760 by irregular spacing S7B2. Sub-res shape 791 is separated from irregular wire 761 by irregular spacing S7B3. Sub-res shape 791 is also separated from regular wire 725 by standard spacing SS. Sub-res shape 790 may reduce lithographic influences between layout shapes 721 and 760. Similarly, sub-res shape 791 may reduce lithographic influences between layout shapes 725 and 761.

Figure 8A:
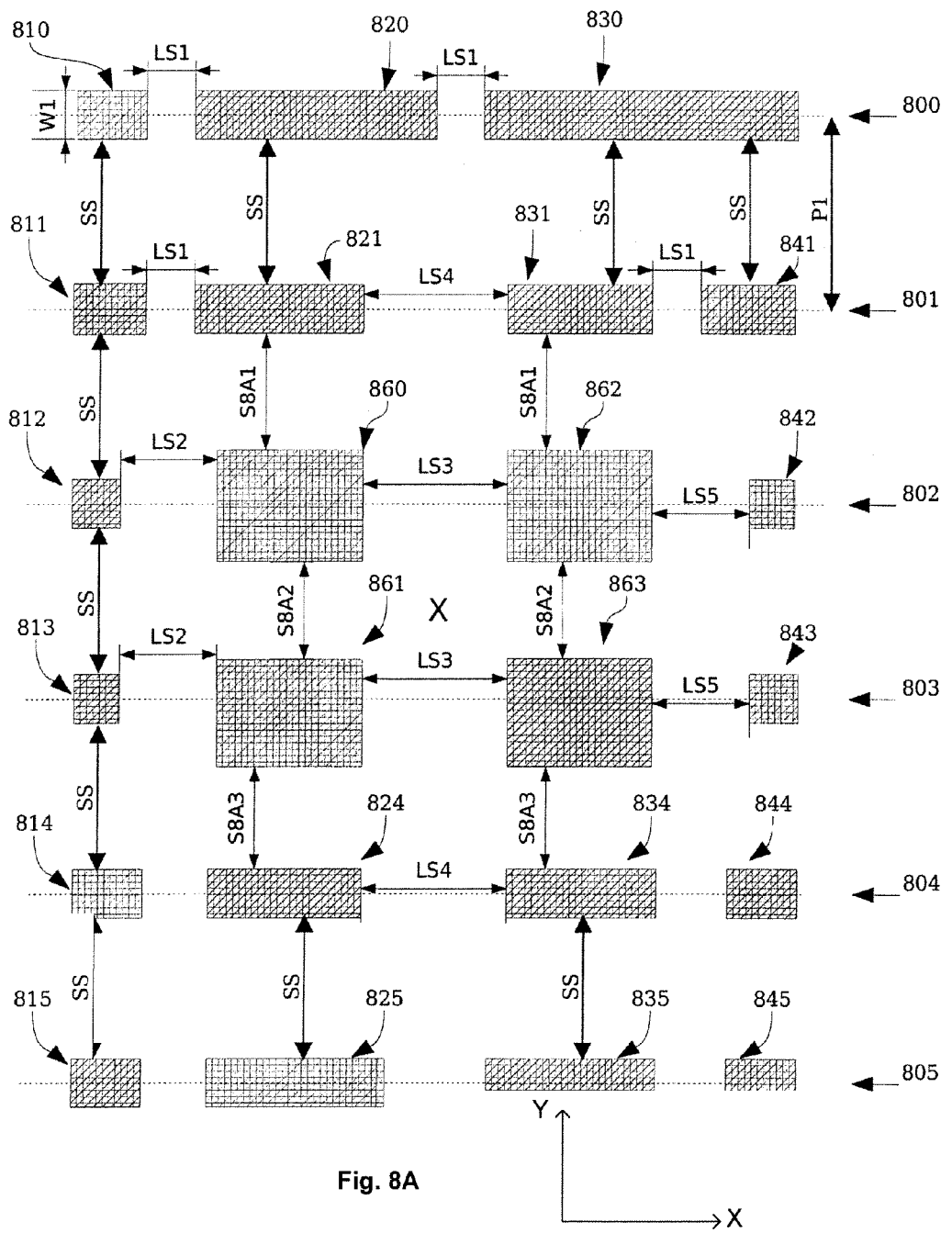
FIG. 8A shows an exemplary layout within which end gaps are varied to improve manufacturability, in accordance with one embodiment of the present invention.

Another method to improve the manufacturability of a layout that includes irregular wires is to optimize end gaps associated with specific wire widths, wherein the optimized end gaps may vary in size within the layout. FIG. 8A shows an exemplary layout within which end gaps are varied to improve manufacturability. FIG. 8A shows irregular wires 860-863, surrounded by regular wires 810-815, 820, 821, 824, 825, 830, 831, 834, 835, 841-845. In the example embodiment of FIG. 8A, regular wires placed end-to-end that are not adjacent to the irregular wire layout region, such as regular wires 810 and 820, have a standard end gap LS1 between their facing line ends. Regular wires placed end-to-end with irregular wires of the irregular wire layout region, such as regular wires 812 and 813 respectively placed end-to-end with irregular wires 860 and 861, may have a non-standard end gap LS2 between their facing line ends. Similarly, regular wires 842 and 843 placed end-to-end with irregular wires 862 and 863, respectively, have a non-standard end gap LS5 between their facing line ends. Also, irregular wires placed end-to-end within the irregular wire layout region, such as irregular wires 860 and 862, may have a another non-standard end gap LS3 between their facing line ends. Also, regular wires that bound the irregular wire layout region, such as regular wires 821 and 831, may have another non-standard end gap LS4 between their facing line ends. It should be understood that non-standard end gaps, such as LS2-LS5, may be defined to provide lithographic compensation or optimization necessitated by definition and placement of irregular wires within the irregular wire layout region. More specifically, particular irregular wire dimensions (width and length) and irregular wire spacings (end gap and long edge-to-long edge) within the irregular wire layout region may steer definition of non-standard end gaps within and/or around the irregular wire layout region.

For circuits that need to be matched in terms of manufactured shape characteristics and in terms of electrical influences due to neighboring elements, such as balanced circuits, use of protective layout shapes around such circuits may be combined with use of irregular wires and/or irregular spaces within such circuits to provide the necessary matching therebetween. Layout shapes within circuits to be matched may also be arranged symmetrically in X rows and Y columns. Such a symmetric arrangement may be done for structures such as common centroid structures or other circuits that require close matching between shape dimensions such as gate length and width. Also, it should be appreciated that use of protective layout shapes within and/or around a circuit layout may serve to reduce unwanted electrical coupling effects and/or unwanted lithographic interactions between layout shapes on either side of the protective layout shapes in any given direction.

In the exemplary embodiment of FIG. 8A, irregular wires 860-863 are arranged symmetrically both vertically and horizontally, i.e., in both x- and y-directions. In one embodiment, wire placement symmetry, such as that demonstrated by irregular wires 860-863, enables matching between pairs of layout shapes. For example, the combined characteristics of irregular wires 860 and 863 are matched to the combined characteristics of irregular wires 861 and 862. In one embodiment, electrically connected circuit features, such as irregular wires 860 and 863 by way of example, are placed diagonally with respect to each other. Also, a matched pair of electrically connected circuit features, such as irregular wires 861 and 862 by way of example, are placed diagonally. Furthermore, features in the matched circuit, such as irregular wires 860-863, are placed evenly around a common point in space X, also referred to a common centroid. To this end, pairs of wires in a matched circuit that are placed end-to-end, such as irregular wires 860 and 862, and irregular wires 861 and 863, are separated by the same end gap LS3. Also, pairs of wires in a matched circuit that are placed adjacent and parallel to each other, such as irregular wires 860 and 861, and irregular wires 862 and 863, are separated by the same long edge-to-long edge spacing S8A2.

Regular wires which bound a symmetrically defined irregular wire layout region may be placed such that edges of the regular wires that face toward a given side of the irregular wire layout region are positioned at a constant distance from the outward facing edges of the layout shapes within and along the given side of the irregular wire layout region. For example, regular wires 812, 813, 824, 834, 843, 842, 831, and 821 which bound the irregular wire layout region shown in FIG. 8A, may be placed such that their edges which face toward the irregular wire layout region are a constant distance from respective facing edges of irregular wires 860-863 along a given side of the irregular wire layout region. For instance, edges of regular wires 812 and 813 which face toward the irregular wire layout region are a constant distance LS2 from respective facing edges of irregular wires 860 and 861. Edges of regular wires 824 and 834 which face toward the irregular wire layout region are a constant distance S8A3 from respective facing edges of irregular wires 861 and 863. Edges of regular wires 843 and 842 which face toward the irregular wire layout region are a constant distance LS5 from respective facing edges of irregular wires 863 and 862. Edges of regular wires 831 and 821 which face toward the irregular wire layout region are a constant distance S8A1 from respective facing edges of irregular wires 862 and 860. Additionally, further regularity may be achieved in the symmetrically defined irregular wire layout region if some of the peripheral spacings (LS2, S8A3, LS5, S8A1) are made equal, e.g., LS2=LS5 and/or S8A1=S8A3. It should be understood that the regular wires which bound an irregular wire layout region, (such as regular wires 811-814, 821, 824, 831, 834, 841-844) may be used as protective layout shapes and/or may be used to perform a circuit function.

Figure 8B:
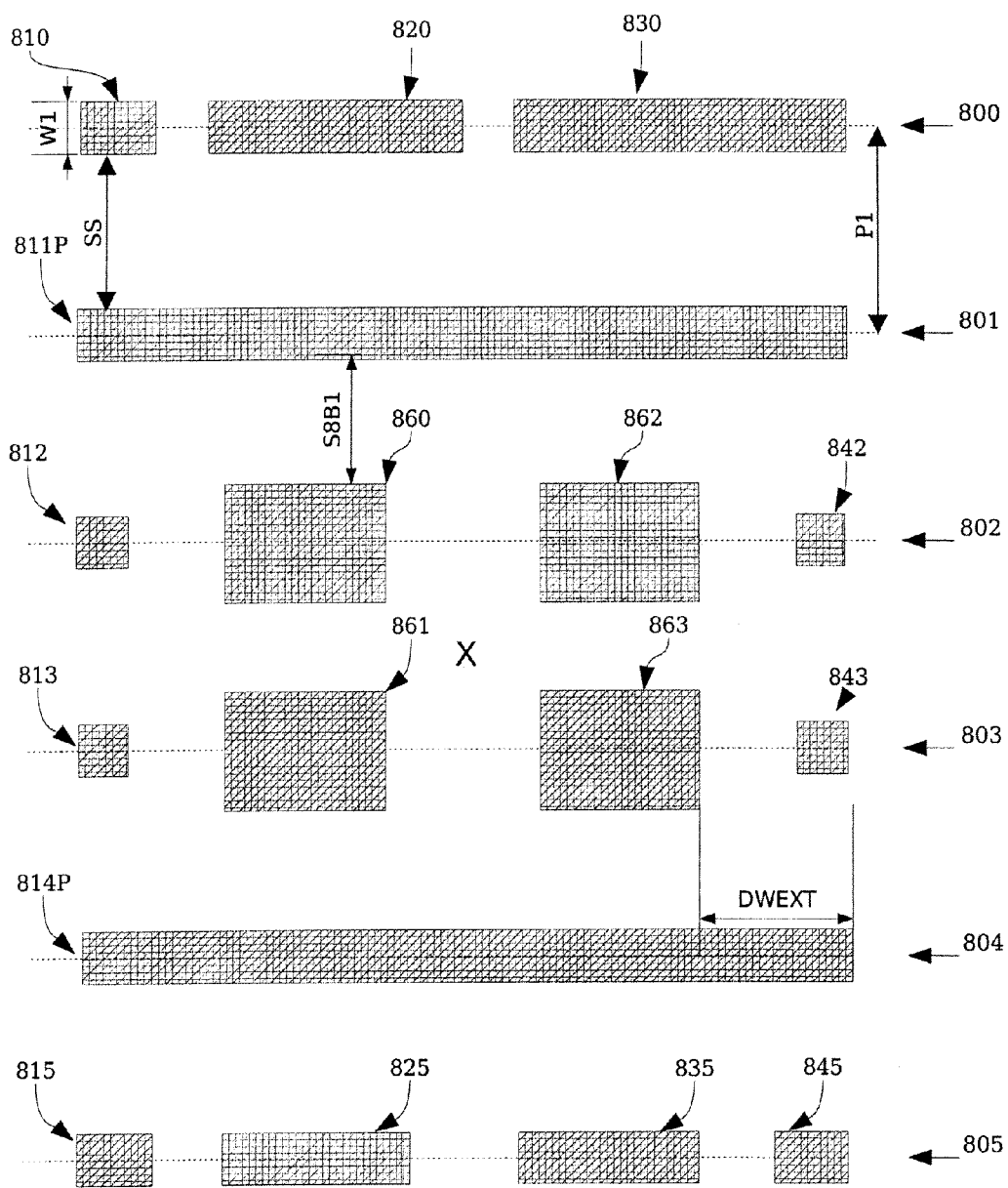
FIG. 8B shows an exemplary layout in which long regular wires are used to bound an irregular wire layout region, thereby serving as protective layout shapes between the irregular wire layout region and a surrounding layout area, in accordance with one embodiment of the present invention.

FIG. 8B shows an exemplary layout in which long regular wires are used to bound an irregular wire layout region, thereby serving as protective layout shapes between the irregular wire layout region and a surrounding layout area. Long regular wires 811P and 814P are each placed to bound a respective side of an irregular wire layout region within which irregular wires 860-863 are symmetrically arranged in a common centroid fashion around point X. Each of the long regular wires 811P and 814P is defined to extend beyond outer edges of outermost irregular wires. For example, long regular wire 814P is defined to extend beyond an outer edge of irregular wire 863 by a distance DWEXT. The unbroken nature of the long regular wires 811P and 814P and their extension beyond the outer edges of the outermost irregular wires may provide protection against adverse manufacturing or electrical influences between irregular shapes 860-863 and regular shapes 810, 820, 830, 815, 825, 835, and 845 placed on an opposing side of long regular wires 811P and 814P. Regular wires 812, 813, 842, and 843 which are respectively placed end-to-end with irregular wires 860-863 may reduce unwanted interactions between irregular wires 860-863 and other layout shapes, such as layout shapes placed to the left of regular wires 812 and 813 or layout shapes placed to the right of regular wires 842 and 843.

Figure 8C:
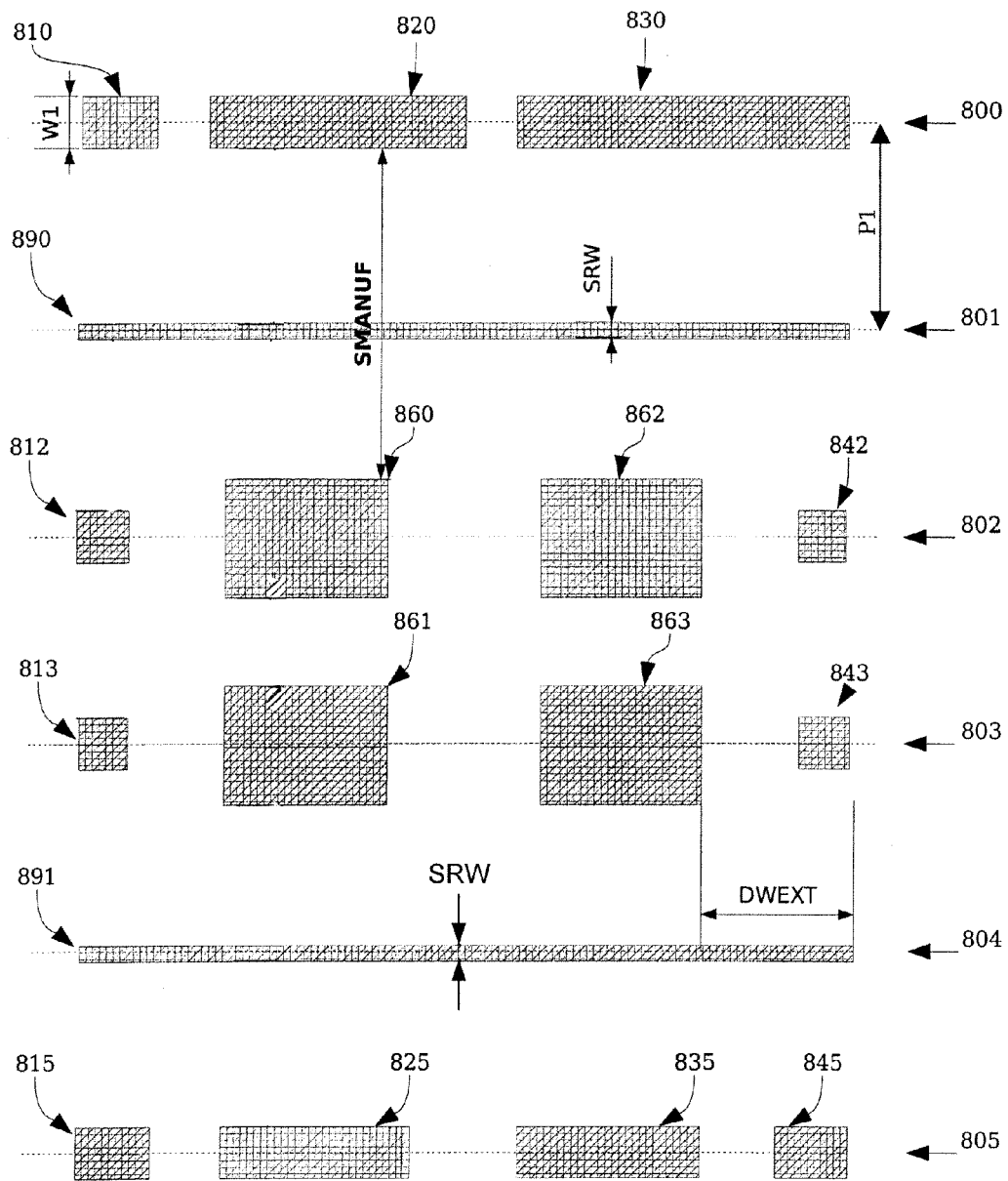
FIG. 8C shows a variation of the exemplary layout of FIG. 8B, in which sub-res shapes are used in lieu of long regular wires, in accordance with one embodiment of the present invention.

Another method to reduce unwanted lithographic interactions between two layout shapes is to interpose a sub-res wire between the two layout shapes, as an alternative to the previously described method of interposing regular wires. Because the sub-res shape is not manufactured, one advantage of using a sub-res shape is that capacitive coupling between manufactured shapes that are separated by the sub-res shape is reduced. Therefore, a conductor-to-conductor separation distance associated with facing edges of two manufactured shapes is increased when a sub-res shape is used as an interposed protective layout shape, relative to when a regular wire is used as the interposed protective layout shape. FIG. 8C shows a variation of the exemplary layout of FIG. 8B, in which sub-res shapes 890 and 891 are used in lieu of long regular wires 811P and 814P, respectively. Each of sub-res shapes 890 and 891 is defined to have a width SRW, such that the sub-res shape will not resolve during manufacturing. The sub-res shape 890 reduces lithographic interaction between the irregular wires 860-863 and the regular wires 810, 820, 830 that are placed opposite the sub-res shape 890 from the irregular wire layout region. The sub-res shape 891 reduces lithographic interaction between the irregular wires 860-863 and the regular wires 815, 825, 835, 845 that are placed opposite the sub-res shape 891 from the irregular wire layout region. In the portion of the as-manufactured chip level associated with the layout of FIG. 8C, a large space SMANUF is present between the facing long edges of regular wire 820 and irregular wire 860, and between the facing long edges of regular wire 830 and irregular wire 862. It should be appreciated that the space SMANUF is larger that a long edge-to-long edge spacing S8B1 between the regular wire 811P and the irregular wires 860 and 862 in the layout of FIG. 8B. Therefore, the capacitive coupling experienced by irregular wires 860 and 862 may be reduced by the larger conductor-to-conductor spacing SMANUF, relative to the spacing S8B1.

Figure 8D:
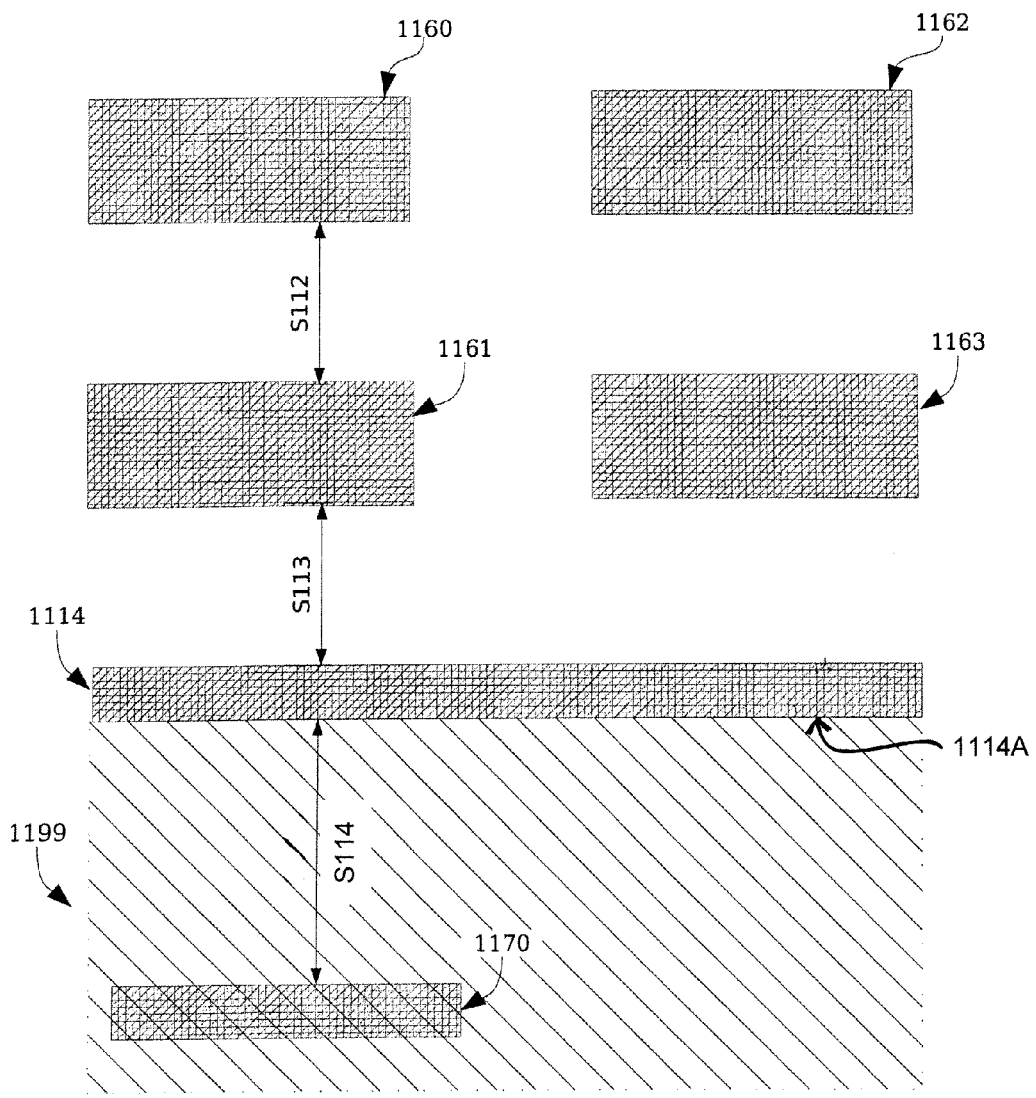
FIG. 8D shows a layout region immediately adjacent to a long edge of a linear layout shape, in accordance with one embodiment of the present invention.

The use of protective layout shapes may also be helpful in preventing unwanted interactions between an area of higher layout shape density and an area of lower layout shape density, as variations in layout shape density may adversely affect lithographic results. FIG. 8D shows a layout region 1199 immediately adjacent to a long edge 1114A of a linear layout shape 1114. Layout shape 1114 may protect layout shapes placed opposite the layout shape 1114 from the layout region 1199, such as layout shapes 1160-1163, from adverse lithographic effects related to layout shapes within layout region 1199. In one embodiment, layout region 1199 may have a lower layout shape density relative to the layout region defined opposite the linear layout shape 1114. For example, a long edge-to-long edge spacing S114, between linear layout shape 1114 and adjacently placed layout shape 1170 within the layout region 1199, may be significantly larger than long edge-to-long edge spacings S113 and S112 within the layout region defined opposite the linear layout shape 1114. The lithographic influence of region 1199 on wires 1161 and 1163 may be reduced by the presence of linear layout shape 1114 acting as a protective layout shape.

Figure 8E:
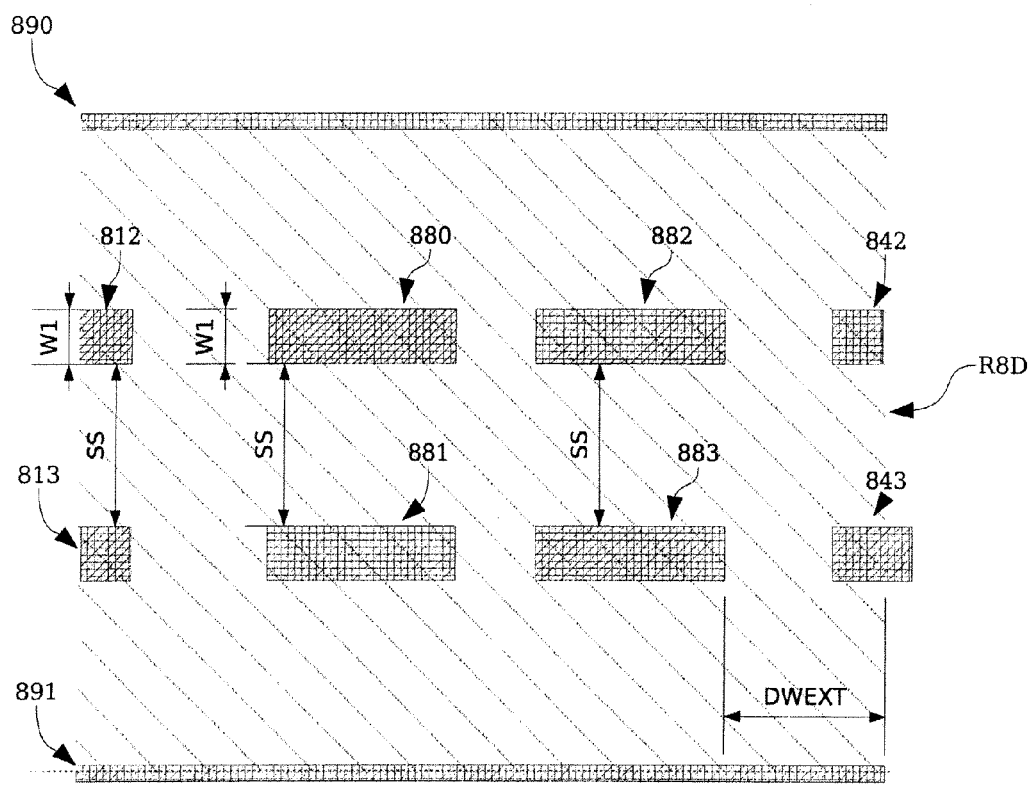
FIG. 8E shows an exemplary layout in which regular wires of standard width are defined within a layout region, in accordance with one embodiment of the present invention.

The use of regular wires and sub-res shapes as protective layout shapes, such as described with regard to FIGS. 8B and 8C, can be applied to protect either regular wires or irregular wires. FIG. 8E shows an exemplary layout in which regular wires 880-883 of standard width W1 are defined within a layout region R8D. Protective layout shapes 890, 891, 812, 813, 842, and 843 serve to protect regular wires 880-883 from adverse lithographic and/or electrical influence by layout shapes/regions defined outside of the layout region R8D. It should be appreciated that some or all of protective layout shapes 890, 891, 812, 813, 842, and 843 may be sub-res shapes.

Figure 8F:
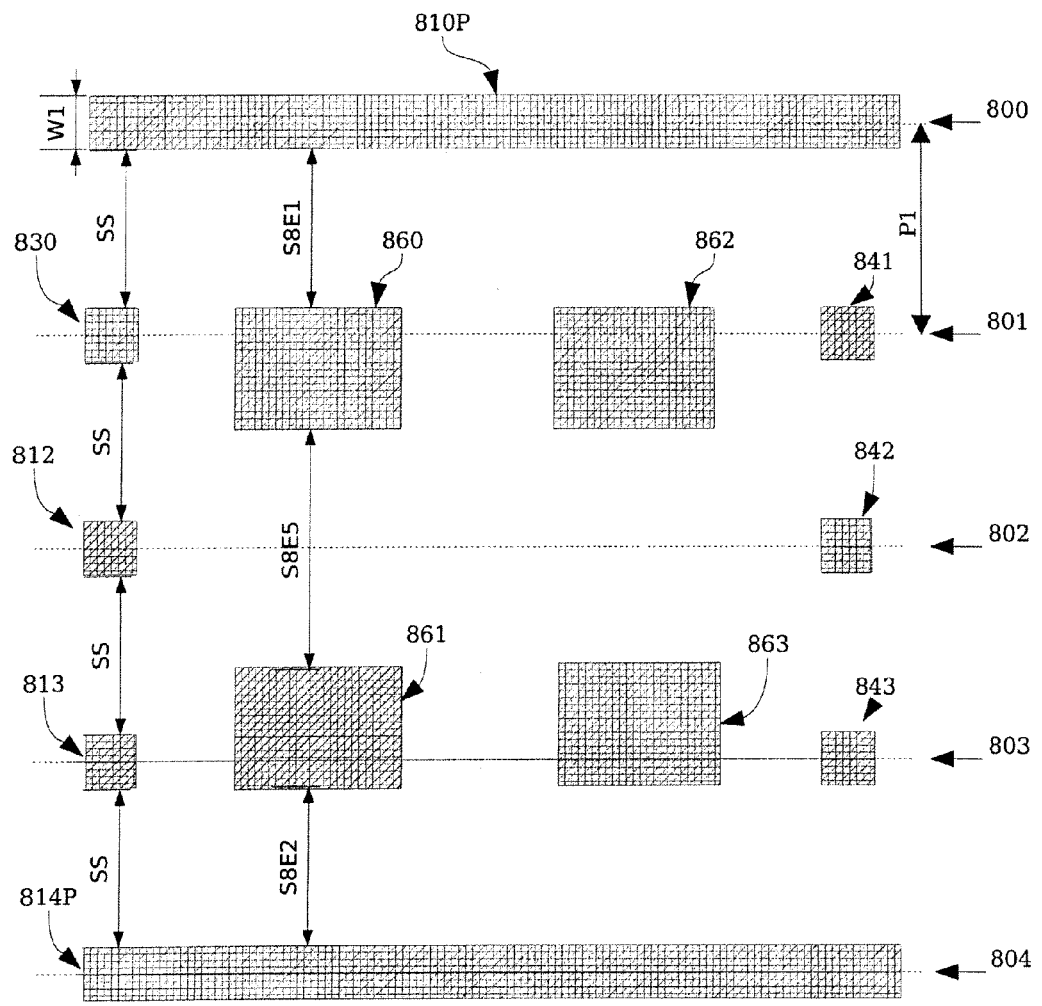
FIG. 8F shows an exemplary layout that includes a symmetrical arrangement of irregular wires, in accordance with one embodiment of the present invention.

Layout shapes can be arranged in a number of ways to optimize circuit balancing. FIG. 8F shows an exemplary layout that includes a symmetrical arrangement of irregular wires 860-863. Top edges of irregular wires 860 and 862 are substantially aligned with, or near to aligned with, top edges of neighboring regular wires 830 and 841, thereby resulting in a long edge-to-long edge spacing S8E1 between regular wire 810P and each of irregular wires 860 and 862 that is substantially equivalent to standard spacing SS. Bottom edges of irregular wires 861 and 863 are substantially aligned with, or near to aligned with, bottom edges of neighboring regular wires 813 and 843, thereby resulting in a long edge-to-long edge spacing S8E2 between regular wire 814P and each of irregular wires 861 and 863 that is substantially equivalent to standard spacing SS. Spacing S8E5 between facing long edges of irregular shapes such as 860 and 861 may not be equivalent to or near the standard spacing SS. Although similar to the exemplary layout of FIG. 3C, the exemplary layout of FIG. 8F includes a common centroid style irregular wire layout arrangement.

Figure 8G:
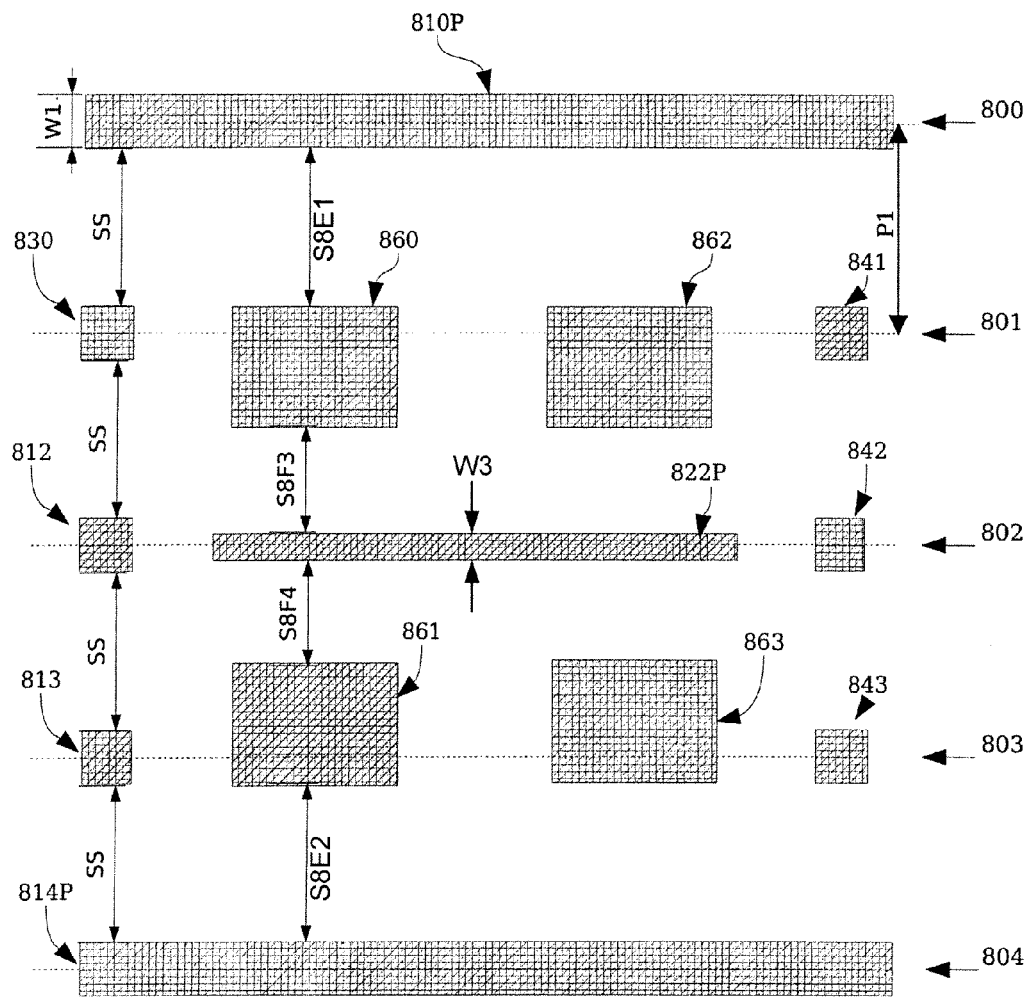
FIG. 8G shows a variation of the exemplary layout of FIG. 8F in which a layout shape is inserted between symmetrically arranged irregular wires, in accordance with one embodiment of the present invention.

FIG. 8G shows a variation of the exemplary layout of FIG. 8F in which a layout shape 822P is inserted between symmetrically arranged irregular wires 860-863. Layout shape 822P may be a dummy shape or may be used for a circuit function. A width W3 of layout shape 822P may be regular, irregular, or small enough that the layout shape 822P is a sub-res shape. Facing long edges of irregular wire 860 and layout shape 822P are separated by spacing S8F3. Similarly, facing long edges of irregular wire 862 and layout shape 822P are separated by spacing S8F3. Facing long edges of irregular wire 861 and layout shape 822P are separated by spacing S8F4. Similarly, facing long edges of irregular wire 863 and layout shape 822P are separated by spacing S8F4. The spacings S8F3 and S8F4 may be closer to standard spacing SS than the spacing S8E5 in the layout of FIG. 8F, in which the interposing shape 822P is not present.

Although the exemplary layouts depicted in FIGS. 8A-8G include irregular wire layout regions arranged in two rows and two columns around a common center point (common centroid), it should be understood that the irregular wires in the irregular wire layout region can be arranged in essentially any manner. For example, in various embodiments, the irregular wires in the irregular wire layout region can be arranged in an array defined by a variable number of layout shape columns and a variable number of layout shape rows.

Figure 8H:
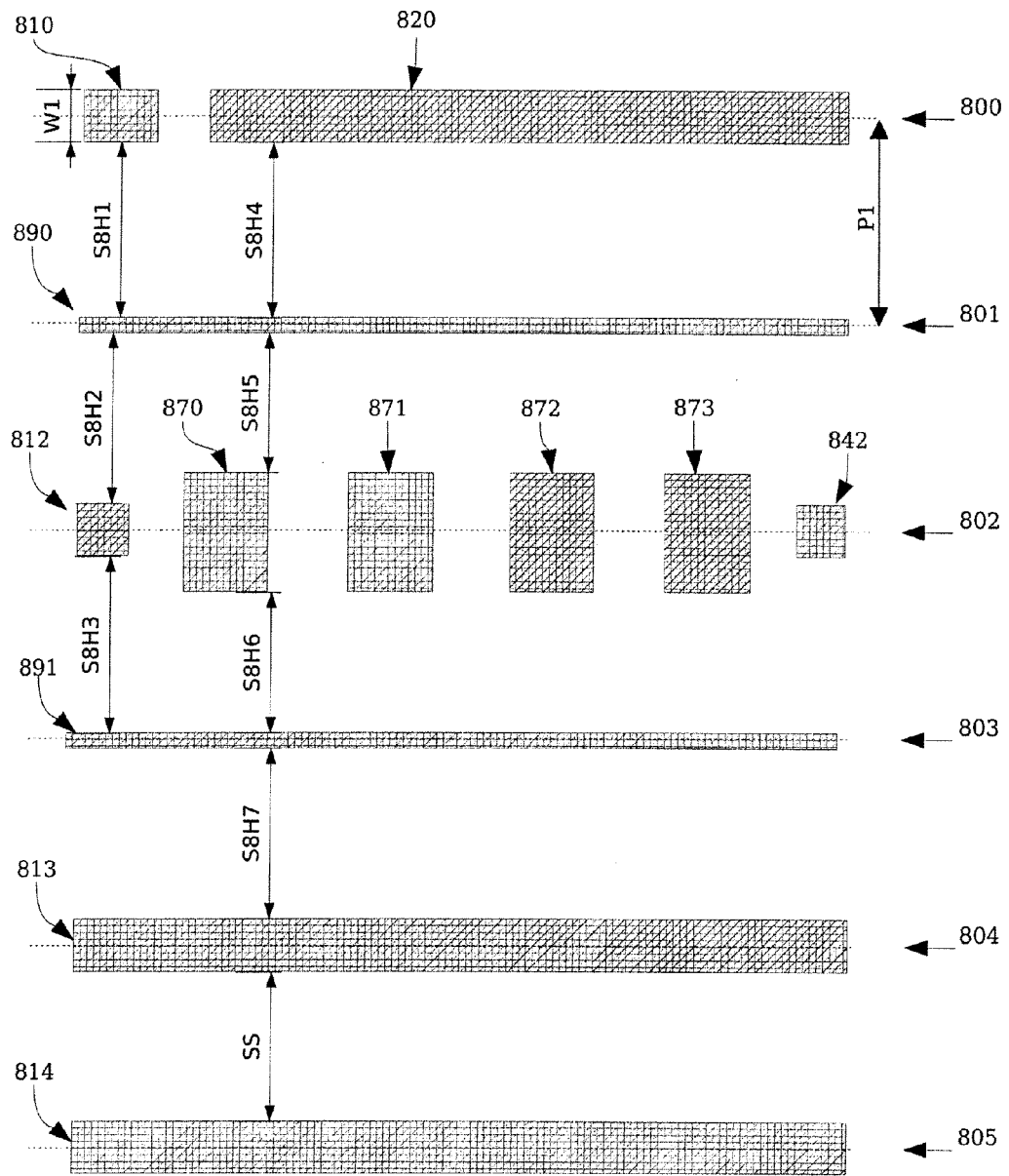
FIG. 8H shows an exemplary layout in which irregular wires are arranged in an array defined by four layout shape columns and one layout shape row, in accordance with one embodiment of the present invention.

FIG. 8H shows an exemplary layout in which irregular wires 870-873 are arranged in an array defined by four layout shape columns and one layout shape row. In one embodiment, matching is required between interleaved pairs of irregular wires such that the combined characteristics of irregular wires 870 and 872 are matched to the combined characteristics of irregular wires 871 and 873. The exemplary layout of FIG. 8H also includes protective shapes defined by wires 890, 891, 812 and 842, which reduce lithographic and/or electrical interactions between irregular wires 870-873 and regular wires opposite the protective shapes from the irregular wire layout region, such as regular wires 810, 820, and 813. A respective width of each protective wire 890, 891, 812 and 842 may be regular, irregular, or small enough that the protective wire is a sub-res shape. Spacings S8H1-S8H7 that extend perpendicularly away from long edges of irregular wires may not be equal to standard spacing SS.

Figure 9A:
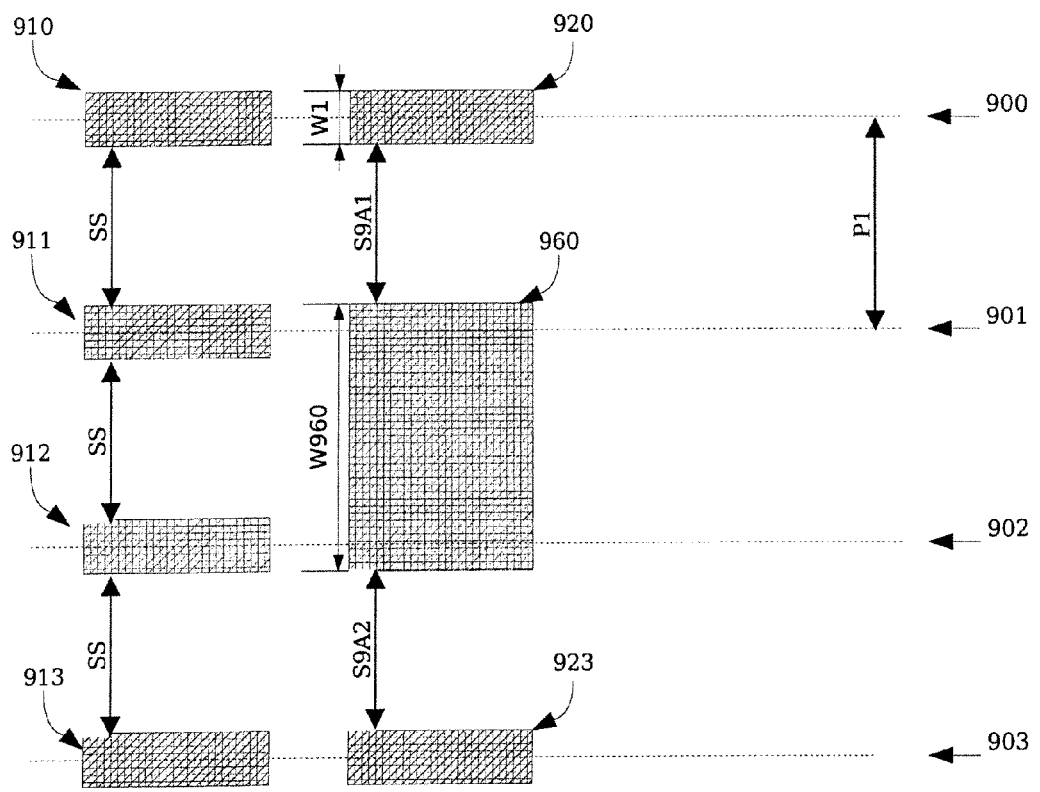
FIG. 9A shows an exemplary layout illustrating a method to reduce spacing variation by modifying one or more irregular wire widths such that long edge-to-long edge spacing after placement is satisfactory, in accordance with one embodiment of the present invention.

Another method to reduce spacing variation is to modify one or more irregular wire widths such that long edge-to-long edge spacing after placement is satisfactory. This method may be used in conjunction with other methods and embodiments shown herein. One embodiment of this method is shown in FIG. 9A, in which an irregular wire 960 is placed in an area including regular wires 910-913, 920, and 923. A width W960 of irregular wire 960 is set such that spacing variations associated with the irregular wire 960 is acceptable, wherein these spacing variations are defined as the differences between standard spacing SS and each of spacings S9A1 and S9A2. In one embodiment, these spacing variations are eliminated by setting the width W960 and the placement of irregular wire 960, such that S9A1=S9A2=SS.

Figure 9B:
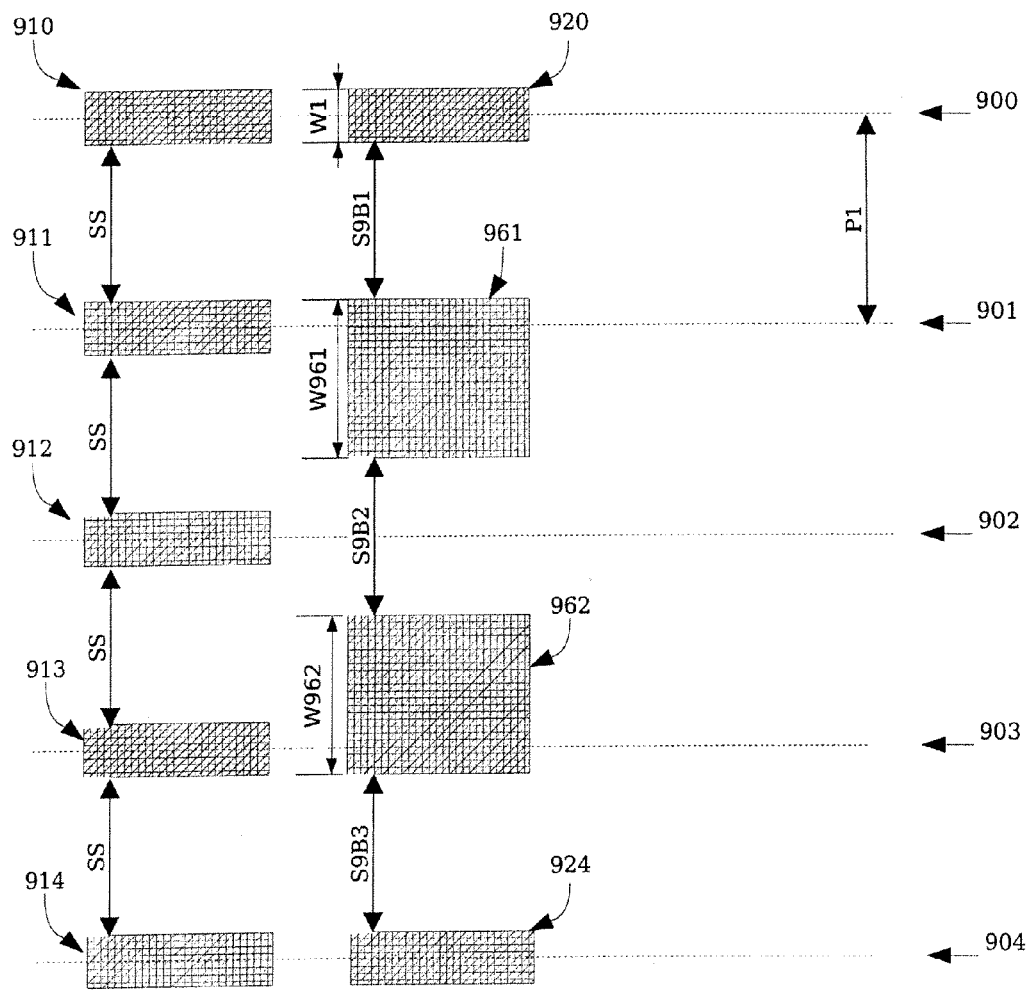
FIG. 9B shows an exemplary layout in which two irregular wires are successively placed between regular wires, in accordance with one embodiment of the present invention.

Another embodiment is shown in FIG. 9B, where two irregular wires 961 and 962 having widths W961 and W962, respectively, are successively placed between regular wires 920 and 924. Long edge-to-long edge spacings associated with irregular shapes 961 and 962 are shown as S9B1, S9B2, and S9B3. In one embodiment, irregular wire widths W961 and W962 are set such that spacing variations associated with irregular wires 961 and 962 are reduced to an acceptable value, wherein these spacing variations are defined as $SV9B1=|S9B1-SS|$, $SV9B2=|S9B2-SS|$, and $SV9B3=|S9B3-SS|$. In one embodiment, each of spacing variations SV9B1, SV9B2, and SV9B3 can be eliminated if W961, W962 and the placement of irregular wires 961 and 962 are defined such that S9B1=S9B2=S9B3=SS.

Figure 9C:
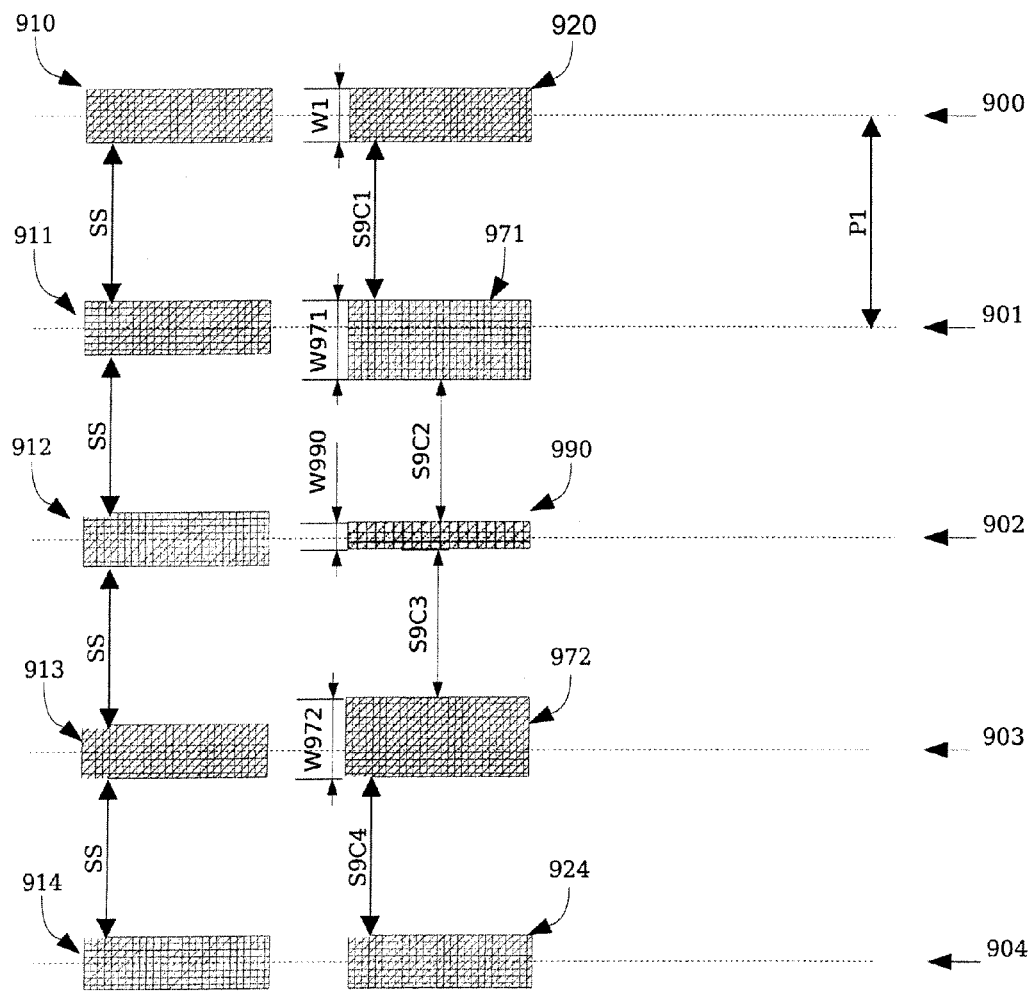
FIG. 9C shows an exemplary layout in which irregular shapes are placed between regular wires, in accordance with one embodiment of the present invention.

Another embodiment is shown in FIG. 9C, where irregular shapes 971, 972, and 990 having widths W971, W972, and W990, respectively, are placed between regular wires 920 and 924. Long edge-to-long edge spacings associated with irregular wires 971, 990, and 972 are shown as S9C1, S9C2, S9C3, and S9C4. Width W990 can be set to a value less than standard width W1 to compensate for widths W971 and W972 that are greater than standard width W1, so as to set each of spacings S9C1, S9C2, S9C3, and S9C4 sufficiently similar to standard spacing SS. In one embodiment, the width W990 may be small enough to make wire 990 a sub-res shape. In one embodiment, all spacing variation can be eliminated if W971, W972, W990, and the placement of shapes 971, 972, and 990 are such that S9C1=S9C2=S9C3=S9C4=SS.

In the methods and exemplary layouts previously described, irregular wires and sub-res shapes may or may not be centered on a VG line, on which regular wires are centered. Another method for formation and placement of irregular wires includes placement of irregular wires such that centerlines of the irregular wires are coincident with VG lines to a maximum extent possible, while minimizing an impact of non-standard width wires on overall layout pattern regularity.

Figure 10A:
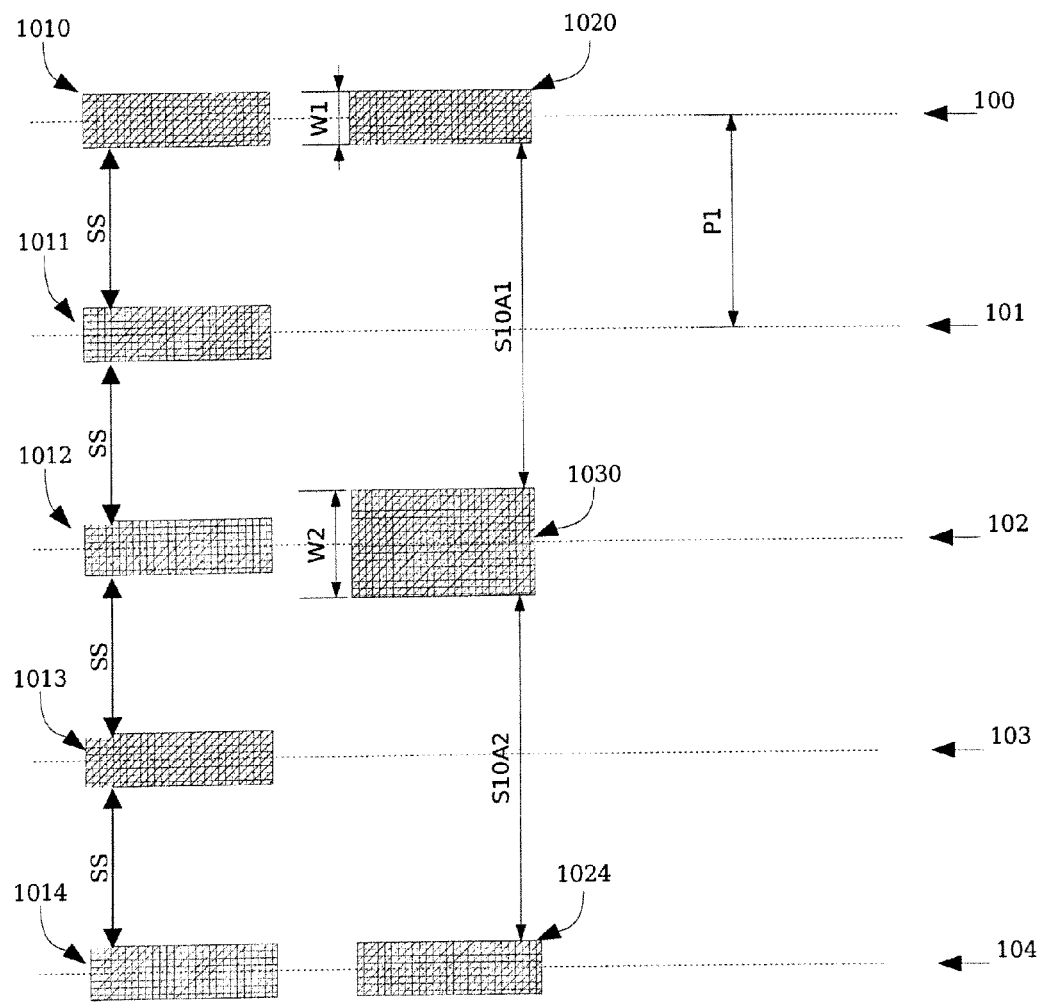
FIG. 10A shows an exemplary layout in which an irregular wire is placed such that its centerline is coincident with a virtual grate line, in accordance with one embodiment of the present invention.

FIG. 10A shows an exemplary layout in which an irregular wire 1030 is placed such that its centerline is coincident with a VG line 102. Irregular wire 1030 is placed within an irregular wire region bounded by regular wires 1010-1014, 1020, and 1024. VG lines 101 and 103 are unpopulated within the irregular wire layout region. With each layout shape centered on VG line and with no long edge-to-long edge spacings less than standard spacing SS, placement of irregular wire 1030 on VG line 102 results in long edge-to-long edge spacings of S10A1 and S10A2. In this embodiment, spacing variation ($SV10A=|S10A1-SS|$) may be significant.

Figure 10B:
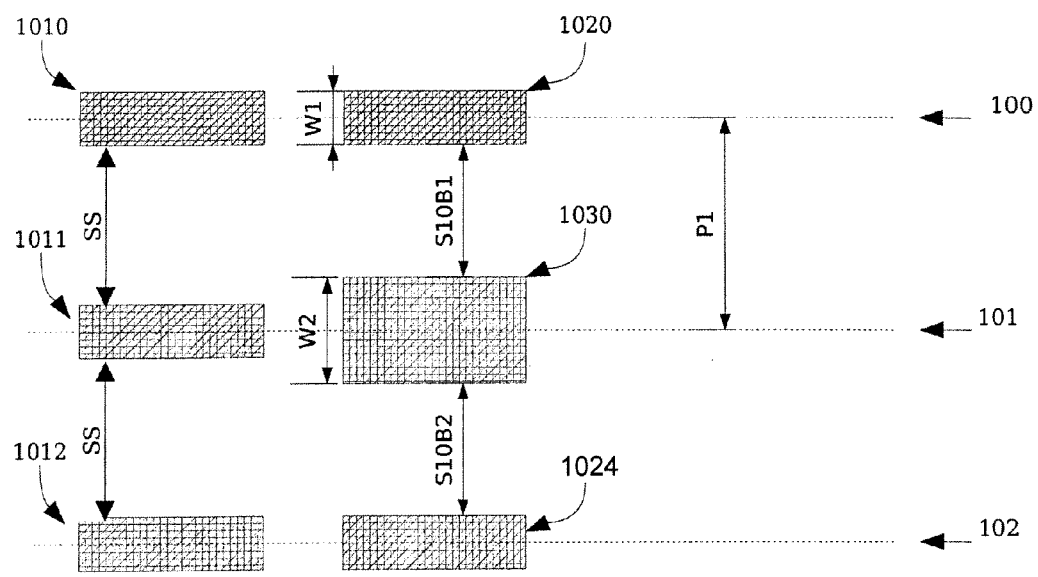
FIG. 10B shows a variation of the exemplary layout of FIG. 10A in which the irregular wire is moved up to a virtual grate line, and a regular wire is moved up to another virtual grate line, in accordance with one embodiment of the present invention.

FIG. 10B shows a variation of the exemplary layout of FIG. 10A in which irregular wire 1030 is moved up to VG line 101, and regular wire 1024 is moved up to VG line 102. This results in non-standard spacings S10B1 and S10B2, which are less than standard spacing SS. Spacing variation may be less in a layout that does not skip VG lines to accommodate irregular wire placement, as compared to a layout that does skip VG lines to accommodate irregular wire placement, such as shown in FIG. 10A. However, where an irregular wire width is wider than the standard width of regular wires, placement of the irregular wire may result in irregular spacing that is too small to pass manufacturing design rule checks.

Figure 10C:
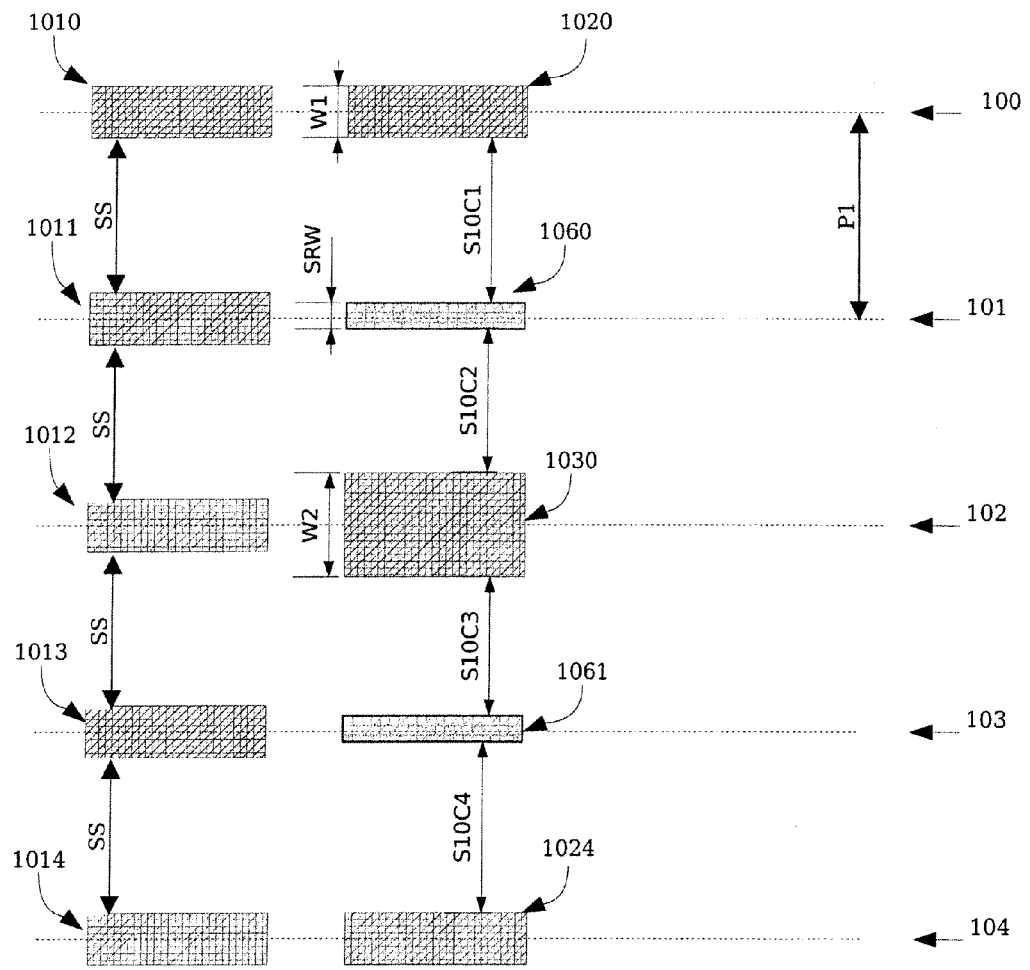
FIG. 10C shows a variation of the exemplary layout of FIG. 10A in which layout shapes are inserted in long edge spaces on each side of the irregular wire, in accordance with one embodiment of the present invention.

FIG. 10C shows a variation of the exemplary layout of FIG. 10A in which layout shapes 1060 and 1061 are inserted in long edge spaces S10A1 and S10A2 on each side of irregular wire 1030. Insertion of layout shapes 1060 and 1061 creates long edge-to-long edge spacings S10C1-S10C4, which may be closer to standard spacing SS than long edge spaces S10A1 and S10A2. In one embodiment, layout shapes 1060 and 1061 may be sub-res shapes.

It should be understood that the methods for defining an irregular wire layout region within the dynamic array architecture as disclosed herein can be implemented in a layout that is stored in a tangible form, such as in a digital format on a computer readable medium. For example, the layout defined in accordance with the methods disclosed herein can be stored in a layout data file of one or more cells, selectable from one or more libraries of cells. The layout data file can be formatted as a GDS II (Graphic Data System) database file, an OASIS (Open Artwork System Interchange Standard) database file, or any other type of data file format suitable for storing and communicating semiconductor device layouts. Also, multi-level layouts defined in accordance with the methods disclosed herein can be included within a multi-level layout of a larger semiconductor device. The multi-level layout of the larger semiconductor device can also be stored in the form of a layout data file, such as those identified above.

Also, the invention described herein can be embodied as computer readable code on a computer readable medium. For example, the computer readable code can include the layout data file within which one or more layouts defined in accordance with the methods disclosed herein are stored. The computer readable code can also include program instructions for selecting one or more layout libraries and/or cells that include a layout defined in accordance with the methods disclosed herein. The layout libraries and/or cells can also be stored in a digital format on a computer readable medium.

The computer readable medium mentioned herein is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network of coupled computer systems so that the computer readable code is stored and executed in a distributed fashion.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The data may represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

It should be further understood that the layouts defined in accordance with the methods disclosed herein can be manufactured as part of a semiconductor device or chip. In the fabrication of semiconductor devices such as integrated circuits, memory cells, and the like, a series of manufacturing operations are performed to define features on a semiconductor wafer. The wafer includes integrated circuit devices in the form of multi-level structures defined on a silicon substrate. At a substrate level, transistor devices with diffusion regions are formed. In subsequent levels, interconnect metallization lines are patterned and electrically connected to the transistor devices to define a desired integrated circuit device. Also, patterned conductive layers are insulated from other conductive layers by dielectric materials.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. A semiconductor chip including a chip level based on a layout that includes both regular and irregular wires, comprising:
   a plurality of regular wires formed within a given chip level, each of the plurality of regular wires having a linear-shape with an end-to-end length measured in a first direction substantially parallel to an underlying substrate and a side-to-side width measured in a second direction substantially parallel to the underlying substrate, the second direction perpendicular to the first direction, the plurality of regular wires positioned according to a constant pitch such that a distance as measured in the second direction between lengthwise centerlines of any two of the plurality of regular wires is an integer multiple of the constant pitch; and
   at least one irregular wire formed within the given chip level and within a region bounded by the plurality of regular wires, the at least one irregular wire having a linear-shape with an end-to-end length measured in the first direction and a side-to-side width measured in the second direction, wherein a distance as measured in the second direction between a lengthwise centerline of the at least one irregular wire and any one of the plurality of regular wires is not equal to an integer multiple of the constant pitch.

2. The semiconductor chip as recited in claim 1, wherein the side-to-side width of the at least one irregular wire is greater than the side-to-side width of any of the plurality of regular wires.

3. The semiconductor chip as recited in claim 1, wherein the side-to-side width of the at least one irregular wire is greater than the constant pitch.

4. The semiconductor chip as recited in claim 1, wherein the at least one irregular wire includes a plurality of irregular wires.

5. The semiconductor chip as recited in claim 4, wherein each of the plurality of irregular wires has a substantially equal side-to-side width.

6. The semiconductor chip as recited in claim 4, wherein some of the plurality of irregular wires have different side-to-side widths.

7. The semiconductor chip as recited in claim 4, wherein the plurality of irregular wires are positioned according to a second constant pitch such that a distance as measured in the second direction between lengthwise centerlines of any two of the plurality of irregular wires is an integer multiple of the second constant pitch.

8. The semiconductor chip as recited in claim 4, wherein the plurality of irregular wires consists of a first portion and a second portion, each of the first portion and the second portion including multiple ones of the plurality of irregular wires,
   wherein the first portion of the plurality of irregular wires are positioned according to a second constant pitch such that a distance as measured in the second direction between lengthwise centerlines of any two of the first portion of the plurality of irregular wires is an integer multiple of the second constant pitch, and
   wherein the second portion of the plurality of irregular wires are positioned according to a third constant pitch such that a distance as measured in the second direction between lengthwise centerlines of any two of the second portion of the plurality of irregular wires is an integer multiple of the third constant pitch.

9. The semiconductor chip as recited in claim 4, wherein a substantially uniform spacing as measured in the first direction exists between adjacently positioned regular and irregular wires.

10. The semiconductor chip as recited in claim 9, wherein a substantially uniform spacing as measured in the second direction exists between adjacently positioned regular and irregular wires.

11. The semiconductor chip as recited in claim 4, wherein a substantially uniform spacing as measured in the second direction exists between adjacently positioned regular and irregular wires.

12. A semiconductor chip including a chip level based on a layout that includes both regular and irregular wires, comprising:

a plurality of regular wires formed within a given chip level, each of the plurality of regular wires having a linear-shape with an end-to-end length measured in a first direction substantially parallel to an underlying substrate and a side-to-side width measured in a second direction substantially parallel to the underlying substrate, the second direction perpendicular to the first direction, the plurality of regular wires positioned according to a constant pitch such that a distance as measured in the second direction between lengthwise centerlines of any two of the plurality of regular wires is an integer multiple of the constant pitch, each of the plurality of regular wires having a constant side-to-side width as measured in the second direction; and at least one irregular wire formed within the given chip level and within a region bounded by the plurality of regular wires, the at least one irregular wire having a linear-shape with an end-to-end length measured in the first direction and a side-to-side width measured in the second direction, the side-to-side width of the at least one irregular wire being direction different than the side-to-side width of the plurality of regular wires as measured in the second direction.

13. The semiconductor chip as recited in claim 12, wherein the side-to-side width of the at least one irregular wire is at least two times the constant side-to-side width of the plurality of regular wires as measured in the second direction.

14. The semiconductor chip as recited in claim 12, wherein the side-to-side width of the at least one irregular wire is greater than the constant pitch.

15. The semiconductor chip as recited in claim 12, wherein the side-to-side width of the at least one irregular wire is less than the constant side-to-side width of the plurality of regular wires as measured in the second direction.

16. The semiconductor chip as recited in claim 12, wherein the at least one irregular wire includes a plurality of irregular wires.

17. The semiconductor chip as recited in claim 16, wherein each of the plurality of irregular wires has a substantially equal side-to-side width.

18. The semiconductor chip as recited in claim 16, wherein some of the plurality of irregular wires have different side-to-side widths as measured in the second direction.

19. The semiconductor chip as recited in claim 16, wherein the plurality of irregular wires are positioned according to a second constant pitch such that a distance as measured in the second direction between lengthwise centerlines of any two of the plurality of irregular wires is an integer multiple of the second constant pitch.

20. The semiconductor chip as recited in claim 16, wherein a substantially uniform spacing as measured in the first direction exists between adjacently positioned regular and irregular wires.

21. The semiconductor chip as recited in claim 20, wherein a substantially uniform spacing as measured in the second direction exists between adjacently positioned regular and irregular wires.

22. The semiconductor chip as recited in claim 16, wherein a substantially uniform spacing as measured in the second direction exists between adjacently positioned regular and irregular wires.

* * * * *